United States Patent [19]

Cohen et al.

[11] Patent Number: 5,010,761
[45] Date of Patent: Apr. 30, 1991

[54] AUTOMATED LEAK DETECTION APPARATUS AND METHOD THEREFOR

[75] Inventors: Bernard Cohen, Woodland Hills; Don B. Caplan, Agua Dulce; Edward G. Edwards, Woodland Hills, all of Calif.

[73] Assignee: Superior Industries International, Inc., Van Nuys, Calif.

[21] Appl. No.: 487,596

[22] Filed: Mar. 1, 1990

[51] Int. Cl.⁵ .................................................. G01M 3/20
[52] U.S. Cl. ........................................................ 73/40.7
[58] Field of Search .......................... 73/40.7; 209/591

[56] References Cited

U.S. PATENT DOCUMENTS

| | | | |
|---|---|---|---|
| 1,507,486 | 9/1924 | Jones . | |
| 2,819,609 | 1/1958 | Liebhafsky | 73/40.7 |
| 3,027,753 | 4/1962 | Harder | 73/40.7 |
| 3,174,329 | 3/1965 | Kauffman et al. | 73/40.7 |
| 3,186,214 | 6/1965 | Roberts | 73/40.7 |
| 3,342,990 | 9/1967 | Barrington et al. | 250/41.9 |
| 3,520,176 | 7/1970 | Becker | 73/40.7 |
| 3,572,096 | 3/1971 | Meyer | 73/40.7 |
| 3,721,117 | 3/1973 | Ford et al. | 73/40.7 |
| 3,762,212 | 10/1973 | Morley et al. | 73/40.7 |
| 3,813,923 | 6/1974 | Pendleton | 73/49.2 |
| 3,820,382 | 6/1974 | Andres et al. | 73/40.7 |
| 3,855,844 | 12/1974 | Craig | 73/40.7 |
| 3,888,111 | 6/1975 | Craig | 73/40.7 |
| 3,968,675 | 7/1976 | Briggs | 73/1 G |
| 4,055,984 | 11/1077 | Marx | 73/40.7 |
| 4,158,960 | 6/1979 | White et al. | 73/40.7 |
| 4,625,545 | 12/1986 | Holm et al. | 73/40 |
| 4,722,219 | 2/1988 | Batcher et al. | 73/40.7 |
| 4,754,638 | 7/1988 | Brayman et al. | 73/40.7 |
| 4,813,268 | 3/1989 | Helvey | 73/40.7 |

FOREIGN PATENT DOCUMENTS

| | | | |
|---|---|---|---|
| 17336 | 2/1983 | Japan | 73/40.7 |
| 26240 | 2/1983 | Japan | 73/40.7 |
| 2000300 | 1/1979 | United Kingdom . | |

Primary Examiner—Hezron E. Williams
Assistant Examiner—Joseph W. Roskos
Attorney, Agent, or Firm—Fulwider, Patton, Lee & Utecht

[57] ABSTRACT

A programmable and automated leak detection apparatus performs automated handling and leak testing of varying sized objects. In one embodiment, the apparatus seals one portion of the object to form an inner chamber and also forms an enclosure about the entire object. Different partial vacuums are drawn on the chamber and the enclosure and a test gas injected into the enclosure. The chamber is monitored for test gas leakage from the enclosure. The apparatus includes an automated measuring subsystem for obtaining a physical parameter of the object which is then compared with data in a program controller's memory to determine a pass/fail leak rate for that particular object. The vacuum system used has separate vacuum lines to the enclosure and chamber and the test gas purging system combined with the use of separate vacuum lines results in the efficient and rapid purging of test gas prior to testing the next object.

30 Claims, 31 Drawing Sheets

FIG. 1 PRIOR ART
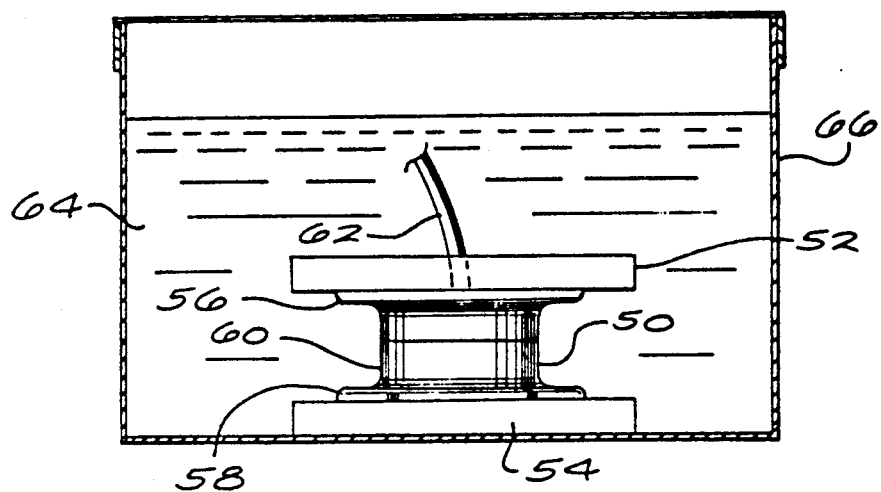
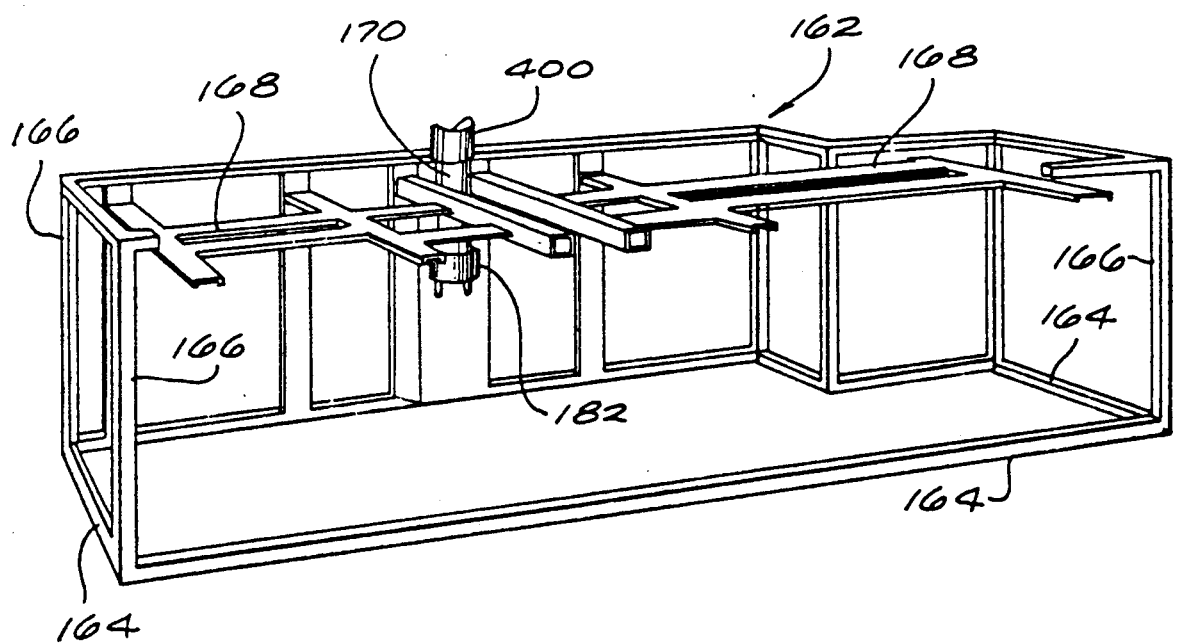
FIG. 3

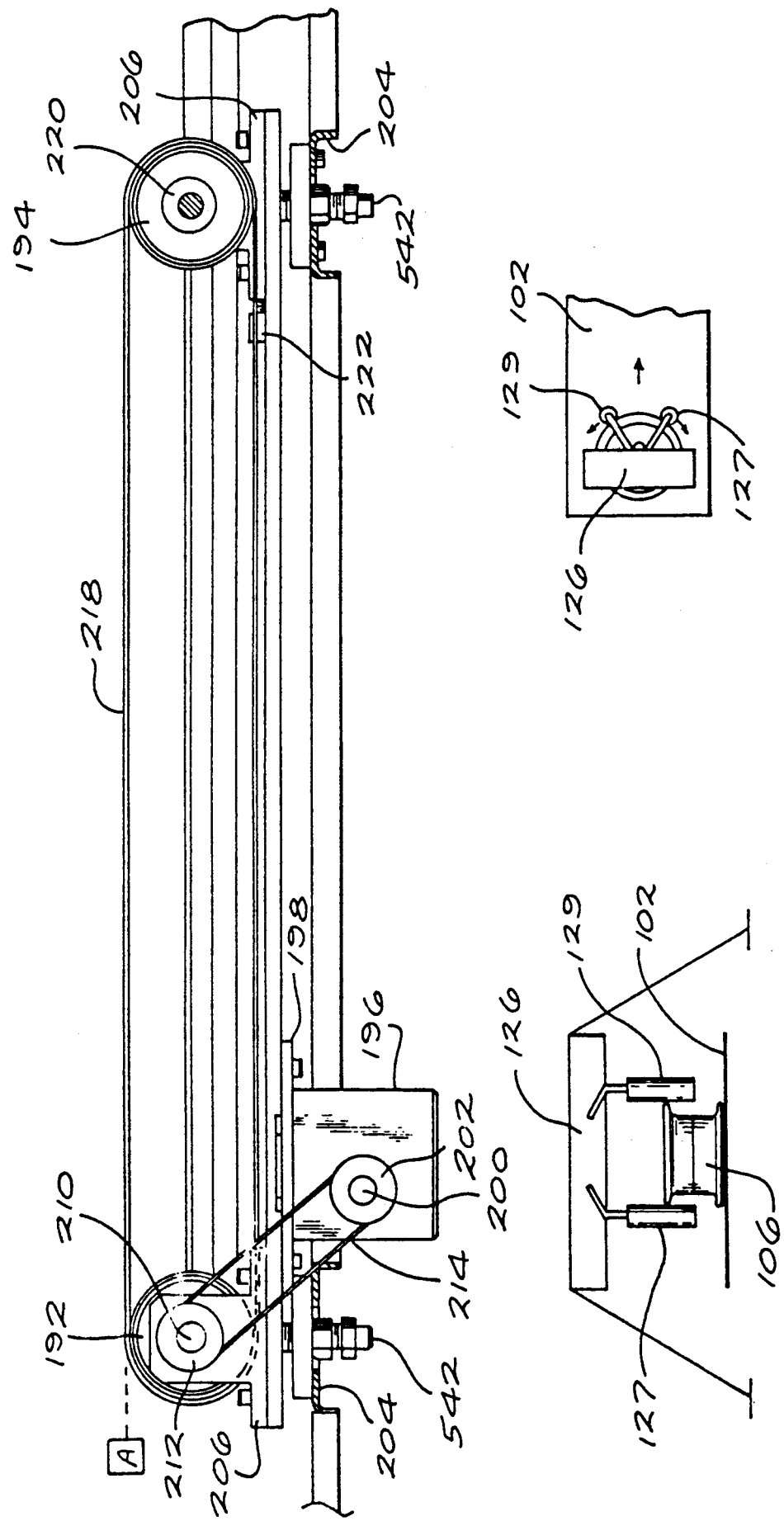

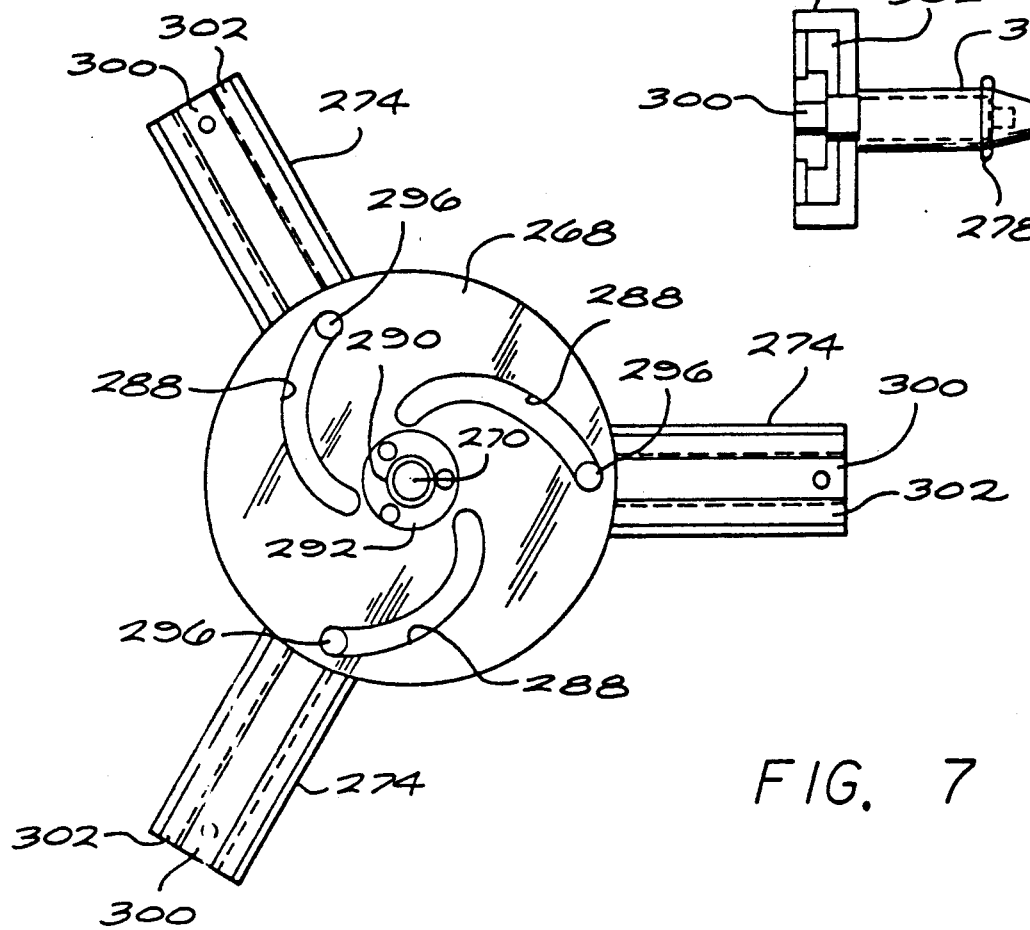
FIG. 8
FIG. 7
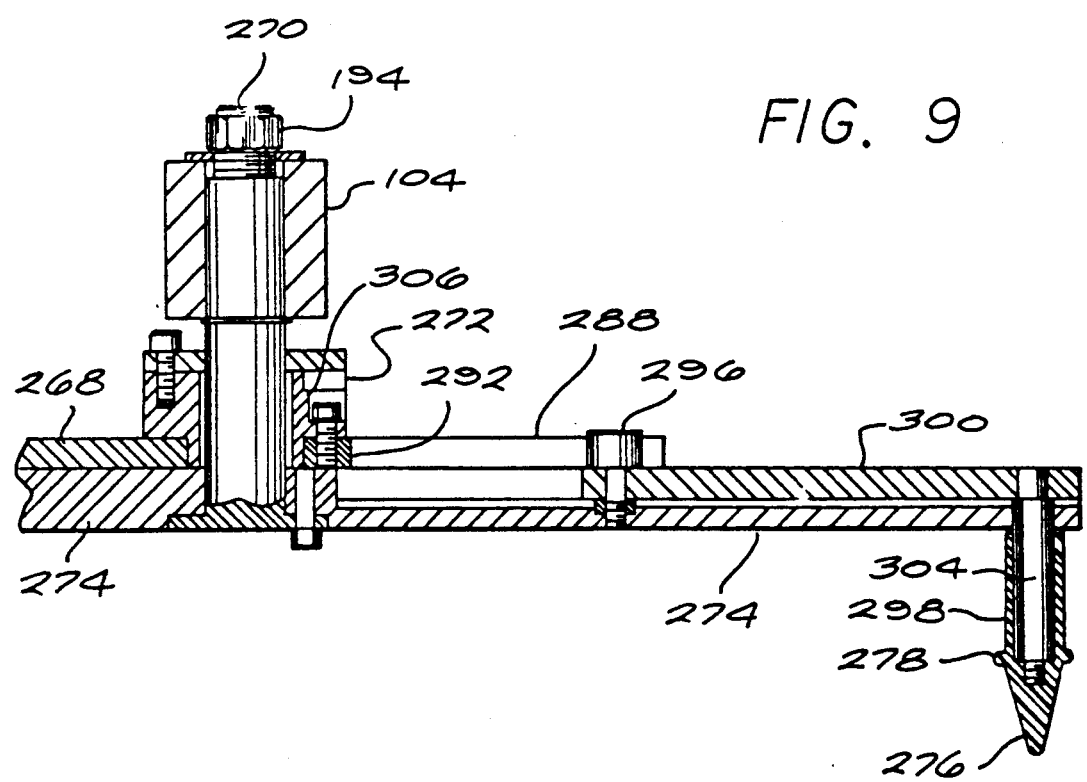
FIG. 9

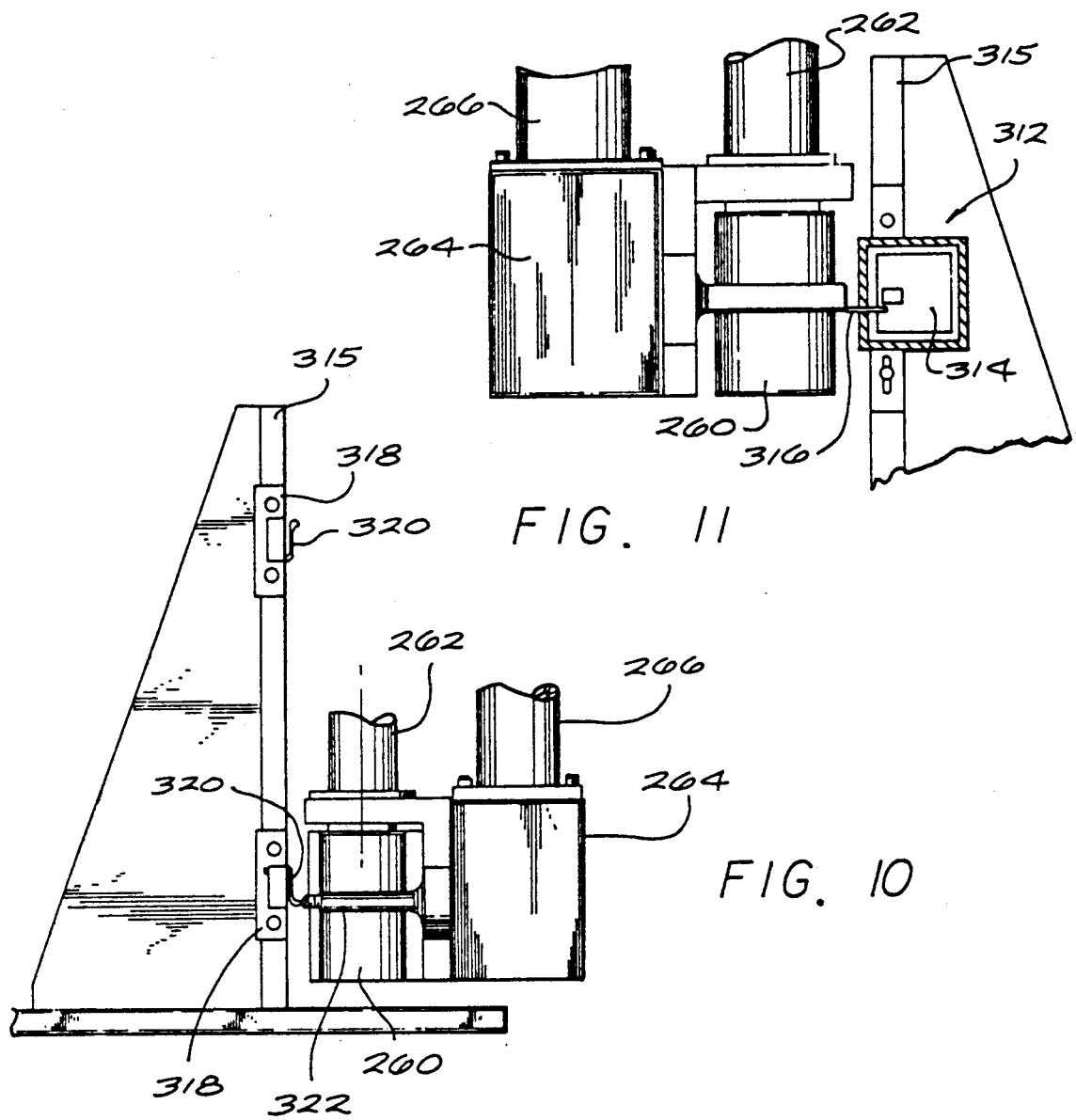
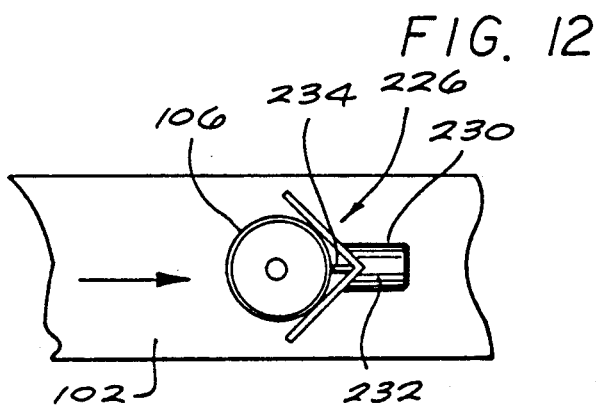

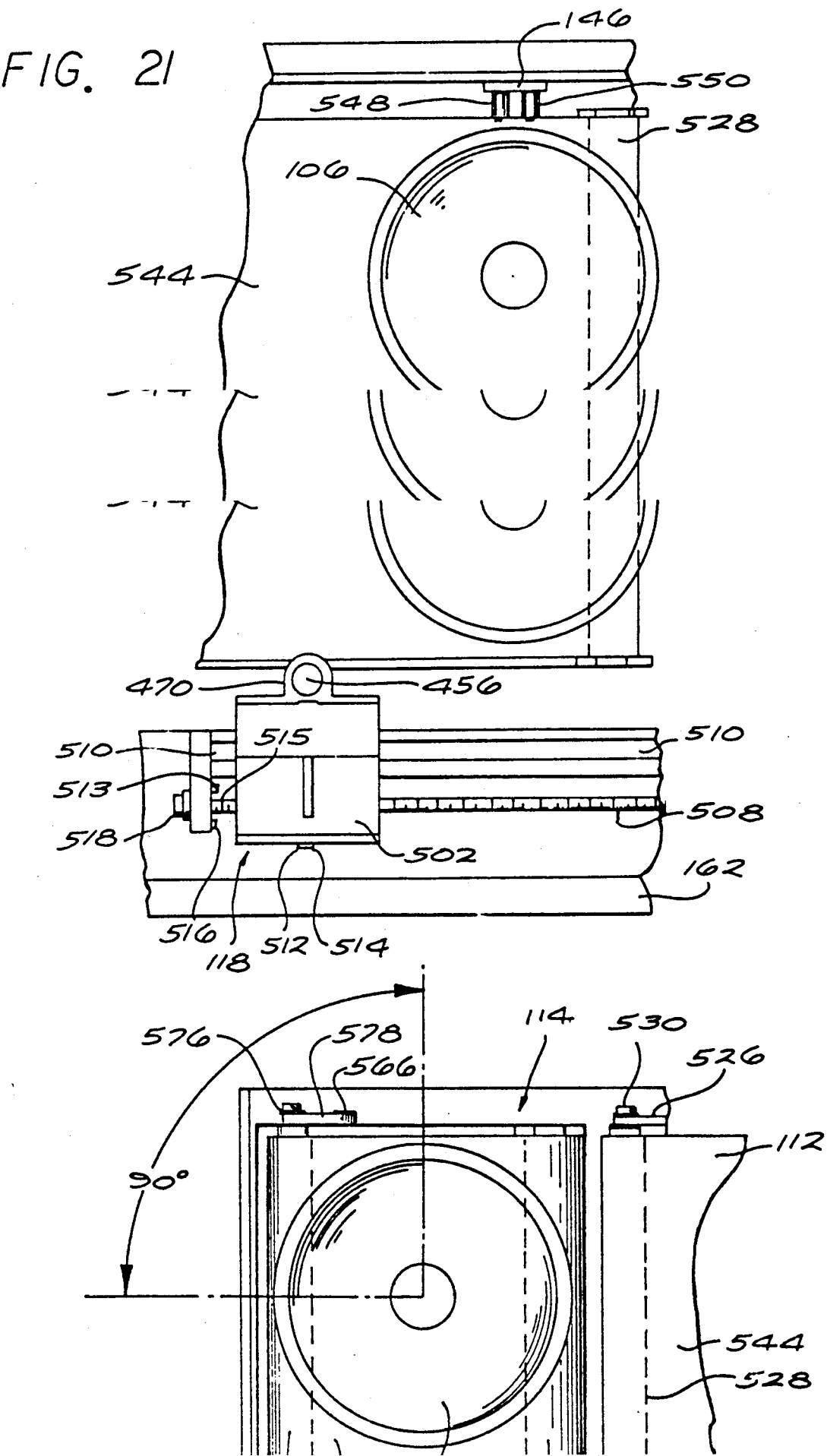

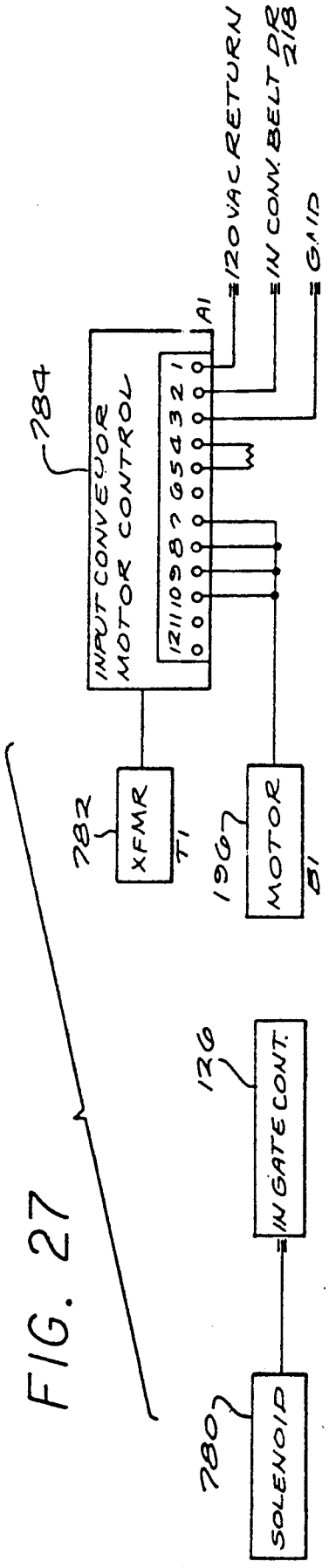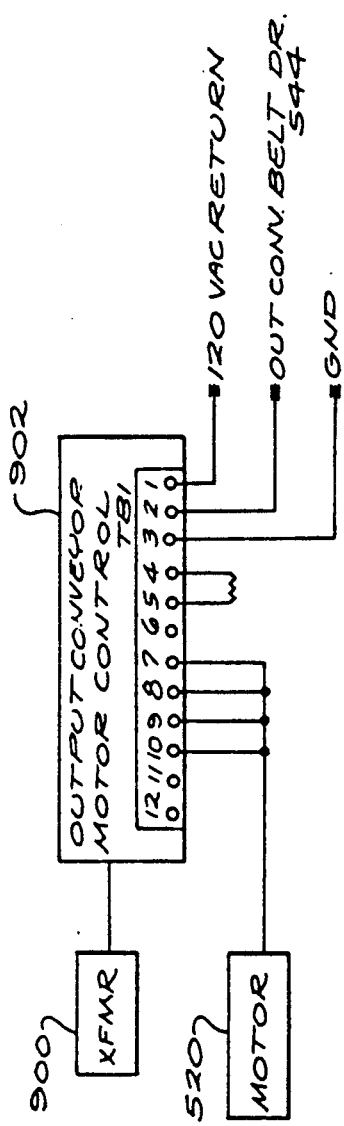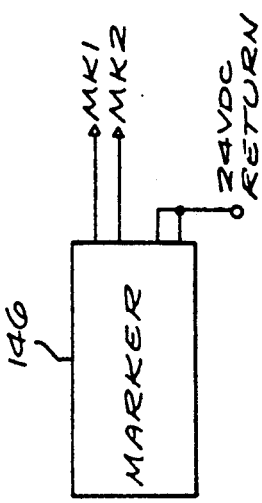
FIG. 27
FIG. 36
FIG. 35

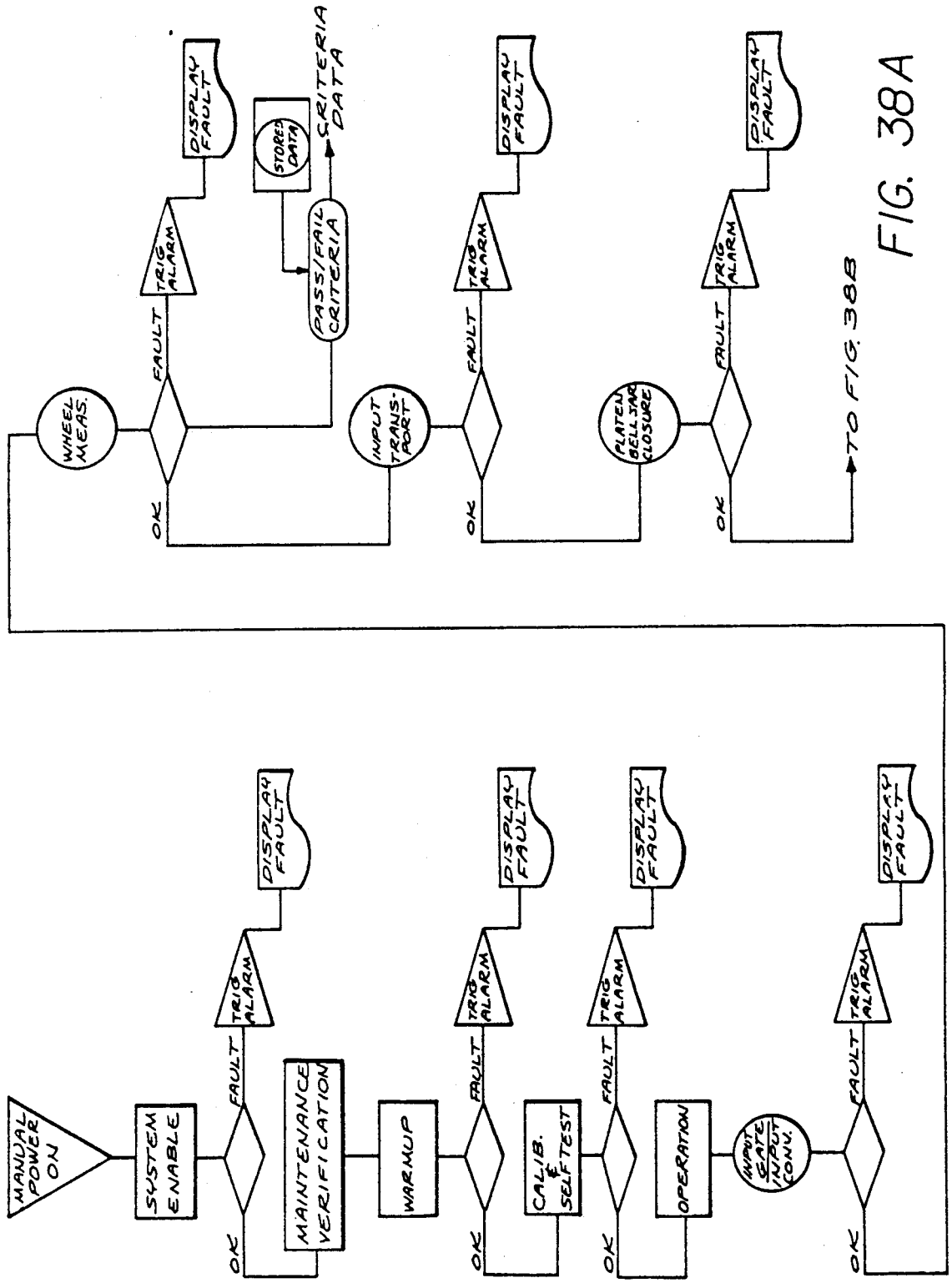

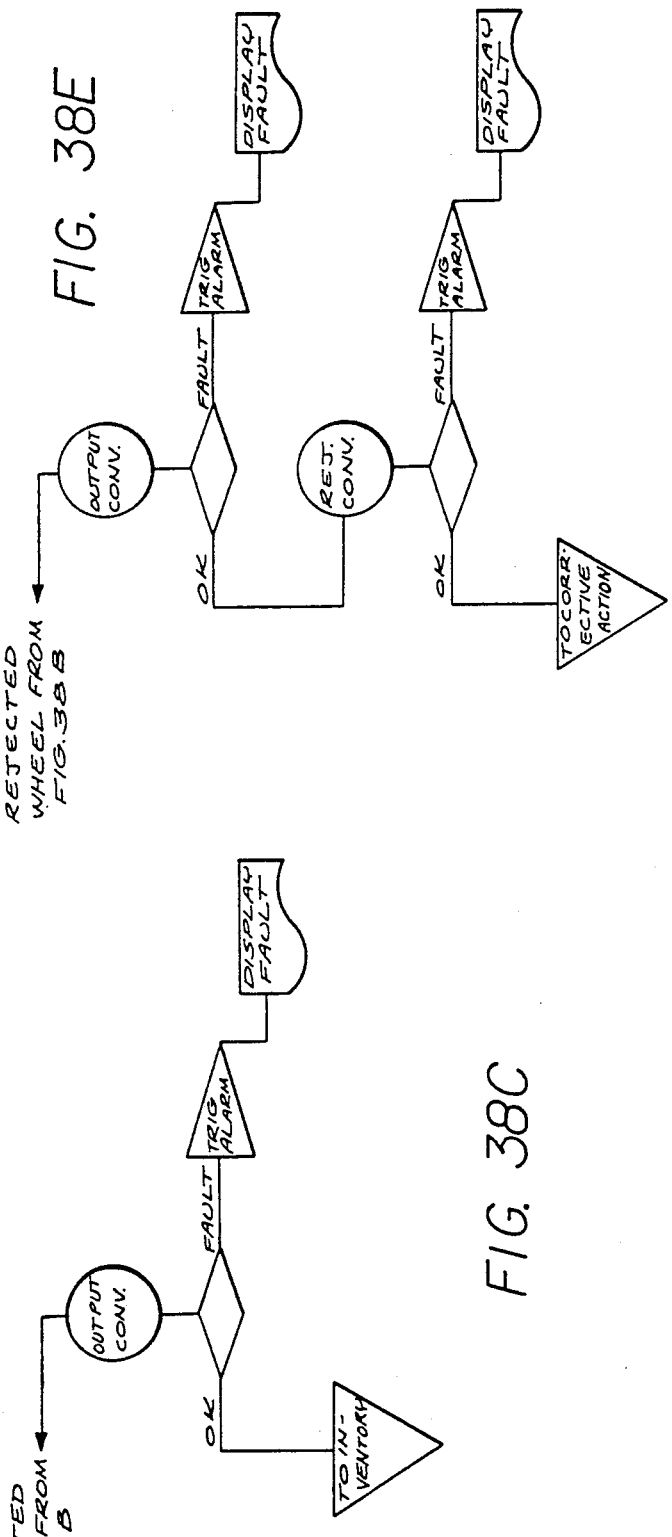
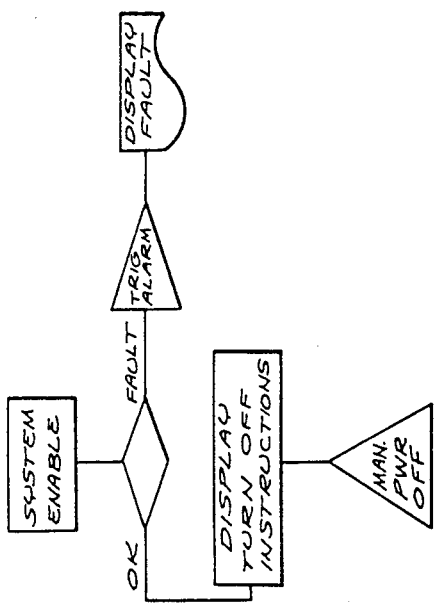
FIG. 38E
FIG. 38C
FIG. 38D

AUTOMATED LEAK DETECTION APPARATUS AND METHOD THEREFOR

BACKGROUND

The invention relates generally to leak detection apparatus and more particularly, to automated leak detection apparatus for automatically handling and testing objects.

Many devices contain areas which must be kept isolated from other areas in the same device, or from the external environment. In the field of vehicle manufacturing for example, devices such as drum wheels, pumps, housings, cylinder blocks and cylinder heads must be kept relatively leak free. One common requirement of such devices is that they are free of structural flaws that could result in leakage of a fluid such as air or any of various corrosive or flammable solutions contained elsewhere in the device or outside the device. In the case of a wheel drum, certain minute structural flaws in the drum may result in very slow leakage of the pressurized air in the tire through the drum, evidence of which may not appear until after the wheel has been in use for some time.

Several methods have been used in the past for detecting leaks. For example, in the case of a drum wheel fitted with an inflated tire, the tire would be inflated with a probe gas which was preferably a mixture of air and helium. In one embodiment, the entire wheel assembly was enclosed within a heat shrinkable plastic envelope which formed a seal around the article under test. Any volume of probe gas (helium) which leaked through the valve stem or through the rim of the drum wheel was contained within the plastic envelope. Subsequently, the envelope was punctured with a conventional helium detector to test the space within the chamber formed by the plastic envelope for the presence of helium.

The use of the disposable plastic envelope to provide a seal tended to decrease the reproducibility of the results. The non-reproducibility of the results together with the tire employed to contain the probe gas made automated testing difficult. Also, this particular method and apparatus were concerned primarily with detecting leakage in the rim-tire and the valve stem interfaces and not through the drum wheel structure itself.

Another technique for detecting leaks in flexible articles employed a method typically referred to as leak detection by vacuum. The procedure involved leak detection from the outside to the inside of articles having easily deformable walls and was generally performed on an article which was mounted within a dome. Initially, a vacuum was drawn in a space of the article through a nipple which communicated with a test gas detector. The article was sprayed with a test gas and when a leak was present, the test gas penetrated the evacuated space. The procedure employed a disposable hood comprising plastic and was utilized to contain a gas mixture or to trap an escaping probe gas. Such a procedure also was difficult to automate.

A prior technique commonly known as the water immersion test and shown in FIG. 1 was employed for testing drum wheels for structural integrity and leakage of a pneumatic medium. A pneumatic test was conducted by clamping the wheel 50 under test between two platens 52, 54 along the axial center line of the wheel 50. The two platens each had elastomeric engaging disks 56, 58 on opposite interior faces for providing engaging and sealing surfaces. Upon capturing a drum wheel, a chamber 60 was defined within the wheel cavity and between the two opposing elastomeric engaging disks. A compressive force was applied to the opposing platens for creating a seal. The chamber 60 formed within the wheel cavity was then pressurized by means such as pneumatic hose 62 and the wheel was submerged in a water bath 64 inside a tank 66 and visually inspected for the formation of air bubbles; the presence of bubbles indicating the passage of air from the interior defined chamber to the outer exposed wheel surface. The formation and release of bubbles provided information on estimating the leak rate of the article being tested. Often, the article being tested was inspected through a porthole positioned in each of the walls of the tank and some test devices of the past also included various means for rotating the wheel to facilitate the search for air bubbles.

This technique suffered from numerous deficiencies. In one case, a slow leak through the structure of the wheel tested resulted in an air bubble clinging to the surface of the wheel. Under these conditions, the inspector had to discern a bubble originating from air leakage from a bubble caused by the mere immersion of the wheel in the bath, a subjective test at best. Initially, the procedure required the inspector to determine whether the bubble "broke away" from the wheel structure within a particular time limit. If the bubble did not "break away" within the prescribed time limit, the wheel passed the test. This subjective inspection by a human observer was found to be unsatisfactory.

Another particular deficiency in this test is that it was entirely possible that several microscopic holes or passages existed in the wheel. During the water immersion test, no single microscopic hole produced a bubble forming on the side of the wheel. However, the aggregate sum of the several microscopic holes could produce significant leakage over time. Also, it should be noted that the air pressure was applied from within the inner chamber formed by the two platens capturing the drum wheel. This pressurized force was applied in a direction opposite to that which would be experienced by the wheel under normal use. Under normal conditions with an inflated tire mounted on a wheel, the air pressure was applied from the external side between the tire and the external surface of the wheel. In an improperly casted wheel, the microscopic flaws in the cast aluminum may cause the wheel to pass the pressurized medium from the external surface of the wheel to the internal surface but not from the internal surface to the external surface of the wheel. This is because imperfections such as minute microscopic aluminum flakes may tend to function as miniature check valves permitting the air pressure to pass in one direction but not in the opposite direction.

Another testing system which is disclosed in U.S. Pat. No. 4,813,268 to Helvey employed a top and a bottom platen to provide an inner chamber within the structure of the wheel. A housing was then lowered over the wheel to form an outer chamber which enclosed the wheel. A partial vacuum was then drawn on the inner chamber and a test gas such as helium was introduced into the outer chamber. If leakage existed in the structure of the wheel, the helium-air mixture would pass from the outer chamber to the lower-pressure inner chamber. A helium monitoring device sampled the inner chamber and detected the presence of the test gas if a leak existed.

While the Helvey patent represents a significant advance in the art, a substantial amount of time had to be spent to purge the test gas from the system after testing and this process tended to slow the testing process. Helvey also included no means for automatically measuring the size of the object under test and comparing the test results to the stored data for objects of that particular size to determine whether the object passed or failed the test. Helvey also had no automated handling means for moving objects through the automated test procedure. Many devices, for example drum wheels, require one hundred percent testing, thus efficiency and speed in the testing process is necessary to maintain production rates. Automating the testing process and improving the process itself so that faster purging of the test gas occurs, and so that differently sized articles can be tested without reconfiguring the test apparatus would enable higher production rates.

It would therefore be an advance in the art to provide a leak detection system which improves the production testing rate, which can test objects of differing sizes and styles without reconfiguring the test apparatus, which has an improved test gas purging system, which permits automatic identification and rejection of structures that fail the test, and which provides self-testing and self-calibrating procedures for preventing faulty rejection of good objects and acceptance of bad objects.

SUMMARY OF THE INVENTION

Briefly, and in general terms, the present invention provides a new and improved leak detection apparatus and method therefor which improve the quality of testing and enable automatic testing. In accordance with the invention, the testing environment more closely emulates the normal operating conditions of the object under test. Moreover, in accordance with the invention, objects of differing sizes and styles may be tested without reconfiguring the test apparatus. In accordance with the invention, the object under test is moved into the test apparatus by an input means such as a conveyor. In one embodiment, the object is first moved to a measurement subsystem. The measurement subsystem determines a size parameter of the object and indicates this to a program controller. In this embodiment, the program controller then causes the input means, such as an input transport arm, to move the object to the leak detection test equipment. The object is placed on a lower movable platen which moves in relation to a fixed upper platen. When the test object engages the upper platen, a chamber is formed around a selected part of the object. A vacuum housing, such as a bell jar, is lowered over the object creating a sealed outer enclosure.

In one embodiment, a coaxial vacuum system is employed to create a partial vacuum within the sealed inner chamber and a partial vacuum in the sealed outer enclosure, the outer enclosure having less of a vacuum than the sealed inner chamber. A gas injection system is utilized to deliver a test gas such as helium to the sealed outer enclosure. A test gas sensor which is in communication with the sealed inner chamber monitors leakage of the test gas through the object into the chamber over a defined period of time. The amount of leakage is communicated to the program controller which has been pre-programmed for acceptable leak rates.

Upon completion of the leak test, the partial vacuum in the inner chamber is dissipated and the lower platen is lowered somewhat to break the seal of the inner chamber. The purging system is engaged. Due to there being separate vacuum lines for the sealed inner chamber and for the outer enclosure, the leak detection system can be well purged of test gas. A purging pump is engaged which creates a greater vacuum in the outer enclosure, thus drawing all test gas remaining in the system out of the detection system.

After purging, the bell jar is then moved upwards and the lower platen moved to its rest position with the tested object thereon. The tested object is then delivered to an output transport means such as an output conveyor by means such as an output transport gripper arm. In one embodiment, the program controller then directs the reject conveyer to convey an object which passed the leak test to one location and an object which failed the leak test to another location.

The leak detection apparatus in accordance with the invention improves the quality of testing by the use of separate inner chamber and outer enclosure vacuum lines which enable faster and more complete purging. The speed of testing is also improved by automatically conducting the entire test procedure. The use of a program controller with pre-programmed look-up tables enables the apparatus to accept objects of varying sizes and styles for testing without requiring reconfiguration or reprogramming of the program controller. This increases the production line testing rate in that the leak detector apparatus need not be stopped to reconfigure it for an object of a different size.

In an embodiment, the apparatus is capable of interfacing with other manufacturing plant computers for various purposes, such as communicating daily failure rates. These and other features and advantages of the invention will become apparent from the following more detailed description of the preferred embodiments when taken in conjunction with the accompanying drawings, which illustrate, by way of example, the features of the invention.

BRIEF DESCRIPTION OF THE DRAWINGS

FIG. 1 is a side elevational view of a prior art water immersion leak detection apparatus;

FIG. 3 is a perspective view of a frame structure utilized to support the leak detection apparatus of FIG. 2;

FIGS. 4A and 4B are front and top views respectively of an input stop gate of the leak detection apparatus of FIG. 2;

FIG. 5 is a side elevational view of an input conveyor of the leak detection apparatus of FIG. 2;

FIG. 7 is a partial top view of the cam plate of the input and output transport subassemblies of FIGS. 6 and 20;

FIG. 8 is a side elevational view of a gripper pin of the input and output transport subassemblies of FIGS. 6 and 20;

FIG. 9 is a frontal elevational view of a spider arm of the input and output transport subassemblies of FIGS. 6 and 20;

FIG. 10 is an elevational view of a pair of limit switches of the input and output transport subassemblies of FIGS. 6 and 20;

FIG. 11 is an elevational view of a zero-position slot switch of the input and output transport subassemblies of FIGS. 6 and 20;

FIG. 12 is a top view of the measurement subsystem of the leak detection apparatus of FIG. 2;

FIG. 21 is a planar view of the marker subsystem of the leak detection apparatus of FIG. 2;

FIG. 22 is a planar view of a reject conveyor subsystem of the leak detection apparatus of FIG. 2;

FIG. 27 is an input conveyor subsystem wiring diagram of the leak detection apparatus of FIG. 2;

FIG. 35 is a marker subsystem wiring diagram of the leak detection apparatus of FIG. 2;

FIG. 36 is an output conveyor subsystem wiring diagram of the leak detection apparatus of FIG. 2;

FIGS. 38A, 38B, 38C and 38D are flow diagrams of a program utilized in the program controller of the leak detection apparatus of FIG. 2.

DETAILED DESCRIPTION OF THE PREFERRED EMBODIMENTS

Figure 2:
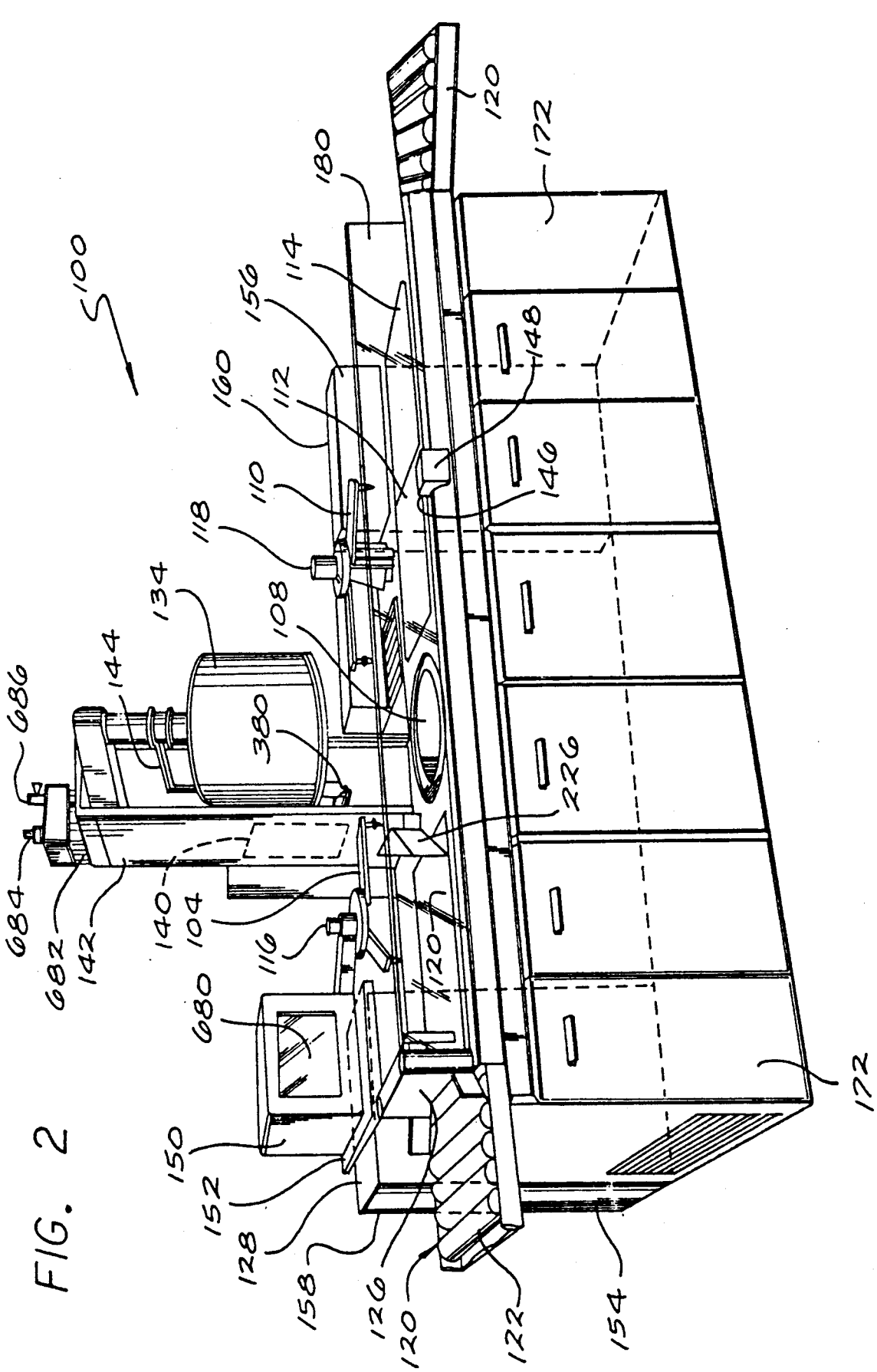
FIG. 2 is a side perspective view of an embodiment of an automated leak detection apparatus in accordance with the present invention.

Referring now to the drawings with more particularity, in FIG. 2 there is shown a perspective view of an embodiment of a leak detection apparatus in accordance with the invention. A brief overview of the leak detection apparatus 100 will now follow with detailed descriptions of the components and subsystems given after that. For convenience of description only, the object under test in the following description is a wheel. However, the invention is not confined to only testing wheels but may be used for testing other objects.

In FIG. 2, the automated leak detection apparatus 100 is shown connected at both of its ends to a plant delivery system 122 and test completion conveyor system 120 which have conveyor rollers. Other types of transport systems may be used to convey test objects to and from the leak detection apparatus 100 including manually loading and unloading test objects; a roller conveyor system 120 is shown for example purposes only. The leak detection apparatus 100 comprises an input subsystem for transporting the objects under test from the factory conveyance system 122 to the measurement subsystem and the leak detection subsystem of the apparatus 100. As shown in FIG. 2, the input subsystem comprises an input gate 126, and input conveyor 102, and an input transport subsystem 116. The input transport gripper arm 104 of an input transport subsystem 116 cooperates with the input conveyor 102 for positioning a wheel onto the movable lower platen 108 for conducting the gas leakage test procedure.

The input gate 126 is designed to control the entry of the wheels 106 until called upon for test while the input conveyor 102 functions to move the wheels into the measurement subsystem and for further movement by the input transport gripper arm 104.

Each of the subassemblies of the detection apparatus 100 are controlled by a program controller 128 housed within the leak detection apparatus 100. When the input gate 126 receives a signal from the program controller 128, the input gate admits one object under test to the input conveyor 102. The input conveyor transports the object to the measurement subsystem which then measures a physical characteristic of the object, such as in the case where a wheel is the object under test and the diameter is measured. Upon receiving the diameter measurement, the program controller 128 instructs the input transport 116 to move over the center of the wheel and lower its gripper arm 104 to secure the object and move it to the lower platen 108 for leak testing. In another embodiment, the gripper arm 104 may also be used to determine the height of the object as well as to move it.

After the wheel has been positioned and the input gripper arm 104 disengaged, the lower platen is moved upward to form a seal with a vacuum hood or enclosure, such as the bell jar 134 shown. This bell jar 134 entirely encloses the wheel. Upon forming this enclosure, the lower platen continues to move upward until the wheel makes contact with an upper platen 130 (see FIG. 14). That portion of the drum wheel captured between the upper platen 130 and the lower platen 108 forms a sealed inner chamber 132 (see FIG. 16). Thus, two sealed chambers are formed, one is the inner chamber of the wheel 132, and one is an outer enclosure 136 (FIG. 16) which encloses the entire wheel.

Figure 17:
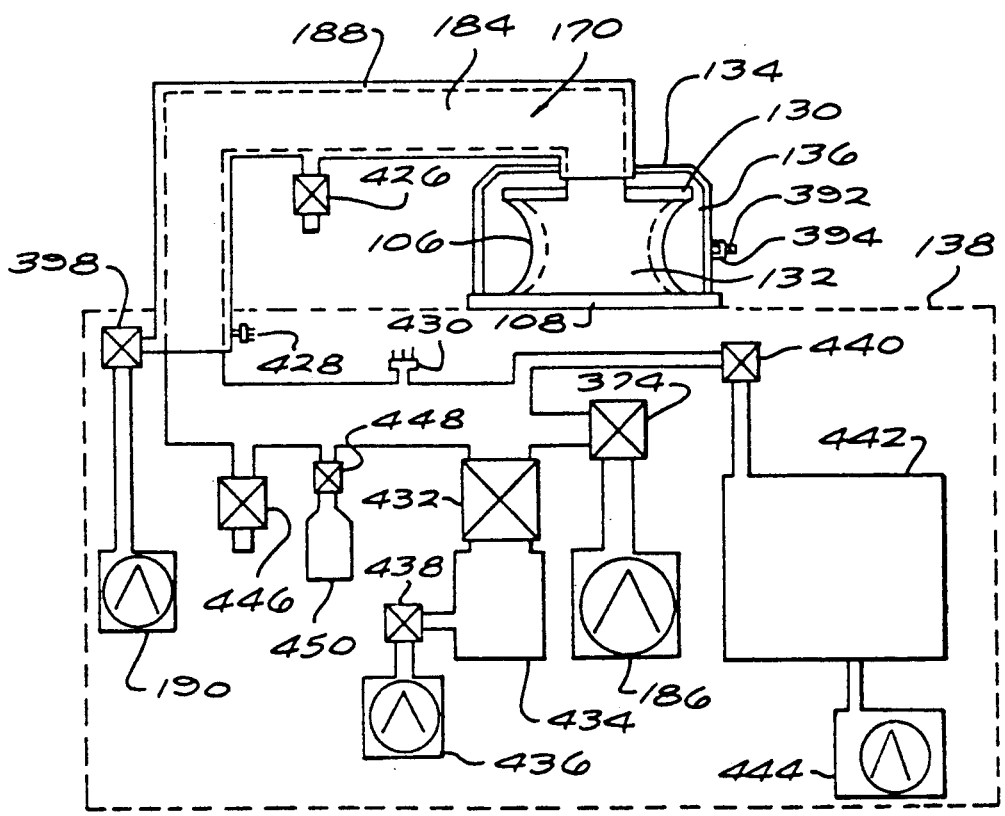
FIG. 17 is a schematic diagram of the vacuum subsystem of the leak detection apparatus of FIG. 2.

A vacuum subsystem 138 shown in FIG. 17 comprises two systems, one of which draws a partial vacuum within the inner sealed chamber 132 and the second of which draws a lesser partial vacuum in the outer bell jar enclosure 136. A test gas such as helium is then injected into the outer enclosure 136. The gas inside the inner sealed chamber 132 is analyzed for leakage of the helium through the wheel 106.

Upon completion of the leak detection procedure (described in more detail hereinafter), the vacuum to the sealed inner chamber is dissipated and the lower platen 108 is lowered thus breaking the seal of the inner chamber. However, the vacuum to the outer enclosure remains in operation. Additionally, a purge pump in the outer enclosure vacuum system is engaged thus purging of test gas the inner chamber, its vacuum system 184 and the vacuum system of the outer enclosure. After an interval, the lower platen is lowered further to break the seal with the bell jar 134 and both the lower platen and bell jar are returned to their initial positions.

Thereafter, the output transport subassembly 118 receives an energizing signal from the program controller 128 for relocating the tested wheel. The gripper arm 110 is repositioned to the lower platen 108 whereupon the wheel 106 is captured and relocated to the output conveyor 112. It is there positioned before a marker subsystem 146 for receiving an identifying mark. This mark may indicate that the item passed the leak test, failed the leak test, or has another status.

After the wheel has been marked, the output conveyor 112 delivers it to the reject conveyor 114 which has received a signal from the program controller 128 determinative of the leak test results. The reject conveyor 114 will be energized to transport the wheel to one position, such as to the plant delivery system 120 leading to the packing and shipping department if the wheel passed the leak detection test or to another position if the wheel failed the test. In one embodiment, the reject conveyor 114 rotates ninety degrees and transports the rejected wheel to a separate location reserved for wheels determined to have leaks.

The entire operation of the leak detection apparatus 100 from delivery of an item to be tested to movement of the tested item to a selected position is automatically controlled by the program controller 128. Data concerning acceptable and unacceptable leak rates may be loaded into the program controller in the form of lookup tables or other forms. After the measurement subsystem and input transport subsystem 116 have communicated the size of the object under test to the program controller, and after the leak test has been completed, the program controller compares the leak rate of the device determined by the test against the data loaded in memory for a device of this size to determine if the tested device passed or failed the test.

Further, the apparatus in accordance with the invention is capable of continuous operation, except for periodic calibrations, self-testing, and shutdowns for maintenance. The video control touch screen monitor 150 continually displays the apparatus 100 test status. The electrical controls and circuitry 154 associated with the display and program controller subsystem and the power distribution system 156 are located in a pair of connection cabinets 158, 160, which will be described in more detail hereinafter.

In the present embodiment, the entire leak detection apparatus 100 is built around and supported by a structural frame 162 as is illustrated in FIG. 3. The frame 162 comprises base members 164 and upright supports 166. A plurality of lattice structural elements 168 support the various elements of the apparatus 100. A coaxial vacuum pipe 170 is attached to the structural frame 162. The coaxial vacuum pipe 170 is a main element of the vacuum subsystem 138 and is secured at its lower end in a flange plate 182. The pipe 170 comprises an inner pipe 184 (FIG. 17) which is connected to a roughing pump 186 and into an outer pipe 188 concentric about the inner pipe 184. The outer pipe 188 is connected to a suitable purging pump 190.

The preferred embodiments will now be discussed in more detail.

Referring now to FIGS. 4A and 4B, the input gate 126 will be described. A function of the input gate 126 is to hold objects to be tested until the vacuum subsystem of the leak detection apparatus 100 is prepared to receive another object. At that time, the program controller 128 sends a pulsed signal which momentarily energizes electrical solenoids (not shown) which operate to allow the arms 127 and 129 of the input gate to unlock. Simultaneously, the program controller 128 energizes the input conveyor 102. The force of the wheel against the arms 127 and 129 cause their separation allowing the wheel to be carried forward on the conveyor 102. The input gate 126 is spring loaded so that the gate is closed upon the passage of the wheel 106.

The input conveyor 102 and the output conveyor 112 in this embodiment are each a motor driven belt type for moving the wheel under test in and out of the detection apparatus 100. The conveyors include a drive roller and an idler roller for moving the conveying belt carrying the wheel.

Referring now to FIG. 5, the input conveyor 102 is driven by an electric motor 196 which is mounted on a housing 198. The motor 196 may be, for example, a gear head motor operated at 120 volts A.C. by control signals received from the program controller 128 and which includes a drive shaft 200 on which a synchronous drive pulley 202 is mounted as is shown in FIG. 5. Mounted adjacent to the motor housing 198 is the base structure 204. Mounted upon the base structure 204 is a bearing housing 206 upon which the drive roller 192 is mounted. Extending through the drive roller 192 is a driven shaft 210 upon which a driven pulley 212 is mounted. The driven pulley 212 is connected to the synchronous drive pulley 202 through a drive belt 214.

Extending over the drive roller 192 and the idler roller 194 is a conveyor belt 218. The conveyor belt 218 supports and carries the drum wheel 106 from the input gate 126 to position it in the measurement system 226. It should be noted that the surface of the lower platen 108 in its down position and the belt surfaces of the input, output and reject conveyors 102, 112 and 114 have been arbitrarily designated datum "A". Datum "A" serves to provide a designated location on the leak detection apparatus 100 which is identifiable by the program controller. The position datum "A" is referenced throughout the leak detection apparatus and will be referred to periodically as the reference position.

A measurement subsystem 226 (FIG. 12) is employed for identifying the diameter of the wheel 106 under test. Thereafter, the diameter of the wheel under test is transmitted to the program controller 128 for use in positioning the input transport gripper arm 104.

After the wheel 106 has passed through the input gate 126 (FIG. 2), it is carried by the conveyor belt 218

(FIG. 4) until the wheel is positioned at the measurement subsystem 226 as is shown in FIG. 12. The V-shaped stop of the measurement subsystem 226 includes an optical sensor 230 located behind the stop vertex. Situated within the sensor 230 are six optically reflective switches depicted in FIG. 28. Extending from the housing of sensor 230 and through the vertex of the stop is a plunger 234 employed for engaging the wheel which is intercepted by the stop. The interception and engagement of the plunger signals the program controller to stop the drive of the input conveyor 102.

As the wheel enters the stop of the measurement subsystem 226, the plunger 234 is displaced into the optical sensor housing 230 and crosses at least one of a plurality of the reflective optical sensor switches. As the plunger crosses the optical sensors, the optical beam associated with that sensor is reflected back to that sensor's receiver which provides an indication of the diameter of the wheel 106. Therefore, the location of the center point of the wheel positioned within the guide 226 corresponds to the displacement of the plunger 234 providing an optical signal which is transmitted to the program controller 128 for providing directions to the input transport subsystem 116 during the test procedure. It is the signal associated with the displacement of the plunger 234 which is indicative of the diameter of the wheel which permits the program controller to direct the movement of the input gripper arm 104.

When the input transport gripper arm 104 (FIG. 2) is not in use, it is normally parked at a home position referred to as x-zero. The x-zero position automatically places the center of the input gripper arm 104 over the center of the largest wheel 106 accommodated by the leak detection apparatus 100. Since the diameter of the wheel has been measured by the measurement subsystem 226, the program controller 128 has sufficient information to locate the center of the wheel. The program controller then transmits a location signal to the input transport subsystem 116 for positioning the input gripper arm 104 over the center of the wheel. Thereafter, the input gripper arm captures and repositions the wheel to the lower platen 108.

Figure 6:
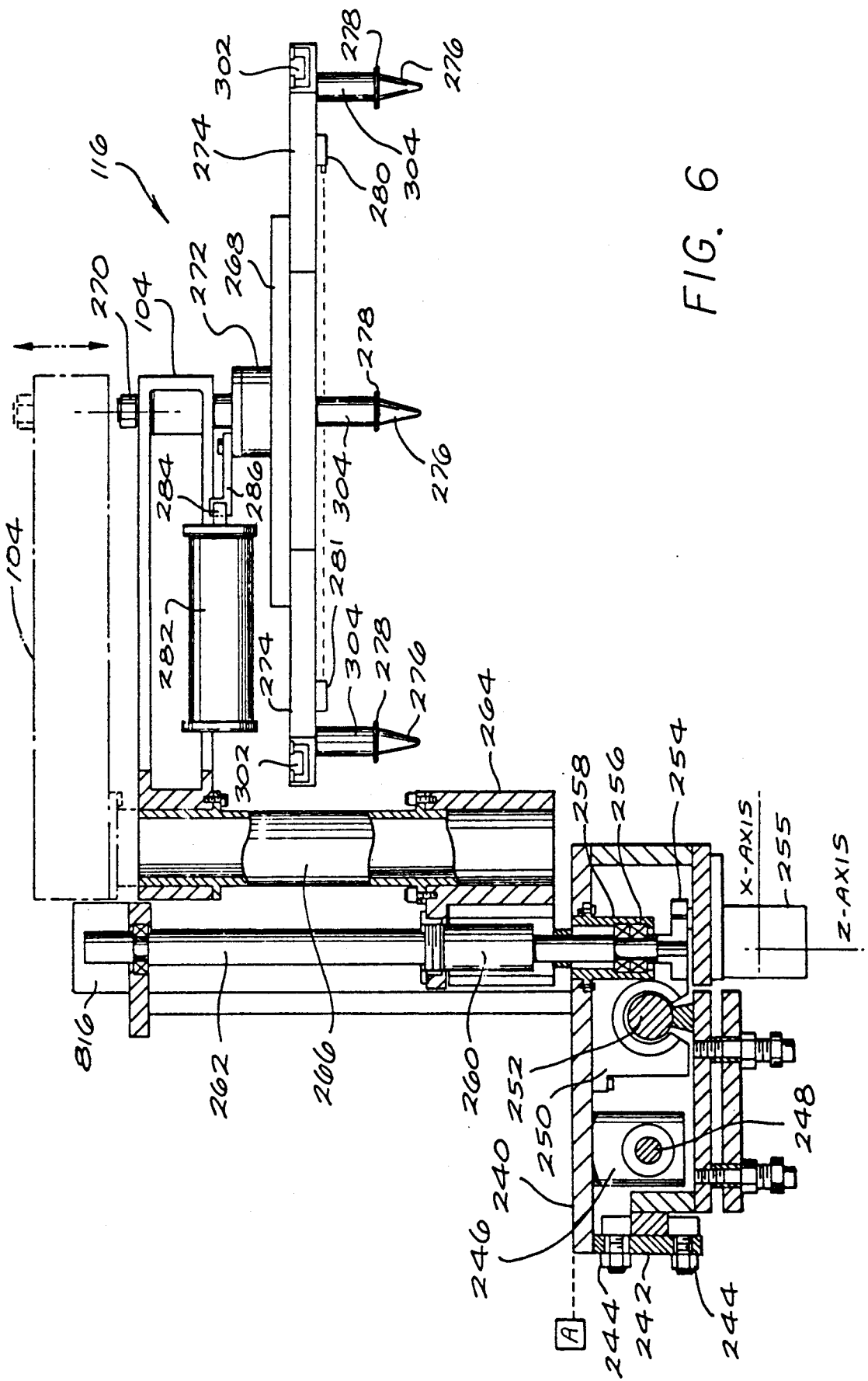
FIG. 6 is a fragmentary cross-sectional side view part in elevation of an input transport subassembly of the leak detection apparatus of FIG. 2.

FIG. 6 shows the structural support or carriage plate 240 utilized for carrying the input transport subsystem 116, the top of which is aligned with the reference level datum "A". The carriage plate 240 is mounted to a cam plate 242 by a plurality of mounting bolts. The input transport subsystem 116 is carried as the carriage plate 240 is driven along a parallel plane to datum "A". The entire carriage plate 240 is in mechanical communication with the ball screw nut assembly 246 associated with the drive screw 248, the function of which is to drive the carriage plate 240 along a horizontal direction as is more clearly shown in FIG. 12A. Adjacent to the ball screw assembly 246 is a linear guide assembly bearing 250 bolted to the carriage plate 240. As the ball screw assembly 246 moves, the linear guide 250 moves along a parallel guide shaft 252 support by rail. The linear guide assembly serves to improve the stability of the carriage plate as it moves along the drive screw 248. Both the cam plate 242 and the linear bearing 250 function to oppose any imbalance force of the input transport subsystem 116 by the input gripper arm 104 which is cantilevered over the wheel 106. Additionally, the linear bearing 250 serves to reduce friction on the rotational components of an X-axis carriage plate drive motor 253 schematically described in FIG. 29(B).

The forward position of the carriage plate 240 (shown in phantom on FIG. 12A) is the position assumed when the input gripper arm 104 is postured to seat the drum wheel 106 onto the lower platen 108. The X-axis drive motor 253 includes a plurality of encoder slots 810 for identifying the exact position of the carriage plate 240 along the drive screw 248.

During movement of the wheel 106 from the input conveyor 102 to the lower platen 108, the program controller 128 possesses the wheel measurement data in memory. Since the centerline position of the lower platen is known, the distance that the wheel must be moved is easily calculated. When the X-axis drive motor 253 begins to operate, the number of revolutions of the motor during movement of the carriage plate 240 are counted by the encoder 810. When the correct number of revolutions have occurred, the wheel 106 is in position over the lower platen 108.

Located along a Z-axis is a plurality of spur gears 254 (FIG. 6) of a D.C. Z-axis drive motor 255. Above the spur gears is a support bearing 256 located within a support housing 258 which is bolted to the carriage plate 240. Extending out of the support housing 258 is a Z-axis ball screw nut assembly 260 which surrounds a Z-axis ball screw 262. The ball screw 262 is rotationally operated by the spur gears 254 of the D.C. Z-axis motor 255 which causes the ball screw assembly 260 to translate along the ball screw 262 in a vertical direction. Therefore, the ball screw assembly can be vertically positioned along the ball screw 262 by controlling the operation of the D.C. Z-axis motor via encoder 812 revolution counts.

A yoke housing 264 (FIG. 12) is bolted to the ball screw assembly 260 and serves to support and carry a vertical riser 266 connected to the input gripper arm 104. Therefore, the yoke housing 264 and a vertical riser 266 move along the ball screw 262 with the ball screw assembly 260 during the operation of the spur gears 254. Further, a pair of vertical guide shafts 265, 267 (FIG. 12A) are positioned adjacent the ball screw 262 for maintaining alignment when the riser moves in the vertical direction.

The input gripper arm 104 is bolted to the vertical riser 266 at one end and carries a gripper assembly cam plate 268 bolted at the opposite end. A center shaft 270 is used to secure the gripper assembly cam plate 268 to the input gripper arm 104 at a spider arm hub 272 as is shown in FIG. 6. The spider arm hub 272 is physically connected to the gripper assembly cam plate 268 which includes a plurality of spider arms 274 extending therefrom for accommodating the size of the drum wheel 106 being tested. Extending below each of the spider arms 274 is a gripper pin 304 employed for contacting the drum wheel to be moved. Located along the bottom of each gripper pin 304 is a pin lip 278 which is employed for preventing the wheel from dropping upon the loss of air pressure. Further, mounted beneath a pair of the spider arms 274, is an optical (LED) transmitter 280 and an optical receiver 281, the function of which is to measure the height of the wheel being moved from the input conveyor 102 to the lower platen 108 and which will be described in more detail hereinafter.

Finally, an air cylinder 282 is mounted to the input gripper arm 104. The air cylinder 282 includes a center piston 284 which is caused to be extended or retracted by operation of the air cylinder 282. The center piston 284 is pivotally connected to the cam plate hub 272 by a clevis pin linkage 286. When the center piston 284 is caused to be extended from the air cylinder 282, the clevis pin linkage 286 causes the cam plate hub 272 and the gripper assembly cam plate 268 to operate in a rotational manner. The rotational operation of the cam plate 268 results in the extension of the gripper pins 304 outward while the withdrawal of the center piston 284 of the air cylinder 282 causes an opposite rotation of the cam plate 268 resulting in the contraction of the gripper pins 304 inward.

Associated with the cam plate 268 is a plurality of cam slots 288, each formed within the cam plate 268 as shown in FIG. 7. Each of the cam slots 288 is positioned with one end adjacent a center penetration 290 through the cam plate 268. The center penetration is surrounded by a collar or flange 292 employed for physically connecting the cam plate 268 to the cam plate hub 272 (FIG. 6). The opposite end of each of the cam slots 288 is physically positioned adjacent one of the spider arms 274. Thus, upon operation of the air cylinder resulting in an extension of the center piston 284, the cam plate 268 is caused to rotate.

A more detailed view of the operation of the cam plate 268 is provided in FIG. 9 which illustrates one of the plurality of spider arms 274 gripper pins 304 in the extended position. The center shaft 270 is shown extending through the bottom of the spider arm 274 and through the cam plate hub 272. The center shaft 270 is employed for securing the entire cam plate assembly in position and is secured by a nut 294. The cam plate 268 is shown bolted and fixed in position to the cam plate hub 272. Further, the spider arm 274 is shown engaged with one of the cam slots 288 by a cam follower 296.

Connected to each cam follower 296 is a slider 300 as is shown in FIGS. 7 and 8. The slider 300 rides in a slotted bearing seat 302 formed along the lengths of each spider arm 274 as is most clearly shown in FIG. 8. As the cam follower 296 moves along the cam slot 288 during operation of the air cylinder 282 (FIG. 6), the slider is permitted to position a gripper pin 304. Further, the slider 300 is supported by the spider arm 274 and the gripper pin 304 is threadedly connected as is shown in FIG. 9.

Along the length of the gripper pin 304, there is a soft material 298 employed for surrounding the pin 304 as is shown in FIG. 9. The purpose of the soft material is to provide high friction surfaces which engage against the drum wheel 106 when the gripper pins 304 are closed on the drum wheel. The soft material 298 also protects the drum wheel from being marred. The center penetration 290 formed within the cam plate 268 accommodates the center shaft 270. It is the air cylinder piston 284 which is connected by the clevis pin linkage 286 to the cam plate hub 272 which causes the cam plate 268 to be rotated through an angular displacement. The cam follower 296 is engaged within the cam slot 288. This construction permits the slider 300 to experience inward and outward movement when the cam plate 268 is driven by the center piston 284 of the air cylinder 282 through the cam plate hub. In one embodiment, the driven distances were on the order of three inches.

Figure 29A:
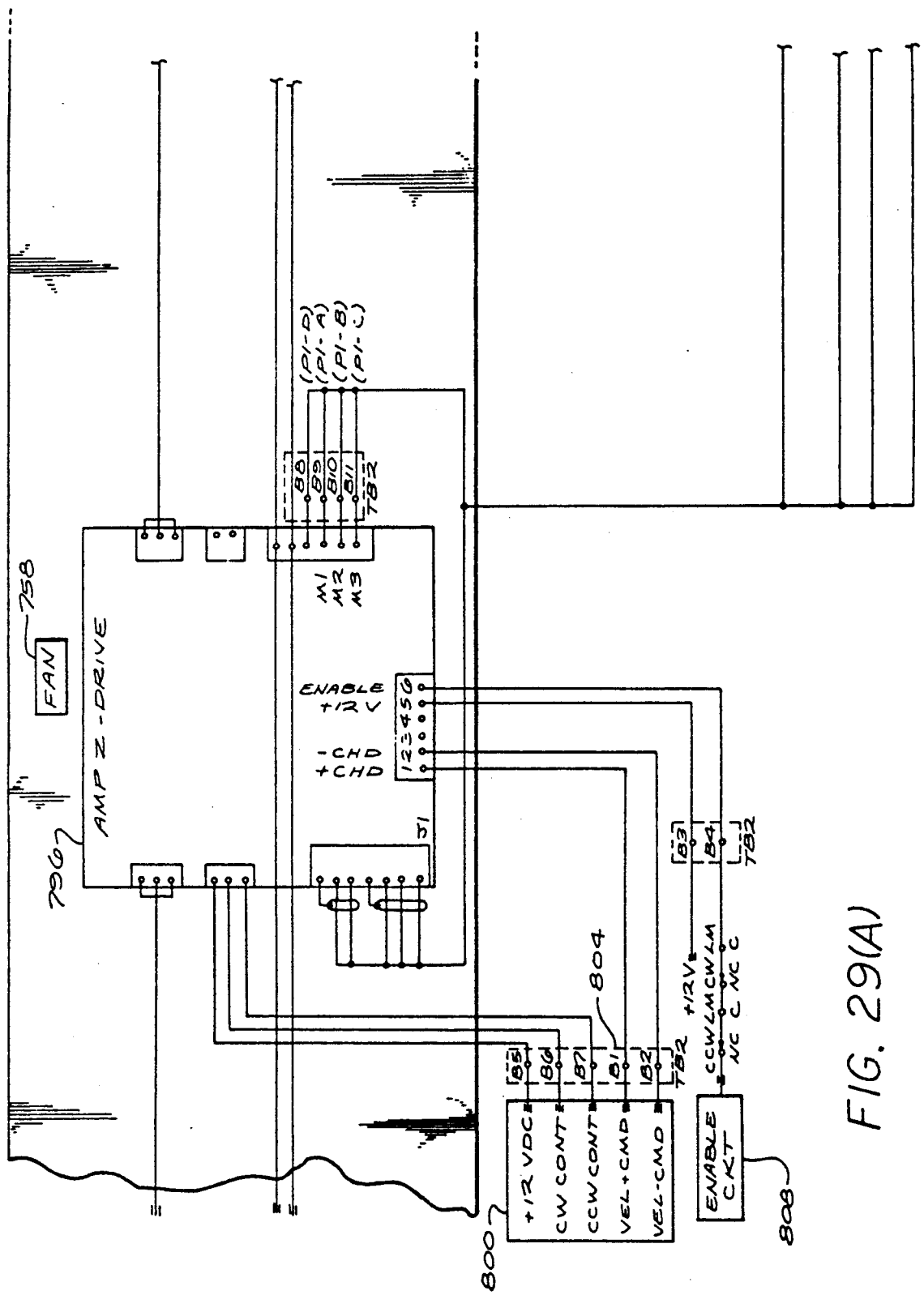
FIGS. 29A, 29B and 30 are input transport subsystem wiring diagrams of the leak detection apparatus of FIG. 2.
Figure 29B:
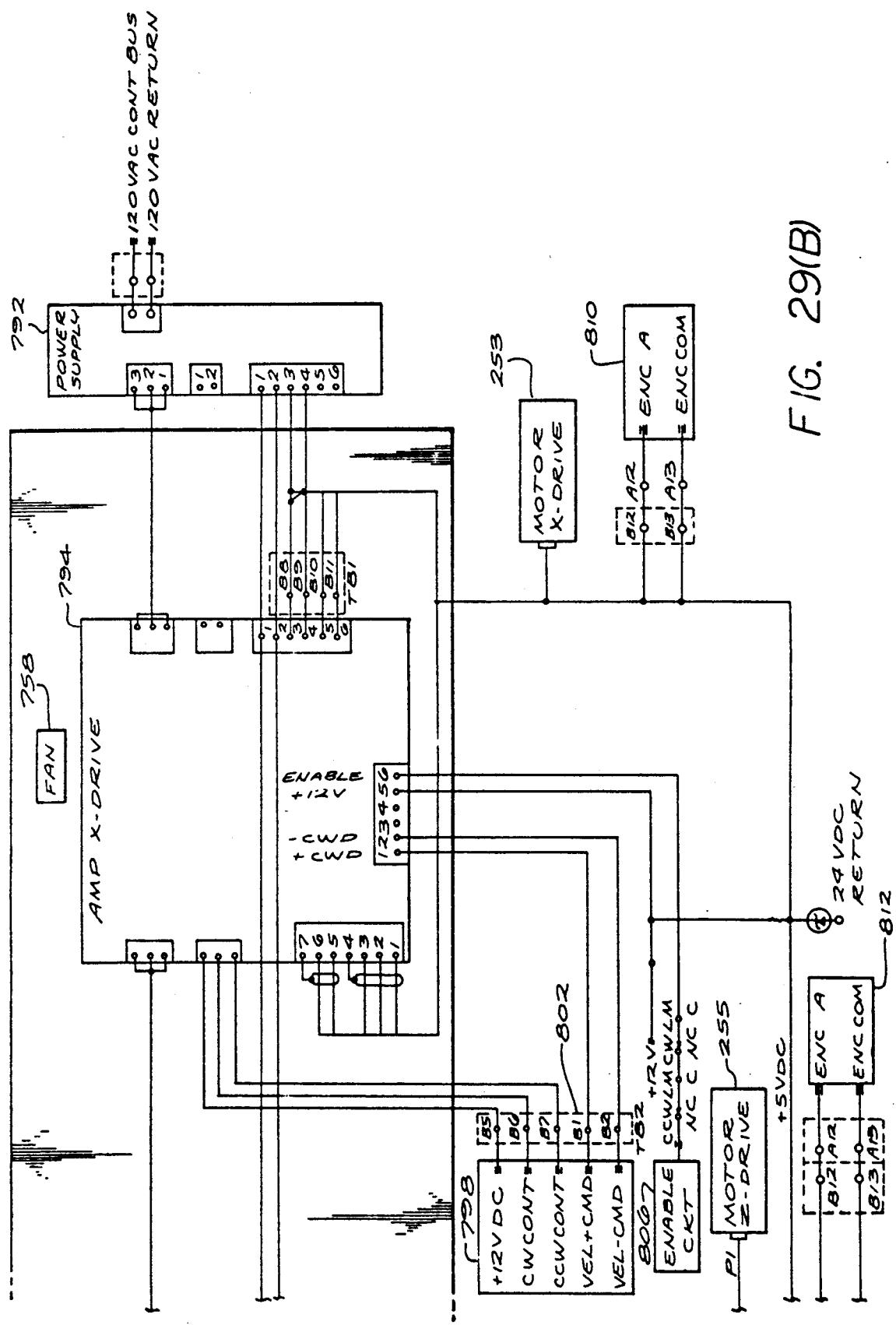

The fail safe switch feature designed into the input transport subsystem 116 and the output transport subsystem 118 comprises a pair of limit switches that are designed to stop the motors 253 and 255 (FIG. 29(B)) if a malfunction occurs. In total, there are eight limit switches with four each being associated with the input and output transport subsystems. Of these four limit switches, two each are associated with the horizontal (X-axis) travel of the carriage plate 240 while the final two each are associated with the vertical (Z-axis) travel of the input gripper arm 104. The switches associated with the X-axis travel of the carriage plate 240 of the input transport subsystem 116 will be discussed as exemplary models, the remaining switches being identical in construction and operation as shown in FIG. 10.

The purpose of any of a plurality of zero-position switches 312 shown in FIG. 11 is to provide a discrete signal that indicates that the input transport subsystem 116 is parked at a zero position after the input gripper arm 104 has delivered the wheel to the platen 108. To identify the zero position, a fixed point on the frame of the input transport subsystem is designated the "zero-position" which is the mounting position of the zero-position switch 312. This design permits the zero position to be designated on both the Z-axis and the X-axis. Thus, the transport subsystem 116 will repetitively locate the gripper arm 104 to a known position without reliance on the encoder slots 810 on the motor 253.

The zero-position switch 312 has a construction including an optical circuit 314 which has an optical transmitting diode and receiver circuit with an optical beam passing therebetween. In the Z-axis the zero position switch is mounted on the vertical support plate 315. Extending from the yoke assembly 264 in the Z-direction is a blade 316 which intercepts the optical beam. When movement to the zero position is reached as shown in FIG. 11, this signals the program controller 128 to de-energize the Z-axis drive motor 255 (FIG. 6). Likewise, the zero position switch associated with the X-direction is positioned on the carriage plate 240 and includes a blade that intercepts an optical beam extending between an optical transmitter and receiver mounted on the X-direction frame of the input transport subsystem 116.

If the zero position switch 312 should fail, one of a plurality of limit switches 318 (FIG. 10) is positioned in input transport subsystem 116 to de-energize the motors 253 and 255 (FIG. 29(B)). The limit switch 318 is a leaf-spring normally-open micro-switch having a leaf spring 320. In the Z-axis, the limit switch 318 is mounted on the vertical support plate 315 of the input transport subsystem 116 with an actuator arm 322 mounted on the yoke assembly 264. The actuator arm 322 travels with the yoke assembly 264 and intercepts the leaf spring 320 for signaling the program controller 128 to de-energize the Z-axis drive motor 255 (FIG. 6). A similar construction exists for the X-axis positions.

It is the function of the input gripper arm 104 to lift the wheel 106 out of the measurement subsystem guide 226 located at the end of the input conveyor 102 and to move the wheel to the center of the lower platen 108. It is also the function of the input transport gripper arm 104 to determine the height dimension of the wheel being tested. The optical transmitter 280 and optical receiver 281 (FIG. 6) operate to provide information as to the maximum height of the wheel being tested. The height data is then provided to the program controller 128 which is then employed for stopping the gripper 104 when lowering the wheel 106.

Before the wheel 106 is lifted from the input conveyor 102 to the lower platen 108, the input gripper arm 104 is parked at the X-zero home base position with the plurality of gripper pins 304 in the fully extended position for accommodating the largest size wheel. The diameter of the wheel has already been determined by measurement in the measuring subsystem. A signal from the program controller 128 directs the input gripper arm 104 to move over the center of the wheel 106 seated in the guide 226 on the input conveyor 102. Once positioned over the center of the wheel, the Z-axis drive motor 255 (FIG. 6) operates the spur gears 254 of the ball screw assembly 260 for lowering the input gripper arm 104 down over the wheel. When the gripper assembly cam plate 268 is lowered over the wheel, the highest point of the wheel eventually interrupts the optical beam between the LED transmitter 280 and the optical receiver 281. At that point, a signal is returned to the program controller 128 which de-energizes the Z-axis drive motor to stop the lowering of the input gripper arm 104.

The gripper pins 304 are always fully extended to permit grasping the largest size wheel. A signal is then received by the air cylinder 282 for rotating the cam plate 268 via displacement of the center piston 284 of the air cylinder. The air pressure causes a rotation of the cam plate which draws the sliders 300 inward along the spider arms 274 which permits the gripper pins 304 to grasp the wheel.

The input transport subsystem 116 is then directed to lift the wheel and reposition it onto the lower platen 108. Because the program controller 128 has received the diameter and height dimensions of the wheel being transported, the proper control signal can be delivered to the Z-axis drive motor 255 for controlling the lowering of the input gripper arm 104. Once the wheel is lowered onto the lower platen, a signal is provided for reversing the movement of the cam plate 268 which releases the sliders 300 and the gripper pins 304 which permits the gripper arm to be moved upward and away from the repositioned drum wheel. Thereafter, the input gripper arm 104 is returned to the x-zero or home base position to await a program signal directing the gripper arm to reposition the next wheel to be tested.

Figure 13:
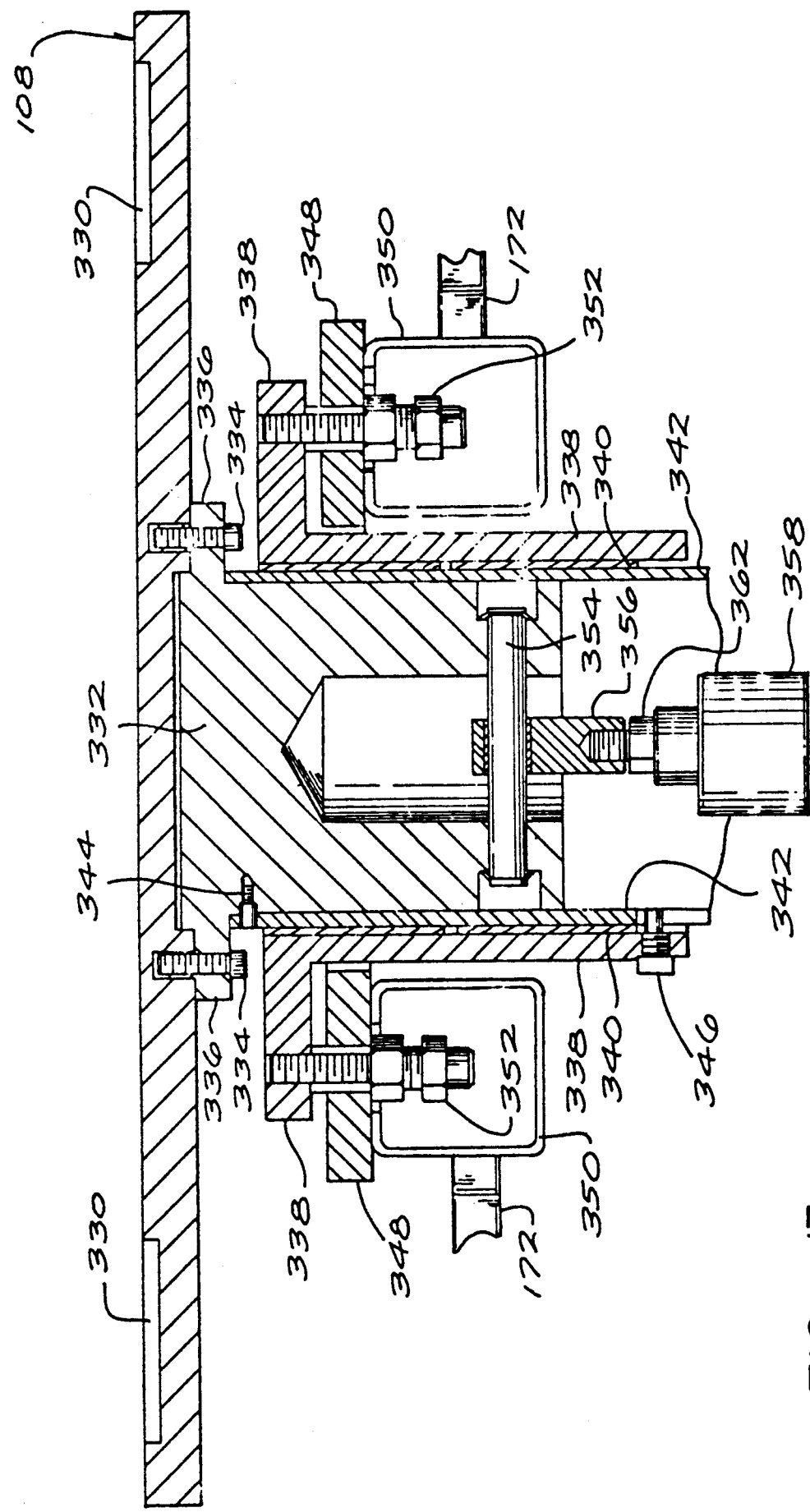
FIG. 13 is a cross-sectional view of the lower platen assembly of the leak detection apparatus of FIG. 2.
Figure 14:
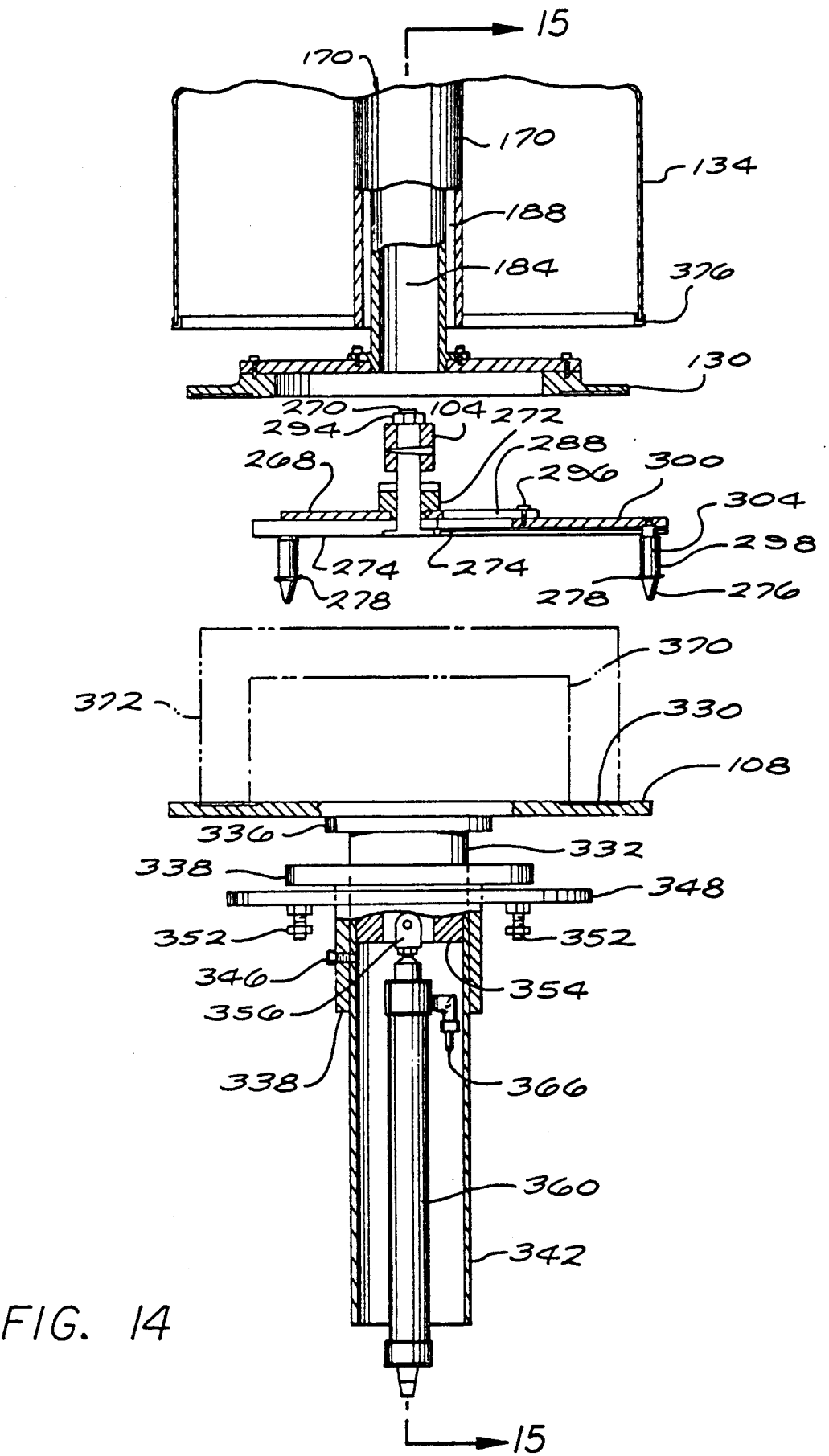
FIG. 14 is a cross-sectional view of the upper and lower platens and the bell jar enclosure of the leak detection apparatus of FIG. 2.

Referring now to FIGS. 13 and 14, the wheel has been positioned for being captured between the lower platen 108 and the upper platen 130. The top surface of the lower platen includes a wide form 330 which acts to seal the wheel to the lower platen. The wide form 330 has a dimension sufficiently wide to permit accommodating wheels having several different diameters. Thus, the wide form 330 can accommodate wheels having a minimum diameter and a minimum height and wheels having a maximum diameter and a maximum height as is shown by phantom lines 370, 372 in FIG. 14. Referring to FIG. 13, the lower platen is bolted or fastened to an air driven piston at bolts 334 along a flange 336. The bolts 334 enable the lower platen 108 to be removed from the air driven piston for periodically replacing the wide form 330 and for interchanging to a different diameter platen for use with objects of other sizes. The lower platen 108 is movable in the vertical direction by operation of the air driven piston 332. Referring again to FIG. 13, surrounding the air driven piston 332 is a bearing housing 338 which assists in the movement and guidance of the air driven piston. Secured between the bearing housing 338 and the air driven piston 332, is a sleeve bearing 340. Located between the sleeve bearing 340 and the air driven piston 332 is a bearing tube 342. The bearing tube 342 rides with the air driven piston in a vertical direction against the sleeve bearing 340. This stabilizes the vertical motion during up and down movement of the lower platen 108. A cam follower bolt 346 seats within a slot in the bearing tube 342 and guides the tube during movement. A plurality of fasteners or bolts 344 secure the bearing tube 342 to the air driven piston 332. The bearing housing 338 is supported by a plate 348 seated upon a main structural frame member 350 by a plurality of kinematic mounts 352 which allow for leveling adjustment of the lower platen. The primary function of the main structural frame member 350 is to provide support for the lower platen lift mechanism which includes the lower platen and the air driven piston 332.

Referring to FIG. 13, mounted horizontally within the air driven piston 332 is a clevis pin 354 which physically connects the air driven piston to a clevis 356. The clevis 356 functions to connect the air driven piston 332 to an air cylinder head 358 which is mechanically connected to an air cylinder 360 for acting as the lower platen lift mechanism as shown in FIG. 14. The clevis 356 is connected to the air cylinder head 358 through an attachment bolt.

During operation of the lower platen, the program controller 128 operates a relay which energizes a solenoid control valve to the air inlet line 366 of the air cylinder 360. The application of the pressurized air drives the piston 332 to a new vertical position for capturing the wheel 106 between the lower platen 108 and the upper stationary platen 130. Repositioning of the lower platen 108 may be acomplished by reversing the air pressure.

Figure 16:
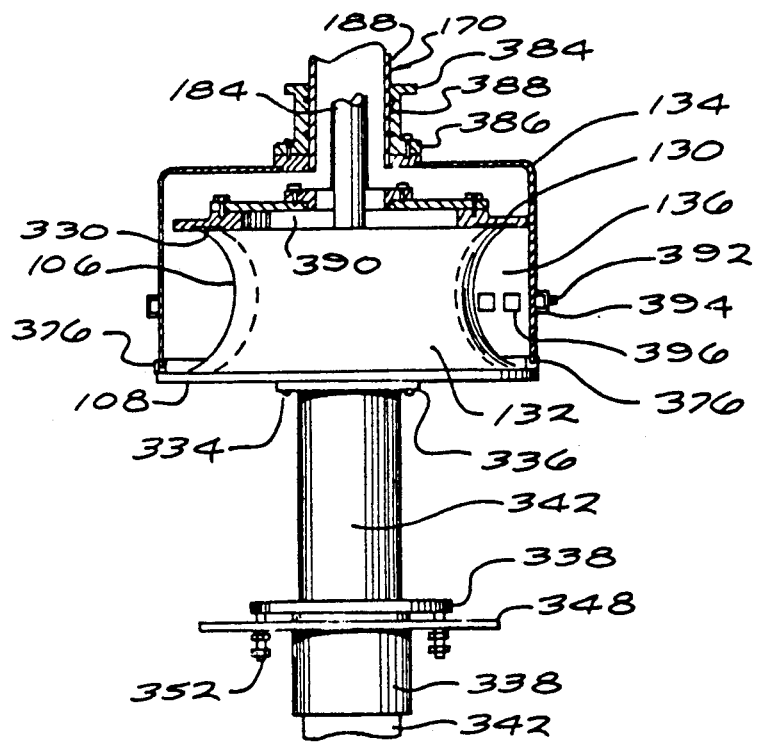
FIG. 16 is a fragmentary cross-sectional view partly in frontal elevation of an article mounted within the bell jar of the leak detection apparatus of FIG. 2.

The alignment between the lower platen 108, the input gripper arm 104, the upper stationary platen 130, and the bell jar 134 is shown in FIG. 14. The operation of the lower platen permits capturing the drum wheel between the lower platen and the upper platen for creating the inner chamber 132 (FIG. 16). The operation of the bell jar lift mechanism will be described hereinafter.

The coaxial vacuum line 170 is shown passing into the through the bell jar 134. It is the inner pipe 184 of the coaxial vacuum line that is employed for drawing a vacuum in the inner chamber 132 (FIG. 16) of the drum wheel through the upper stationary platen 130. The opposite end of the inner pipe 184 is directed to the roughing pump 186 through a roughing pump valve 374 (see FIG. 17). Located around the bottom perimeter of the bell jar 134 is a lip seal 376 which is utilized for achieving a gas tight seal between the bell jar and the outer perimeter of the lower platen 108.

Figure 15:
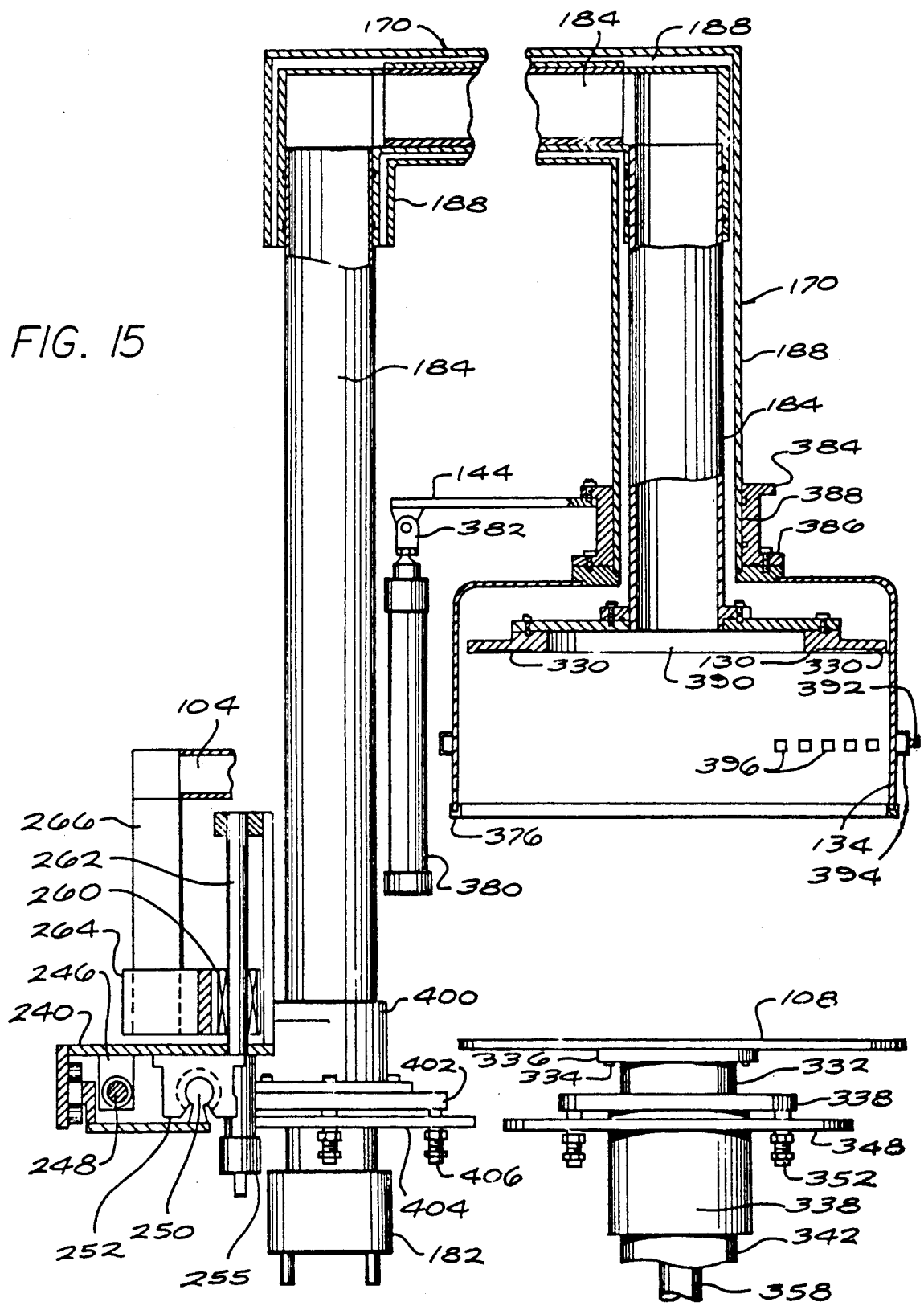
FIG. 15 is a cross-sectional view of the upper and lower platens including the coaxial vacuum lines and the bell jar enclosure of the leak detection apparatus taken along the line 15—15 of FIG. 14.

Referring now to FIG. 15, a view of the lower platen 108 in a somewhat elevated position and of the bell jar 134 lowered over the upper stationary platen 130 is shown. The bell jar is shown at approximately its lowest position with the bell jar lift arm 144 in a bottom position. The lift arm 144 is operated by a bell jar air cylinder 380. The air cylinder 380 is connected to the lift arm 144 by employing standard connective linkage such as a clevis and pin 382. The air cylinder 380 is utilized for driving the bell jar 134 up and down along the coaxial vacuum line 170. The lift arm 144 interfaces with the coaxial vacuum line at a slide bearing 384 in mechanical communication with the bell jar 134 along a flanged portion 386. Upon operation of the air cylinder 380, the slide bearing 384 will pass over the outer surface of the coaxial vacuum line 170 permitting the lift arm 144 to raise and lower the bell jar 134 over the drum wheel and the upper stationary platen 130. The slide bearing 384 may comprise sinter bronze for minimizing friction. A plurality of O-rings 388 are positioned between the slide bearing 384 and the coaxial vacuum line for minimizing vacuum loss.

Certain wheels include a decorative outward extending bump which must be accommodated during the leak detection process. Because the decorative outer portion of the wheel always faces away from the lower platen 108 and seals against the wide form 330 in the upper platen, the external surface of the wheel is spared from physical damage in addition to being properly sealed. Further, the high bump portion of the external surface of the wheel is accommodated by a recess 390 in the upper platen which provides additional space for such wheels.

Extending from the bell jar 134, is a pipe fitting inlet 392 which connects to a supply line for directing a supply of test gas such as helium into the bell jar 134. Connected to the pipe fitting inlet 392 is a circumferential manifold 394 for supplying helium to the outer chamber 136. Cut through the bell jar is a plurality of slotted openings 396 which are located underneath the manifold 394. The slotted openings 396 are employed for directing the helium supplied to the manifold directly into the outer chamber 136 (FIG. 16) of the bell jar.

Referring now to FIG. 16, the inner chamber 132 located within the volume of the drum wheel 106 between the lower platen 108 and the upper platen 130 is connected directly to the inner pipe 184. A higher vacuum resulting in a lower pressure is created in this line by sequential operation of roughing pump 186 and the molecular pump 434 (FIG. 17) for drawing any helium gas penetrating through the wheel from the outer enclosure 136 to the inner chamber 132 during the leak detection procedure. A partial vacuum of approximately 10 psi is drawn in the outer chamber 136 between the bell jar 134 and the outer surface of the wheel 106. One purpose of the partial vacuum in the outer enclosure is to permit an inrush of the helium test gas from the manifold 394 into the outer enclosure to support minimizing the time required to test the wheel.

Referring to FIG. 17, the outer pipe 188 of the coaxial vacuum line 170 is employed for purging the bell jar 134 of residual gas upon the termination of the testing procedure. The outer pipe 188 is connected directly to the purging pump 190 of the vacuum subsystem 138 through a purge valve 398. After the leak detection procedure has been completed but before the bell jar 134 has been lifted, the purge pump is engaged. It should be noted that the drawing of the vacuums in the various chambers, the operation of the lift arm 144 for raising and lowering the bell jar 134, and the feeding of the helium test gas through the manifold 394 is controlled by the program controller 128.

Referring to FIG. 15, the coaxial vacuum line 170 passes through a support base 400 which is bracketed to the structural frame 162 (FIG. 3) through a baseplate 402 mounted to a mounting plate 404 through a plurality of kinematic mounts 406. The coaxial vacuum line then terminates in the lower vacuum housing 182 as is shown in FIG. 15.

Figure 18:
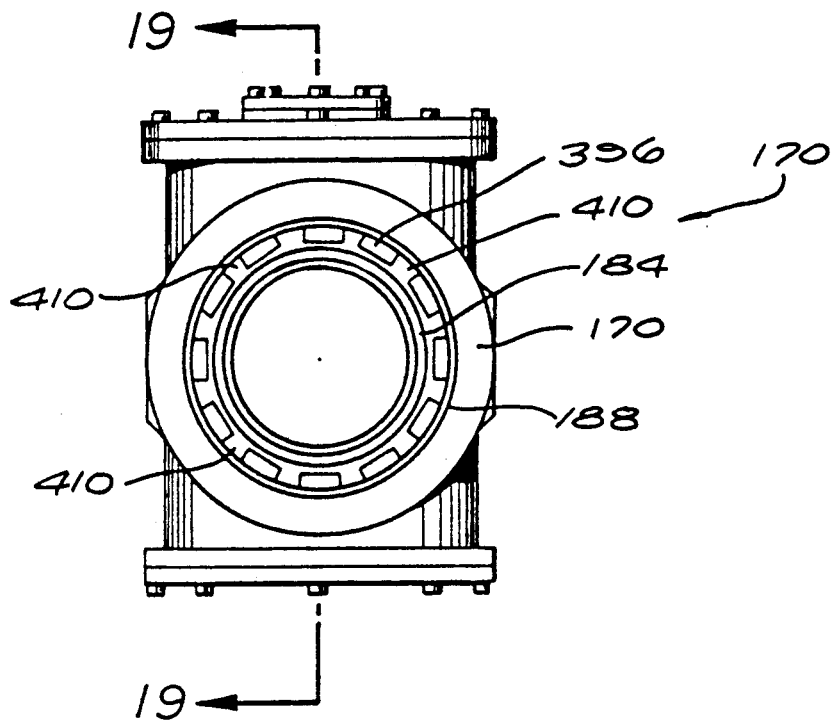
FIG. 18 is an elevational view of a coaxial vacuum line elbow utilized in the leak detection apparatus of FIG. 2.

The coaxial vacuum line 170 includes a pair of ninety degree bends as shown in FIG. 15. The internal construction of the coaxial vacuum line will now be discussed with reference to FIGS. 18 and 19. Each of the ninety degree bends form a coaxial pipe elbow 408 with the view in FIG. 19 being a cross section of that shown in FIG. 18. The cross-sectional view of the coaxial vacuum line 170 discloses the inner pipe 184 separated from the outer pipe 188 by a plurality of spider structures 410. Located between each of the spider structures 410 bounded by the inner pipe and the outer pipe are the plurality of slotted openings 396 which function to allow extraction of the test gas from the outer chamber 136 after the leak detection procedure has been completed. Further, the outer pipe 188 is concentric about the inner pipe with the outer pipe being in communication with the outer chamber 136 for purging the atmosphere under the bell jar 134 at the end of the leak detection procedure.

Figure 19:
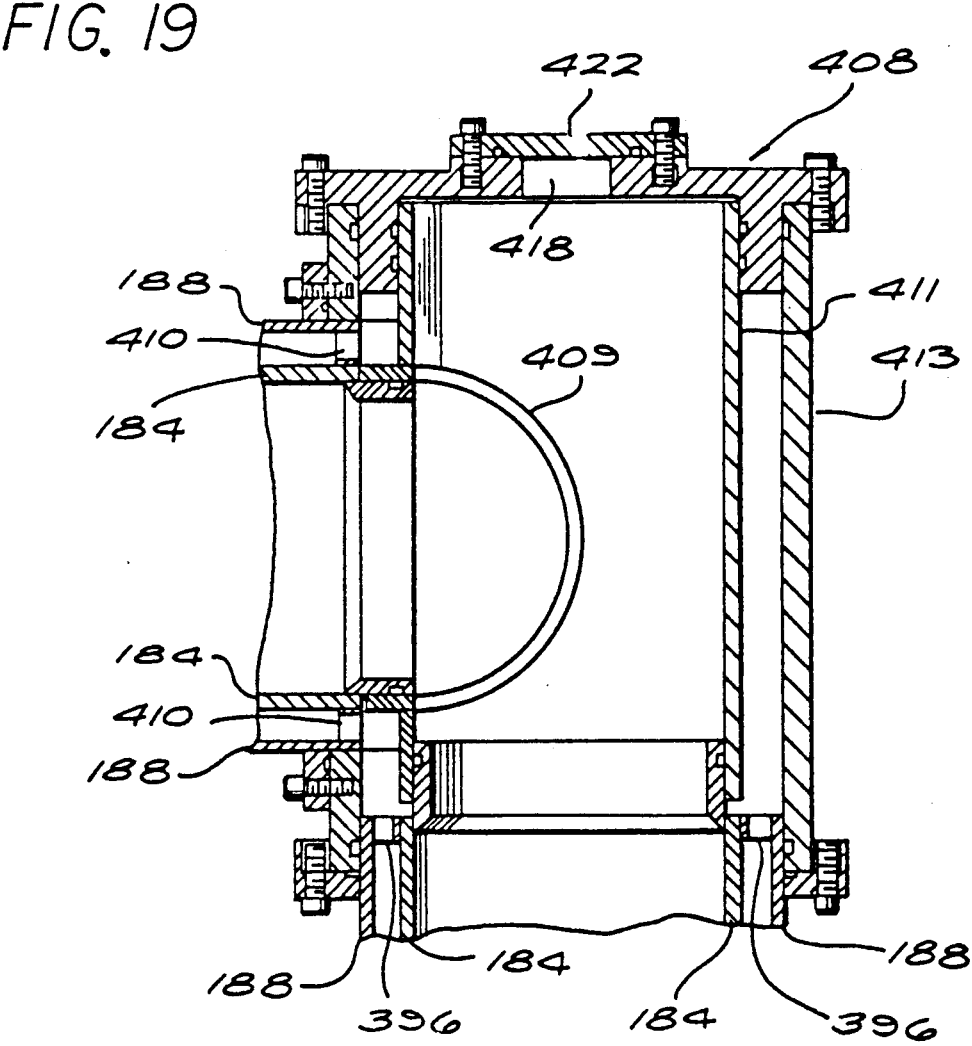
FIG. 19 is a cross-sectional view of the coaxial vacuum line elbow of the leak detection apparatus taken along the line 19—19 of FIG. 18.

Each of the coaxial pipe elbows 408 are constructed to form a pair of right-angled bends in the coaxial vacuum line 170 as is shown in FIG. 19. The inner pipe 184 is shown separated from the outer pipe 188 with the space therebetween acting as a conduit for passing the test gas. Mounted at the center of the elbow top cover 414 is a port 418 which is so disposed for receiving a collimating fixture used for alignment during installation and initial setup. When not in use, the port 418 is sealed off by a cover 422.

Further construction of the coaxial pipe elbow 408 includes an inner tube assembly 411 which forms the inner tube of the coaxial vacuum line 170 within the coaxial elbow. Likewise, an exterior portion of the elbow is formed by a housing pipe elbow 413. This construction creates a void between the inner tube assembly 411 and the housing pipe elbow 413 for passing the helium gas through the elbow 408 during the purging cycle.

Certain unique characteristics exist in the construction of the coaxial pipe elbow 408. In particular, similar constructions of the past have necessitated separate pipes each requiring a bellows for providing a flexing feature. However, the construction of the elbow 408 eliminates the necessity for a bellows, saves substantial space, and provides higher reliability for repetitive cycles.

Upon receiving the appropriate signals from the program controller 128, the lower platen 108 is raised and the bell jar air cylinder 380 controls the lift arm 144 to lower the bell jar 134 over the wheel 106 and to seat upon the lower platen forming the lip seal 376 (FIG. 16) with the lower platen 108. At that time, the bell jar reverses direction and accompanies the lower platen which continues to rise until the wheel 106 is sealed between the lower platen and the upper stationary platen 130 forming the inner chamber 132 as is shown in FIG. 16. Under these conditions, the leak detection apparatus 100 is postured to commence the leak detection test procedure.

The operation of the vacuum subsystem in creating the partial vacuums in the outer enclosure and inner chamber for the leak detection test will now be described in more detail in reference to FIG. 17. After the drum under test has been placed inside the bell jar and the inner chamber and the bell jar sealed, the vacuum system is engaged to create the partial vacuums in each of the two sealed areas. The purging pump 190 draws a predetermined amount of partial prevacuum under the outer enclosure 136 through the outer pipe 188 of the coaxial vacuum line 170 as indicated by the vacuum chamber gauge 428. At this point, the roughing pump valve 374 is opened for providing communication between the roughing pump 186 and the inner chamber 132 for drawing a partial vacuum therein. When a vacuum meter 430 registers a predetermined amount of vacuum, the roughing pump valve 374 leading to the roughing pump 186 is closed. Subsequently, the program controller 128 directs a signal energizing and opening a turbo pump valve 432. This action connects a turbo molecular pump 434 which is utilized to draw a vacuum within the inner chamber 132 at a faster rate to the prescribed leak test level. Associated with the turbo molecular pump 434 is a fore pump 436 which is utilized to assist the turbo molecular pump. The fore pump 436 has access to the turbo molecular pump 434 through a fore pump valve 438. It has been found that the use of a partial vacuum in the outer enclosure causes the test gas to be drawn into the outer enclosure at an increased rate over prior techniques thus supporting the increase in the speed of the leak testing process.

When the vacuum meter 430 registers a predetermined level, which is a higher partial vacuum than in the outer enclosure, the turbo pump valve 432 and the fore pump valve 438 each close and a detector valve 440 opens to a leak detector 442. The leak detector 442 may be any of a plurality of gas detection devices such as, for example, a mass spectrometer. Upon opening the detector valve 440, any test gas passing through imperfections in the wheel 106 is rapidly passed to the detector. Once the detector valve 440 is opened, the leak detector 442 is allowed approximately three to five seconds to stabilize to for eliminating faulty indications prior to reading the test data.

Located within the leak detector 442 is a small turbo molecular vacuum pump 444 which is utilized for drawing a sample of the atmosphere from the inner chamber 132 during the testing procedure. Once the leak detector 442 is stabilized and provides a constant reading on the detector meter, such a reading is returned to the program controller 128. The reading provided by the leak detector is referred to in a look-up table included within the data of the program controller. The look-up table includes data determinative of an acceptable leak rate for each size of wheel tested. For example, a medium sized wheel may have an allowable leak rate of 0.000025 cc/sec which translates into less than one-half psi leakage within a thirty day period. Typically, larger wheels have higher allowable leakage rates while smaller wheels have lower acceptable leakage rates. By comparing the actual reading from the leak detector 442 with the look-up table in memory, the program controller can determine whether the wheel has passed or failed the test.

Under these conditions, the leak detector 442 may be tested and calibrated periodically after a certain number of wheels have been tested or under the conditions when an abnormally high number of wheels have failed the test procedure. For calibration, a test sample valve 448 leads to a test calibration container 450 so that when the test sample valve 448 is opened, a known volume of sample gas is released to the leak detector 442.

Figure 25:
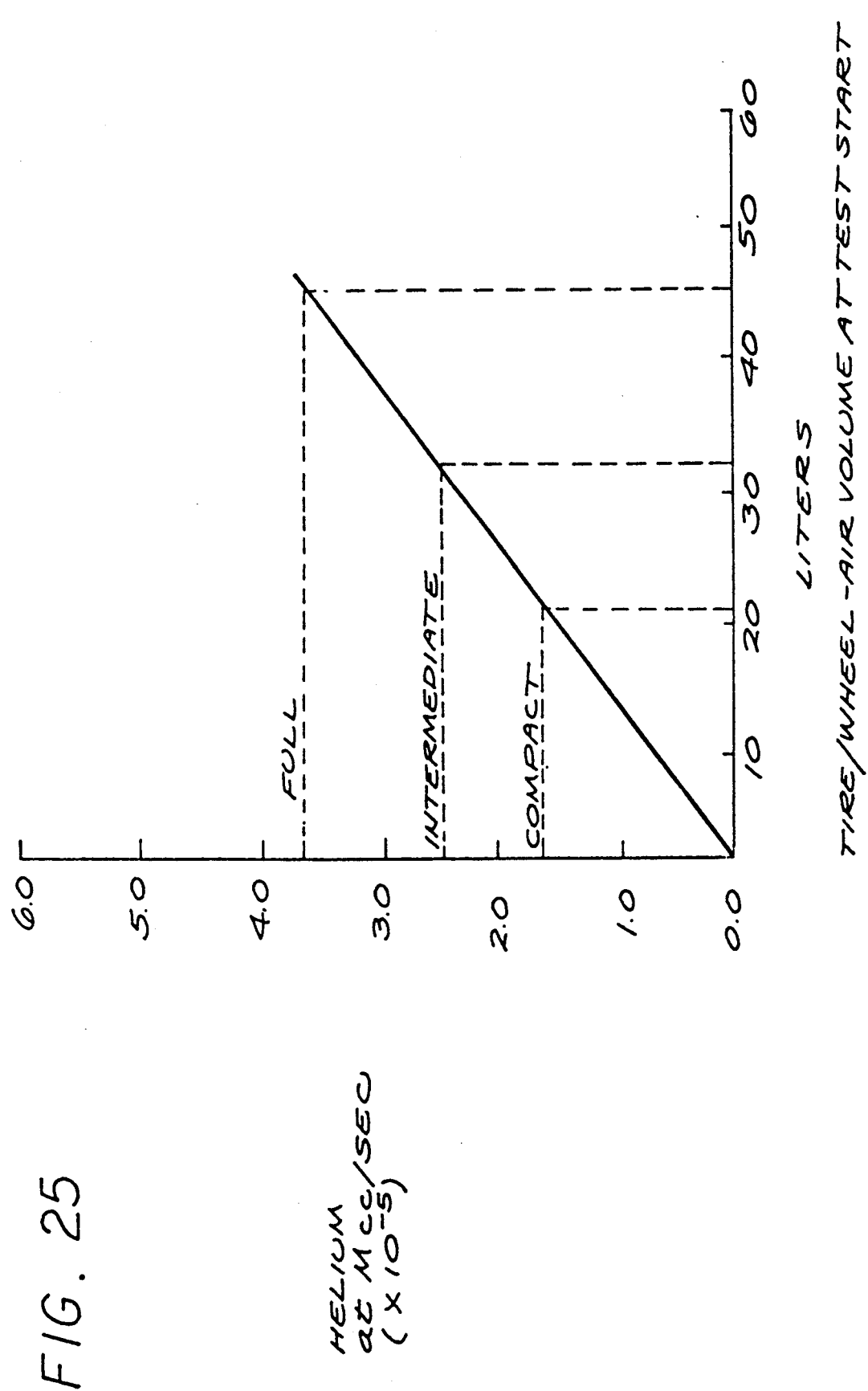
FIG. 25 is a graph showing the allowable helium leak rate versus the nominal volume of air contained in a tire/wheel for various size wheels.

An example of leakage acceptance requirements for cast aluminum wheels is given in an Equivalent Test Allowance Helium Leak Rate which permits the loss of one-half psi from the drum wheel 106 over a thirty-day period (FIG. 25). General wheel size categories which may be accommodated by the leak detection apparatus 100 include compact wheels having diameters of 12-13 inches, intermediate size wheels having diameters of 14-15 inches, and full size wheels having diameters of 15-17 inches. Gas law calculations presented in FIG. 25 show a linear relationship between the initial tire volume of pressurized air to the equivalent helium leak rate for a loss of tire pressure of 0.5 PSI over 30 days.

Upon the completion of the test procedure, a series of program controller 128 controlled operations then occur to control the vacuum subsystem 138. The pumps and detector valves are closed. Valve 398 is opened and the purge pump 190 is allowed to evacuate the residual helium remaining in the outer enclosure 136. The valve is closed when the vacuum pressure is re-established at 10 psi. Next the partial vacuums in both the outer enclosure 136 and the inner chamber 132 are released by opening vent valves 426 and 446 respectively to atmospheric pressure as shown in FIG. 17. This breaks the seals of the inner chamber 132 and outer enclosure 136 thus exposing them to the atmospheric environment. The vent valves 426 and 446 are closed and next the lower platen 108 is lowered.

The purging system is re-engaged to remove any remaining residual test gas in the coxial vacuum lines 170 and the manifolding leading the pump entries. This is accomplished by applying the purging pump 190 to the vacuum system by opening the purge valve 398. In one embodiment, the purging pump 190 had a capacity of 30 cubic feet per minute. The purging operation minimizes any opportunity for a tainted reading on the test of the next wheel. Because the environment within the inner chamber and its inner pipe is no longer sealed, it also is subjected to the effect of the purging pump.

It should be appreciated that the test gas purging operation of the leak detection apparatus 100 employs the coaxial vacuum line 170 which has a separate inner pipe for evacuation within the inner chamber 132 and the separate outer pipe 188 for evacuation of the outer chamber 136. This design provides for isolation between purging and testing and also provides for a faster cycling rate for testing the wheels. Further, test gas contamination is eliminated because the inner pipe 184 and the inner chamber 132 are both subjected to the purging operation conducted by the outer pipe 188 and the purging pump 190. The purging operation purges the entire system in one step.

Figure 20:
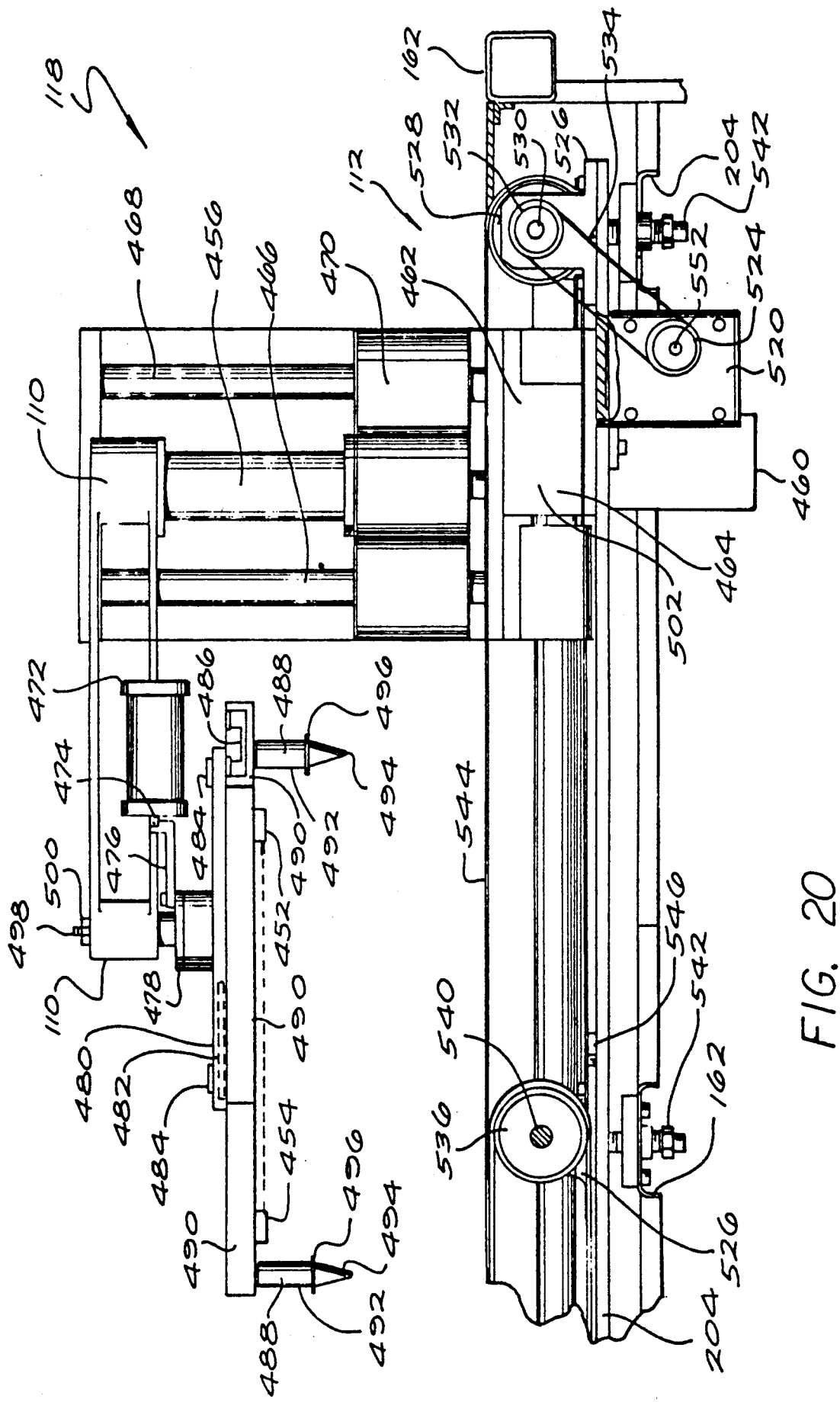
FIG. 20 is an elevational view of an output transport subsystem with an output conveyor of the leak detection apparatus of FIG. 2.

Referring now to FIG. 20, the output transport subsystem 118 is very similar to the input transport subsystem 116 previously described. The same features exist including a redundant optical transmitter 452 and optical receiver 454 having an optical beam extending therebetween. This feature, as in the input transport 116, is provided for determining the height of the wheel 106 and permits the output gripper arm 110 to be lowered over the drum wheel seated on the lower platen 108 without causing damage to the exterior surface of the drum wheel. This can also be accomplished by a signal being transmitted from the program controller 128 which indicates the height of the wheel under test. With this data, the program controller can provide the proper signal to direct the vertical encodered motor 460 of the output gripper arm 110 for avoiding damage to the wheel during the pick-up and the lowering procedure of the wheel onto the output conveyor 112.

Figure 12A:
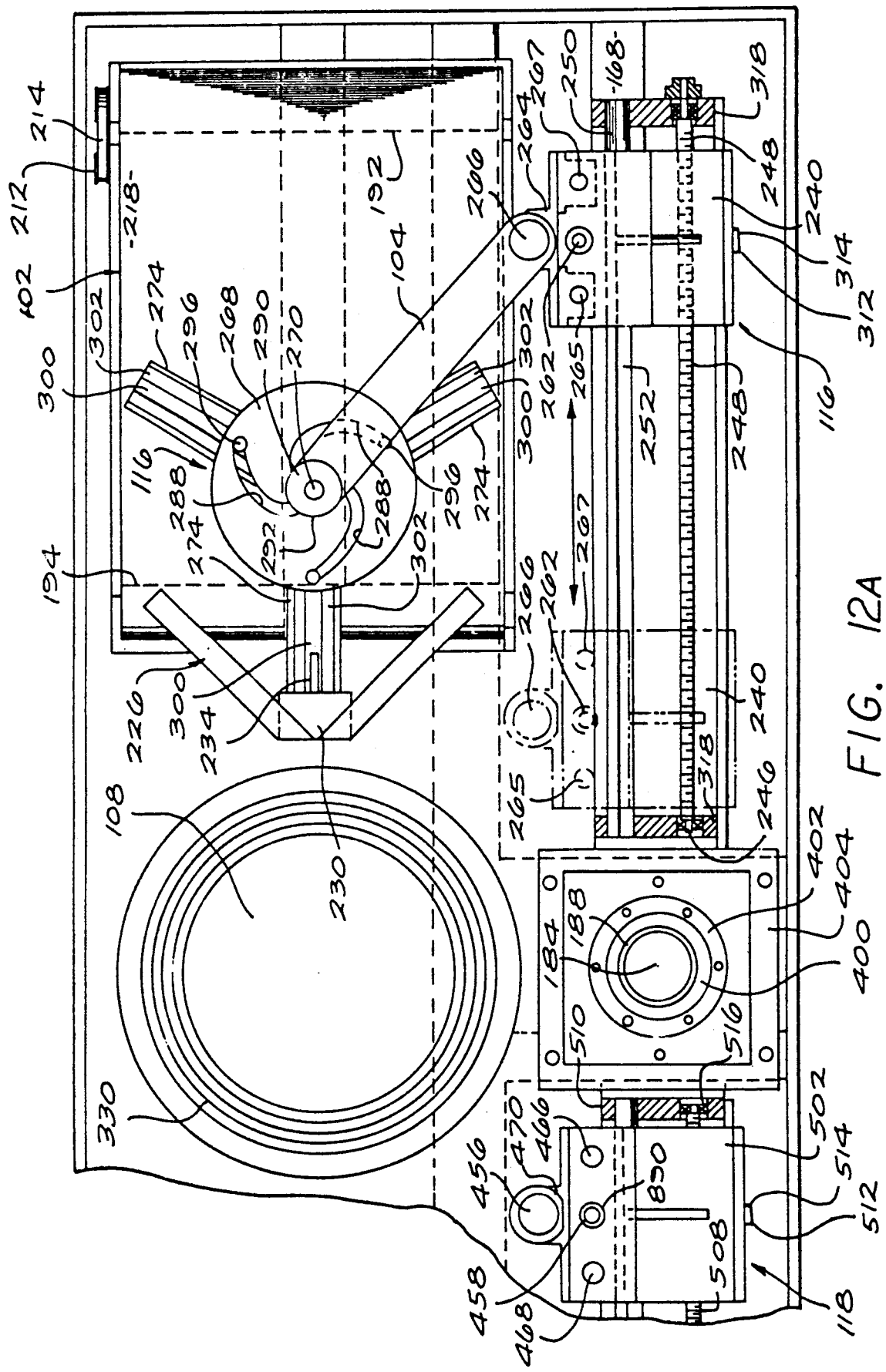
FIG. 12A is a planar view of the input subassemblies of the leak detection apparatus of FIG. 2.

Referring to FIG. 20, a vertical riser 456 extends above the output conveyor 112. The function of the vertical riser 456 is duplicate to that of the input gripper subsystem 116 in that the output gripper arm 110 is carried by the vertical riser 456 during the operation of a ball screw 458 (FIG. 12A). As shown in FIG. 12A, the ball screw 458 is located directly behind the vertical riser 456. The ball screw 458 is driven by a Z-axis motor 460 mounted to the bottom of the structure of the output transport subsystem 118. The Z-axis motor 460 in the output transport subsystem 118 is the same as the motor as used in the input transport subsystem 116. The Z-axis motor 460 is connected to the lead screw through a motor mounting block 462 which includes a plurality of spur gears 464 for transferring the rotational motion of the Z-axis motor 460 to the ball screw 458.

Mounted adjacent the ball screw 458 (FIG. 12A) and slightly behind the vertical riser 456 is a pair of guide shafts 466, 468 which are also employed for maintaining alignment when the vertical riser 456 moves in the vertical direction. It is the Z-axis motor 460 which operates the ball screw 458 which carries the vertical riser 456 along a vertical path. This is accomplished by mechanically connecting the ball screw to a yoke housing 470 so that the vertical riser moves in unison with the ball screw nut 260 (FIG. 6), the combination carrying the output gripper arm 110 therewith.

Referring again to FIG. 20, mounted at the top of the vertical riser 456 is the output gripper arm 110 and mounted to the gripper arm is an air cylinder 472. The air cylinder 472 is employed for providing a reciprocating motion to a center piston 474. Connected to the center piston is a clevis pin linkage 476 which is pivotally connected to a spider arm block 478. The spider arm block 478 is connected to a gripper arm cam plate 480 which includes a plurality of cam slots 482. At the end of each cam slot 482 is a cam follower 484 with each cam follower pin being connected to a slider 486 which permits the extension of a gripper pin 488 along one of a plurality of spider arms 490. Located on the external surface of the gripper pin 488 is a soft material 492 which is utilized for protecting the external surface when the drum wheel is grasped by the gripper pin 488. Mounted at the bottom of the gripper pin is a pin lip 496 which functions to catch the drum wheel upon the loss of cylinder air pressure. The output gripper arm 110 is secured to the spider arm block 478 by a center shaft 498 secured by a nut 500.

There are three spider arms each positioned at 120 degrees from the other which are employed for moving the gripper pins 488 toward and away from the drum wheel during the pick-up and release procedure. The air cylinder 472 is employed for rotating the cam plate 480 through an angular motion for causing the cam followers 484 to move along the cam slots 482. The air cylinder 472 is mounted to the gripper arm 110 and may include a plurality of support brackets (not shown). The operation of the center piston 474 of the air cylinder 472 causes the cam follower pins 484 to travel along the cam slots 482. Therefore the operation of the air cylinder controls the position of the sliders 486 and the gripper pins 488 for grasping any size drum wheel 106 completing the test.

The operation of the output transport subsystem 118 is duplicate to that of the input transport subsystem 116. The output transport subsystem is mounted on the structural frame 162, the top surface of which is in alignment with the identified position datum "A". Also mounted at that level is the output conveyor 112 which receives the drum wheel from the output transport subsystem 118 at the end of the leak detection procedure.

The translational motion provided to the output transport subsystem 118 is also duplicate to that described with reference to the input transport subsystem 116.

Referring now to FIG. 21, also included is an X-axis drive motor 518 for operating the drive screw 508 which is duplicate to the X-axis drive motor 253 associated with the input transport subsystem 116. Also included with the drive motor 518 is a plurality of encoder slots 876 as was explained with reference to the motor encoder 810 associated with the input transport subsystem 116. The position to which the carriage plate 502 moves permits the output transport subsystem 118 to position the drum wheel 106 on the output conveyor belt 544 is shown in FIG. 21. The carriage is shown in its zero or home position operated by the drive screw 508 which is driven by the X-axis drive motor 518.

There is included a limit switch 516 located at each end of the drive screw 508, each of which is employed for de-energizing the X-axis drive motor 518 corresponding to the X-axis drive motor 253 of the input transport subsystem 116. The limit switches 516 are employed as in the input transport subsystem to stop the motors 460 and 518 if a malfunction occurs.

Referring now to FIG. 20, the operation of the output conveyor 112 is duplicate to that of the input conveyor 102. Included is an output conveyor electric motor 520 which may be, for example, a 120 volt A. C. motor. The motor 520 has an output conveyor motor drive shaft 552 which is employed for driving a synchronous drive pulley 524. Mounted above the base structure 204 is a pair of bearing supports 526. The bearing supports 526 are employed for securing a drive roller 528 mounted upon a driven shaft 530. The driven shaft is operated by a driven pulley 532 which is caused to rotate by a drive belt 534 operated by the synchronous drive pulley 524.

Also included is an idler roller 536 mounted upon a pair of radial ball bearings 538 installed in the bearing supports 526. The idler roller 536 is driven through the movement of the conveyor belt 544 as it passes over the roller. The bearing supports 526 are secured to the base structure 204 by one of a plurality of kinematic mounts 542. Similarly, the input conveyor 102 mounts on a separate plurality of kinematic mounts as shown in FIG. 5. The conveyor belt 544 extends between the drive roller 528 and the idler roller 536, and is employed for transmitting the wheels 106 across the output conveyor 112. The conveyor belt 544 is aligned at the position datum "A".

Referring now to FIG. 21, the marker subsystem 146 includes a marking means, in one embodiment a pair of ink sprayer heads 548, 550. After testing, the marker subsystem 146 is used for marking the wheel, such as with a color code to indicate whether the wheel passed or failed the leak detection test. Having captured the wheel, the output gripper arm 110 positions the wheel before the ink sprayer heads 548, 550. The marker subsystem 146 may be positioned so that the wheel is still suspended above the output conveyor 112 by the output gripper arm. Likewise, the ink sprayer heads 548, 550 may be positioned so that the drum wheel must be seated on the output conveyor 112. In one embodiment, the color of ink indicates whether the wheel has passed or failed the leak detection test or has another status.

In one embodiment, the ink sprayer heads 548, 550 are pulse activated. During a pulse duration, the appropriate marker head sprays a spot of pressurized fast drying ink onto the wheel or article being tested. Because dual sprayer heads 548, 550 are being employed, the colors utilized can be selected to identify which leak detection apparatus 100 was employed to test the wheel at a particular plant site. The marker subsystem 146 is a generally available commercial product well known in the art.

Once the marker subsystem 146 has appropriately inked the wheel, the output conveyor 112 moves the tested wheel away from the marker subsystem 146

Figure 23:
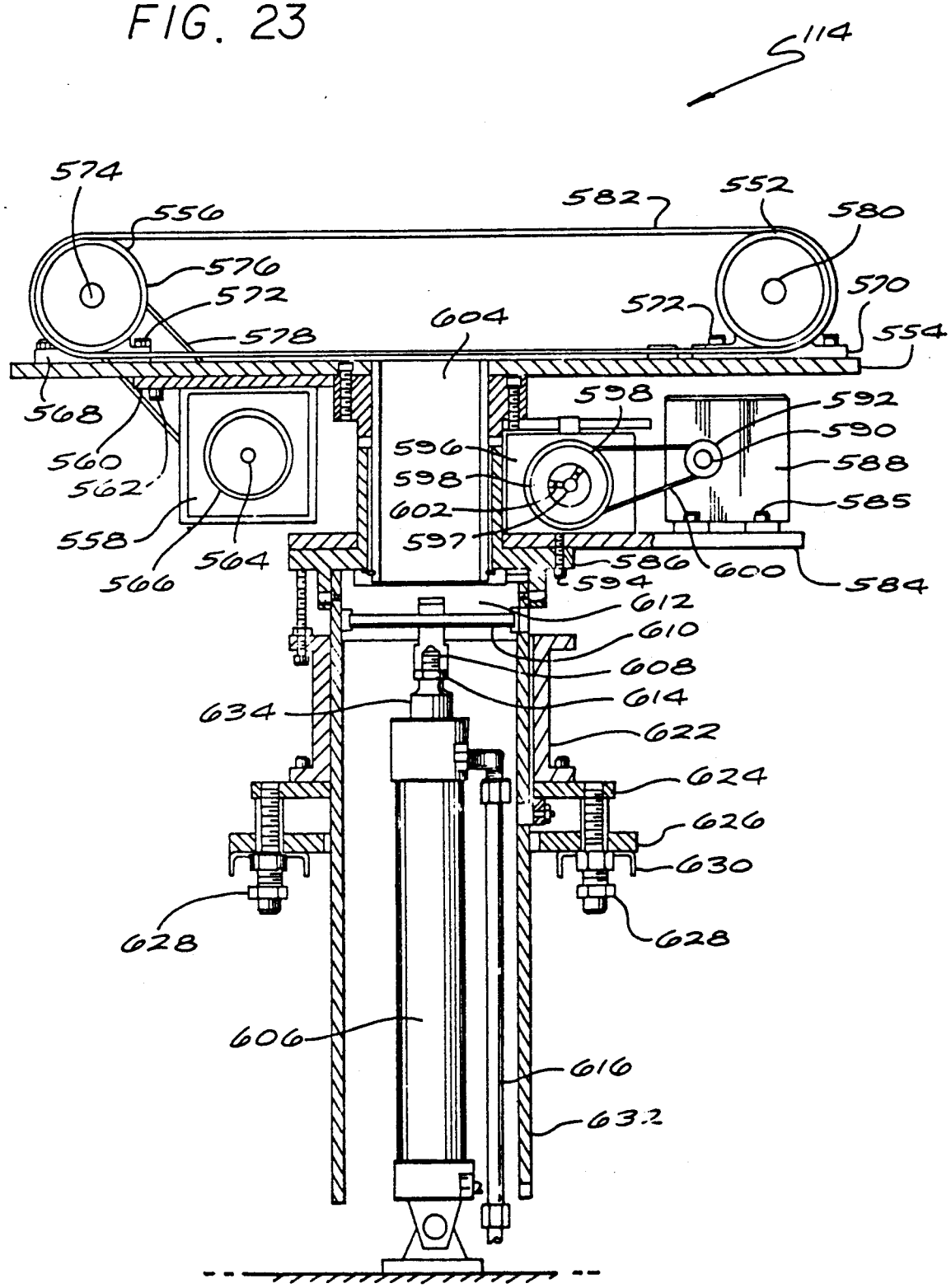
FIG. 23 is an elevational view of the reject conveyor subsystem of the leak detection apparatus of FIG. 2.
Figure 24:
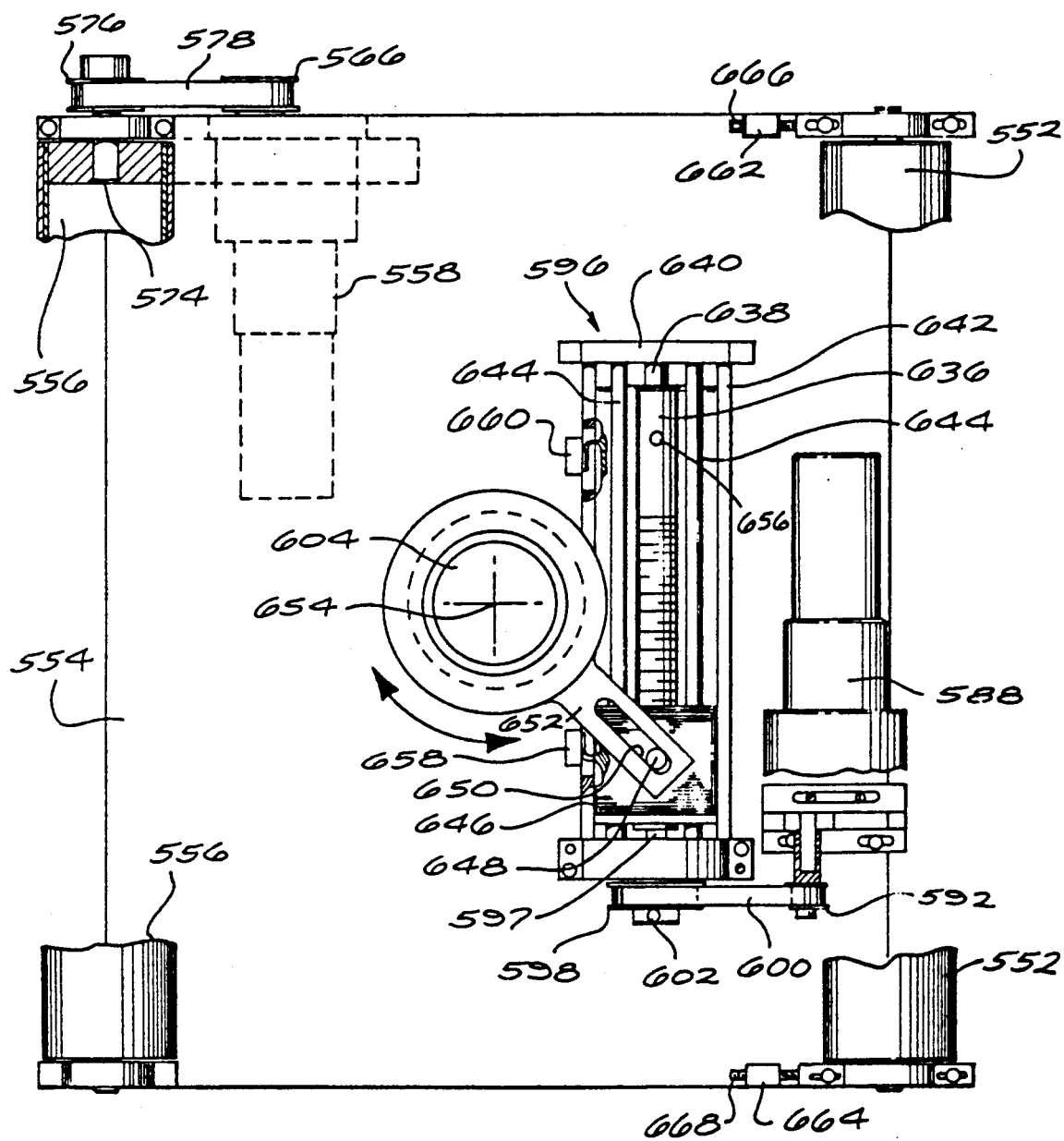
FIG. 24 is a planar view of the reject mechanism of the reject conveyor subsystem of the leak detection apparatus of FIG. 2.

(FIG. 2). Referring now to FIG. 22, once the wheel has been marked and is positioned on the output conveyor belt 544, the program controller 128 signals the output conveyor electric motor 520 to operate the drive roller 528. The wheel begins to move across the output conveyor and is directed to the reject conveyor 114 as is shown in FIG. 2. The reject conveyor is shown in FIGS. 22, 23 and 24. If the wheel has passed the leak detection test, the reject conveyor 114 operates in synchronism with the output conveyor 112 for driving the wheel directly to the manufacturing plant delivery system 120 (FIG. 2) which may forward it to the shipping department. However, if the wheel failed the leak detection test, the output conveyor 112 will move the wheel to the reject conveyor 114 at which time the output conveyor 112 will stop. Thereafter, the reject conveyor 114 will be operated to deviate the direction of the rejected wheel to another manufacturing operation as will be described hereinafter.

Once a rejected wheel leaves the output conveyor line 112, it is the function of the reject conveyor 114 to direct the rejected wheel. In one embodiment, when the rejected wheel reaches the center of a reject conveyor belt 582, the program controller 128 transmits a signal which terminates the movement of the reject conveyor belt. Upon receiving additional signals from the program controller, the reject conveyor is elevated, rotated ninety angular degrees, and then lowered into a position which is ninety degrees out of phase with the position used for forwarding wheels which passed the test. The reject conveyor belt 582 is then re-energized for driving the rejected wheel 106 onto another delivery line for rejected wheels. Thereafter, the reject conveyor platform 554 is elevated, rotated by ninety angular degrees in the opposite direction and lowered for permitting the platform to assume the original position. It should be noted that if the machine begins to reject too many wheels, a self test procedure will be initiated as will be described hereinafter.

The reject conveyor 114 also includes a drive roller 556 which is driven by a reject conveyor drive motor 558 best shown in FIG. 23. The motor 558 is mounted to the reject conveyor platform 554 by means of a mounting bracket 560 and a plurality of mechanical fasteners 562. The output of the drive motor 558 includes a drive shaft 564 with a drive pulley 566 mounted thereto. Secured to the top of the reject conveyor platform is a pair of roller bearing supports 568, 570 each being secured by a plurality of bolts 572. Mounted to the roller support 568 is the drive roller 556 while mounted to the roller support 570 is the idler roller 552. Extending through the center of the drive roller 556 is a roller axis 574 with a driven pulley 576 mounted thereto. Extending between the drive pulley 566 of the reject conveyor drive motor 558 and the driven pulley 576 of the drive roller 556 is a drive belt 578. Thus, the rotational motion produced by the drive motor 558 causes rotation in the drive roller 556.

Likewise, the idler roller 552 mounted on the roller bearing support 570 includes a roller axis 580. Wrapped about the idler roller 552 and drive roller 556 is a reject conveyor belt 582 which is employed for translating a wheel from the output conveyor 112 to either the plant delivery system 120 or to a reject conveyor line. The reject conveyor belt 582 carries the drum wheel 106 across the reject conveyor 114. The reject conveyor belt 582 is positioned in alignment with the program controller-identified position datum "A".

Mounted on top of a shelf 584 is a reject conveyor drive screw motor 588. The output of the drive screw motor 588 includes a drive shaft 590 having a drive pulley 592 mounted thereon. Also secured to the shelf 584 is a reject ball screw assembly 596. Mounted on the end of a ball screw extension 597 is a driven pulley 598 which is in mechanical communication with the drive pulley 592 of the drive screw motor 588 via a synchronous drive belt 600.

Positioned between the reject conveyor drive motor 558 and the reject ball screw assembly 596 is a center shaft 604 which is positioned directly beneath the reject conveyor platform 554. The center shaft is aligned within the support flange 586 and is mounted directly above an air cylinder 606 which is very similar to the air cylinder 360 associated with the lower platen 108. The air cylinder includes a clevis 608 employed for attaching the air cylinder 606 to a clevis pin 610.

Connected to the side of the air cylinder 606 is air inlet lines 616 which attach to a solenoid control valve 904 (FIG. 37) and position sensing switches 920 (FIG. 37), the function of each being similar to that described with reference to the air cylinder 360 of the lower platen 108. Surrounding the air cylinder is a flanged bearing assembly 622 secured to a baseplate 624 which in turn is secured to a mounting plate 626 by a plurality of kinematic mounts 628. The kinematic mounts fasten to the mounting plate which in turn mounts to a main structural frame member 630 which is a portion of the structural cabinet mounts of the structural frame 162.

After the rejection of a wheel 106 by the leak detection apparatus 100, the program controller 128 will provide a signal to the air cylinder solenoid control valve 904 which results in an air piston 634 being driven in the vertical direction a sufficient distance to permit the reject conveyor platform 554 to be rotated.

Because the reject ball screw assembly 596 is completely independent from the output conveyor 112, the reject conveyor platform 554 is free to be moved up and down along the vertical axis and the center shaft 604 may be operated by the air cylinder 606 for moving the platform as described. The reject ball screw assembly 596 and the drive screw motor 588 are shown in parallel alignment in FIG. 24. The output linkage of the drive screw motor 588 is directly connected to the drive pulley 592 which transmits rotary motion to the ball screw extension 597 via the driven pulley 598. The ball screw extension 597 is in direct communication with a ball screw 636. The ball screw terminates in a second ball screw extension 638 which is mounted in a bearing 640. Mounted within a ball screw assembly structural frame 642 is a pair of linear guides 644 which are employed for providing guidance and support to a ball screw carriage 646 which is mounted to and driven by the ball screw 636. Attached to the top of the ball screw carriage 646 is a cam follower 648 which is mounted in a cam slot 650 of a yoke 652 which is physically attached to the center shaft 604 as shown in FIG. 24. The center shaft is directly connected to the reject conveyor platform 554 and is rotated by the ball screw 636 through an angle of ninety degrees at a pivot point 654.

The function of the drive screw motor 588 is to drive the ball screw 636 for translating the ball screw carriage 646 from the first position of the cam follower 648 to a second position of the cam follower shown at point 656 in FIG. 24. Mounted along the ball screw structural frame 642 is a shutoff switch 658 utilized for de-energizing the drive screw motor 588 when the ball screw carriage 646 reaches the forward limit. Likewise, a ninety degree shutoff switch 660 is mounted on the rearward side of the ball screw structural frame 642 for de-energizing the drive screw motor 588 when the cam follower wheel 648 reaches the second position 656.

In those situations in which the drum wheel fails to pass the leak detection test, a signal is transmitted to the program controller 128 which first energizes the air cylinder 606 and then energizes the drive screw motor 588 for operating the ball screw 636. Upon energizing the drive screw motor, the drive pulley 592 causes the ball screw extension 597 to rotate through the driven pulley 598. The ball screw is caused to rotate which carries the ball screw carriage 646 there-with. The ball screw carriage travels across the length of the ball screw whereupon the yoke 652 is forced to rotate about the pivot point 654 and the center shaft 604 is forced to rotate by ninety degrees when the cam follower 648 extending above the ball screw carriage is caused to travel from the first position 648 to the second position 656 in the elevated position. This rotation of the center shaft causes the entire reject conveyor 114 to be rotated by ninety degrees after the air cylinder 606 has elevated the reject conveyor platform 554.

After the ninety degree rotation of the platform 554, another signal is received by the air cylinder 606 from the program controller 128 commanding the center shaft 604 to lower the reject conveyor platform 554 to the datum "A" position. At this point, the reject conveyor drive motor 558 is energized for operating the roller 556 which causes the reject conveyor belt 582 to drive the rejected drum wheel 106 to the rejected delivery system (not shown). When the rejected wheel 106 is driven off the reject conveyor belt 582, the reflective optical sensor associated with the reject conveyor 114 ceases to transmit a signal to the program controller 128. After a predetermined time delay, the program controller 128 signals for returning the reject conveyor 114 to the normal position. After the drum wheel has left the reject conveyor 114, the reject conveyor drive motor 558 is de-energized and the air cylinder 606 is actuated for lifting the reject conveyor platform 554 and the platform 554 is rotated 90 degrees back to its original position and lowered back into the datum "A" position.

Finally, a pair of belt tension mechanisms 662, 664 are located on opposite ends of the idler roller 552 for tracking alignment. The construction of the belt tension mechanisms is similar to that described with reference to the belt tension mechanism 222 of the input conveyor 102 as shown in FIG. 4. A pair of threaded members 666, 668 are utilized for adjusting the position of the tension mechanisms 662, 664 for maintaining maximum efficiency of the reject conveyor 114.

Referring now to FIG. 2, the program logic controller 128 is located in the connection cabinet 158 behind the touch screen display monitor 150. In one embodiment, the controller 128 has an input/output port to serve as an interfacing means with computers located elsewhere in the manufacturing plant. The main function of the program controller 128 is to control the distribution of instructions from the computer memory to the various operational elements of the leak detection apparatus 100.

In one embodiment, a multitude of relay closures are provided, the operation of which are controlled by the program controller. In this embodiment, the distribution of instructions to the leak detection apparatus is controlled by the opening and closing of, for example, solid state relays. A flow chart of the computer program used in the preferred embodiment is given in FIGS. 38A, 38B, 38C, and 38D. The program controller is a computer manufacturer/vendor supplied product. The program controller used in one embodiment was the Siemens S5-115U Programmable Controller. In a particular embodiment, a user interface with the system 100 is available through a display monitor 150 mounted atop the support plate 152 as is shown in FIG. 2. The monitor may comprise any type of display means including an industrial display cathode ray tube incorporating a touch panel 680. By physically touching designated locations on the touch panel 680, the operator can access a computer menu which provides information on the status, maintenance, trouble shooting and various other aspects of the leak detection apparatus. A keyboard may be used in place of or with the touch screen apparatus.

The embodiment shown in FIG. 2 also includes a rotating signal light 684 and a horn 686. The combination of the rotating signal light and the horn is designed to attract the attention of the responsible personnel. Because the information storage portion of the program controller 128 includes a maintenance procedure scheduled for completion after a certain number of hours of operation, the signal light and horn may be used as a reminder that maintenance is required. Further, the signal light 684 and the horn 686 may also be used to attract the attention of the responsible personnel during a malfunction condition or in the situation when a predetermined number of test items have been rejected by the leak detection apparatus.

Figure 26:
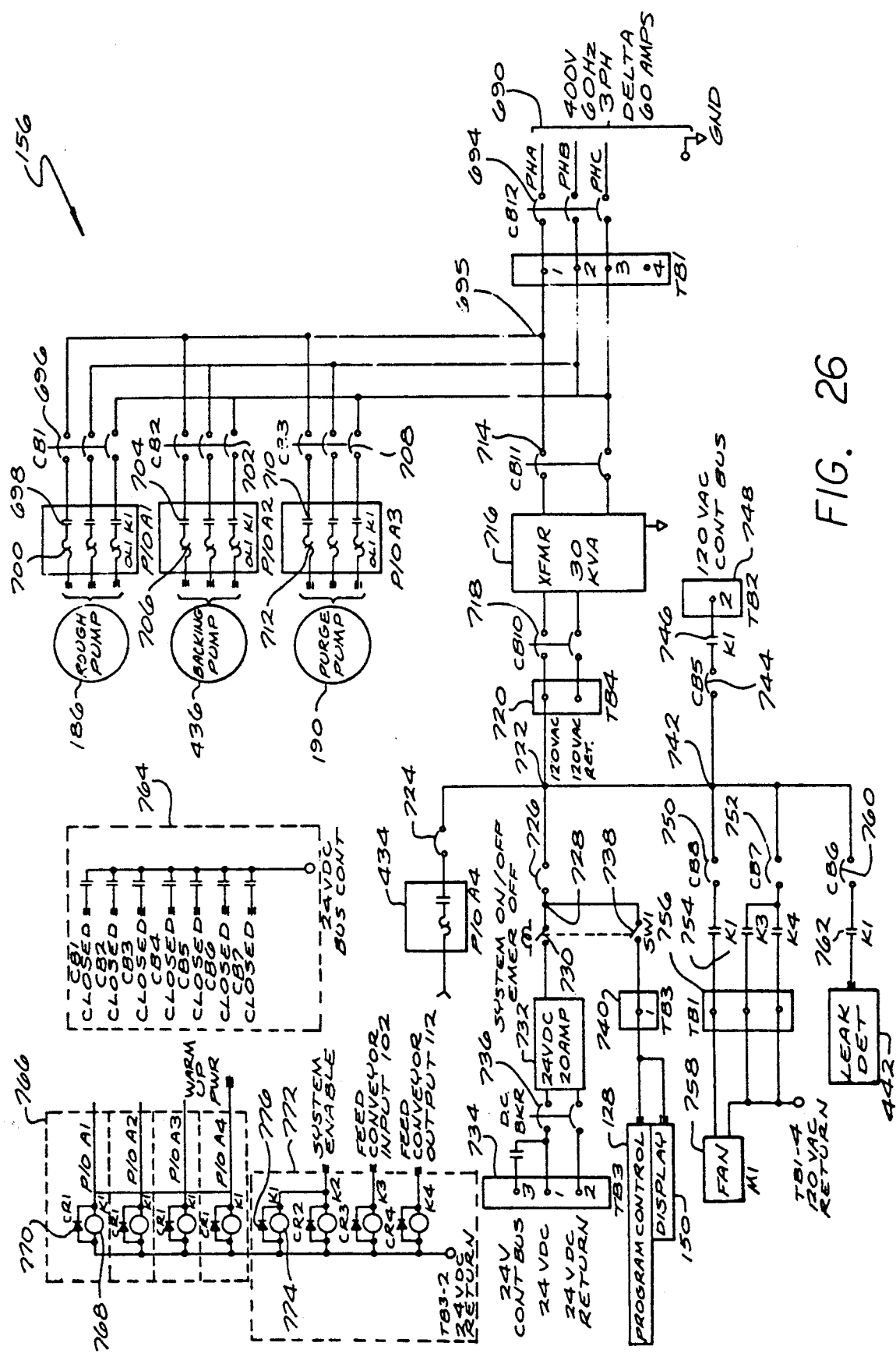
FIG. 26 is a high level power distribution circuit diagram of the leak detection apparatus of FIG. 2.

The power distribution subsystem 156 provides the general electrical power distribution system for the leak detection apparatus 100. In one embodiment, three-phase electrical power is drawn from a main distribution line at a point 690 as is shown in FIG. 26. The voltage level is a nominal 480 volt AC, three-phase. As will be described hereinafter, industrial power transformers are employed for stepping down the 480 volt AC power to 120 volt AC power for the operation of various components of the leak detection apparatus. Further, a portion of the 120 volt AC power is converted to 24 volt DC power for the operation of servo-processor and control equipment. The 120 volt AC and the 24 volt DC are provided throughout the leak detection apparatus as is shown in FIGS. 26-37. The input power received at point 690 is transmitted through a terminal board 692 through a three-phase circuit breaker 694. Downstream of the terminal board 692 is a tap-off point 695. Connected through the tap-off point 695 is a plurality of electrical pumps which are operated at 480 volts AC. The roughing pump 186 is connected to the input power through a circuit breaker 696 which passes three-phase electrical power through a main line contactor 698 and an overload thermally actuated switch 700.

The fore pump 436 associated with the turbomolecular pump 434 is also connected to the input power through a circuit breaker 702, a three-phase contactor 704 and an overload thermally actuated switch 706. Finally, the purging pump 190 is connected to the 480 volt AC three phase distribution line through a circuit breaker 708, a three-phase contactor 710, and an overload thermally actuated switch 712.

Beyond tap-off point 695, phase B is discontinued and the remaining two phases at 480 volts AC, single phase, is passed through circuit breaker 714 and to a transformer 716 which steps down the 480 volt AC single phase power to nominally 120 volt AC single phase power. The downstream side of the transformer is protected by a circuit breaker 718 upon which the two wire, single-phase power passes to a terminal board 720. One side of the line terminates in terminal board 720 to form the 120 volt AC return line while the other line passes through to a junction point 722. The junction point 722 permits the power to be divided and transmitted into a plurality of directions.

Connected to the junction point 722 is a circuit breaker 724 which leads to the turbomolecular pump 434. Also connected to the junction point 722 is a circuit breaker 726 which leads to a junction point 728. Beyond the junction point 728 the power splits in two directions. Following the first direction, a system on-off switch 730 is positioned within the circuit for providing an on-off switch to a power converter 732 which functions to reduce the 120 volt AC power to 24 volt DC power. The power converter 732 is separated from a 24-volt DC terminal board 734 by a circuit breaker 736. The terminal board 734 provides a 24 volt DC continuous buss and a 24 volt DC return line for distribution throughout the leak detection apparatus 100.

Following the second direction from the junction point 728, a switch 738 leads the circuit to a terminal board 740. The switch 738 is mechanically interlocked to the system on-off switch 730 which also serves as an emergency local disconnect switch. The terminal board 740 is connected to both the program control of the program controller 128 and to touch screen display monitor 150.

Also connected to the junction point 722 is another junction point 742 which permits the electrical power to be divided in several directions. In a first direction, the junction point 742 is connected to a circuit breaker 744 and to a relay contact 746 leading to a terminal board 748. The terminal board provides a 120 volt AC continuous buss for distribution throughout the leak detection apparatus 100.

The junction point 742 also leads to a pair of circuit breakers 750, 752 each which pass through a plurality of contacts 754 which lead to a terminal board 756. The output of the terminal board feeds a plurality of electrical fans 758 which act as cooling fans for the overall leak detection apparatus. Physically, the fans 758 are located within the cabinets 172 drawing air from outside the leak detection apparatus for cooling electrical and electronic components and other elements of the leak detection apparatus. The fans 758 are also connected to the 120 volt AC line. The junction point 742 is finally connected to the leak detector 442 via a circuit breaker 760 and a contact 762.

Also included is a plurality of relay closures 764 which are operated when a command is received from the program controller 128 and which supply 24 volts DC to various components. The relay closures are shown in FIG. 26 as being connected to the 24 volt DC continuous buss. Also included is a plurality of relay contactors 766 with each relay contactor including a contact coil 768 in parallel with a suppression diode 770 to prevent damage to the contact coil. The function of the relay contactor 766 is to provide initial energizing and warming up of the major pumps with each contact coil 768 providing electrical power to the respective pumps which include the roughing pump 186, the backing pump 436, the purging pump 190, and the turbomolecular pump 434. Also included is a plurality of relay closures 772 each of which provide 24 volt DC power to system enable circuitry, the input conveyor 102 and the output conveyor 112. Each of the relay closures 772 also includes a contact coil 774 having a corresponding suppression diode 776 for preventing damage to the coil.

Referring now to FIG. 27, an electrical circuit which includes a solenoid 780 is employed for operating the input gate 126. Upon initially energizing the machine at the beginning of a work day, electrical power is applied through operator inputs to the touch screen monitor 150. The program controller directs input signals to the various subsystems of the leak detection apparatus 100. However, once the leak detection apparatus 100 is in operation, the power supplied, for example to the solenoid 780 for operating the input gate 126, is provided through relay contacts in the program controller signalled from the output transport subsystem 118. The output of the motor control terminal board 784 is connected to the input conveyor electric motor 196 which operates the input conveyor 102 for driving the input conveyor belt 218 as is shown in FIG. 27. Terminal board 784 is also connected to the 120 volt AC return line and to electrical ground.

Figure 28:
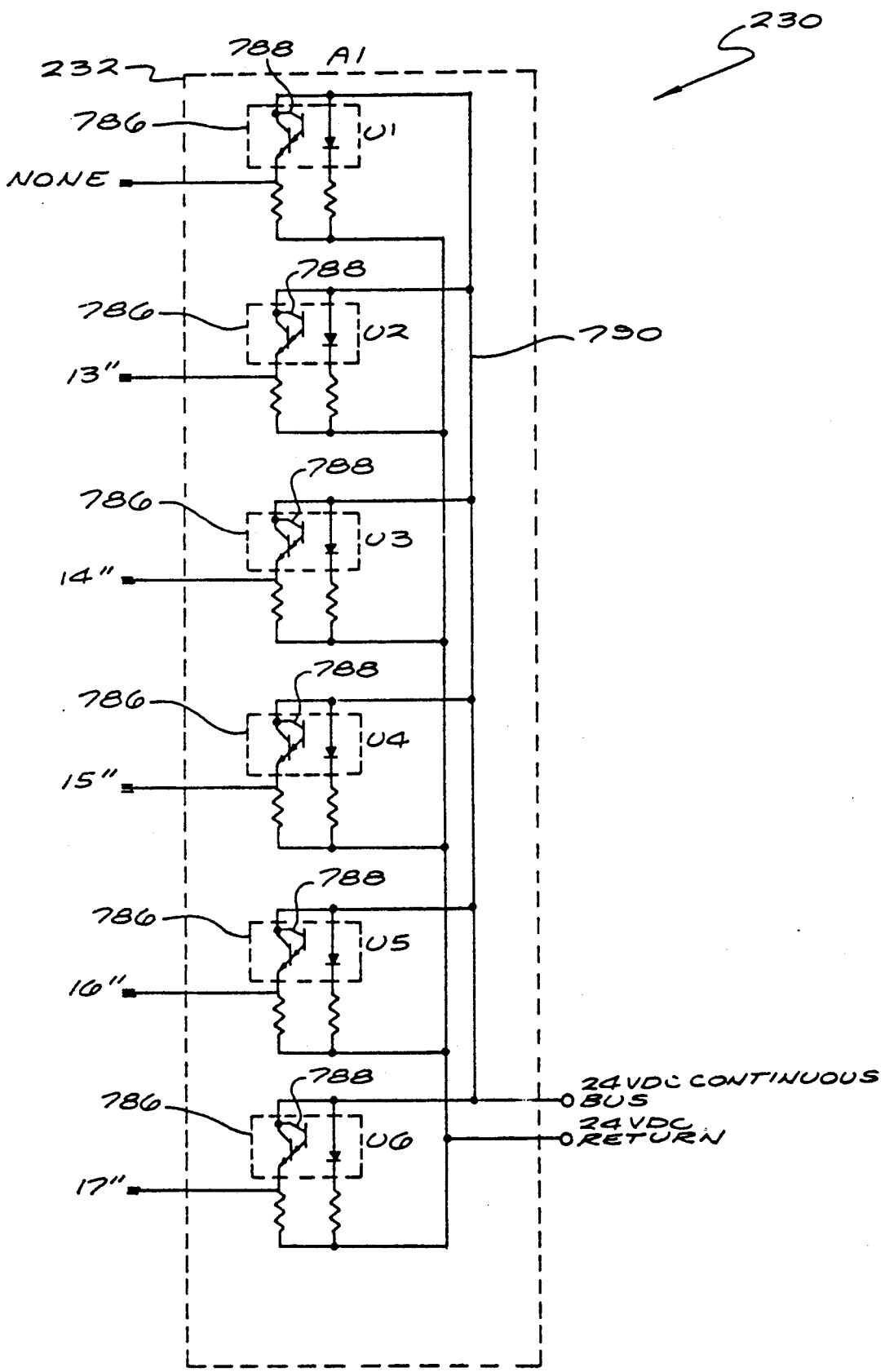
FIG. 28 is a measurement subsystem wiring diagram of the leak detection apparatus of FIG. 2.

Referring to FIG. 28, the measurement subsystem includes reflective transmit/receive switch 232 comprising a plurality of optical circuits 786. Each of the optical circuits 786 includes a light emitting diode circuit 788 in parallel with a diode and resistor combination for providing an optical beam as shown in FIG. 28. Each of the reflective switches is electrically connected to an electrical buss line 790. There is an individual optical circuit 786 for each size of drum wheel from 13" to 17" in this embodiment. However, when the optical beam of the first optical circuit 786 is not interrupted, the indication is that the input gate 126 or the input conveyor 102 did not operate. Thus, if the wheel 106 did not reach the guide 226 (FIG. 12), there is no signal. Therefore, the circuitry of the guide 226 also provides a positive indication that either a wheel has or has not entered the guide.

Referring to FIGS. 29A and 29B, the input transport subsystem receives 120 volts AC at a power supply 792 which in turn distributes electrical power to an X-drive amplifier 794 and a Z-drive amplifier 796. The X-drive amplifier 794 and the Z-drive amplifier 796 are both servo control amplifiers that receive command signals from the program controller 128. The speed and acceleration of the X-axis drive motor 253 and the Z-axis drive motor 255 are each controlled by the respective servo controlled amplifiers 794, 796. The X-axis drive motor 253 is employed for driving the carriage plate 240 in the X-direction while the Z-axis drive motor 255 is provided for driving the Z-axis vertical riser 266 in the Z-direction.

The operations of the X-axis drive motor 253 and Z-axis drive motor 255 are controlled by a plurality of control signals 798 transmitted from the program controller 128. The plurality of control signals 798 are provided to the X-drive servo-motor 794 through an interface terminal board 802 while the plurality of control signals 800 are provided to the Z-axis drive motor by the Z-axis servo-amplifier 796 through an interface terminal board 804. The remainder of the circuitry shown on FIGS. 29A and 29B is associated with the operation of the carriage plate 240 in the X-direction and the operation of the Z-axis vertical riser 266 in the Z-direction.

The X-drive servo-amplifier 794 includes an enabling circuit 806 while the Z-drive servo-amplifier 796 includes an enabling circuit 808. Each of the enabling circuits are provided for assisting in the operation of the servo-amplifiers for repositioning the carriage plate 240 and the vertical riser 266 during operation of the leak detection apparatus 100. Finally, each of the servo-amplifiers includes an encoder circuit 810, 812 respectively which are employed for indicating the position of the carriage plate 240 in the X-direction and the vertical riser assembly 266 in the Z-direction. The reference for the initial count of the encoder circuits 810, 812 is taken from the pair of home base zero position switches exemplified by the zero positioned switch 312 for the X-direction shown on FIG. 12A and the zero position switch 314 for the Z-direction shown on FIG. 30. Each of the zero position switches are connected directly to the 24 volt DC continuous buss.

Figure 30:
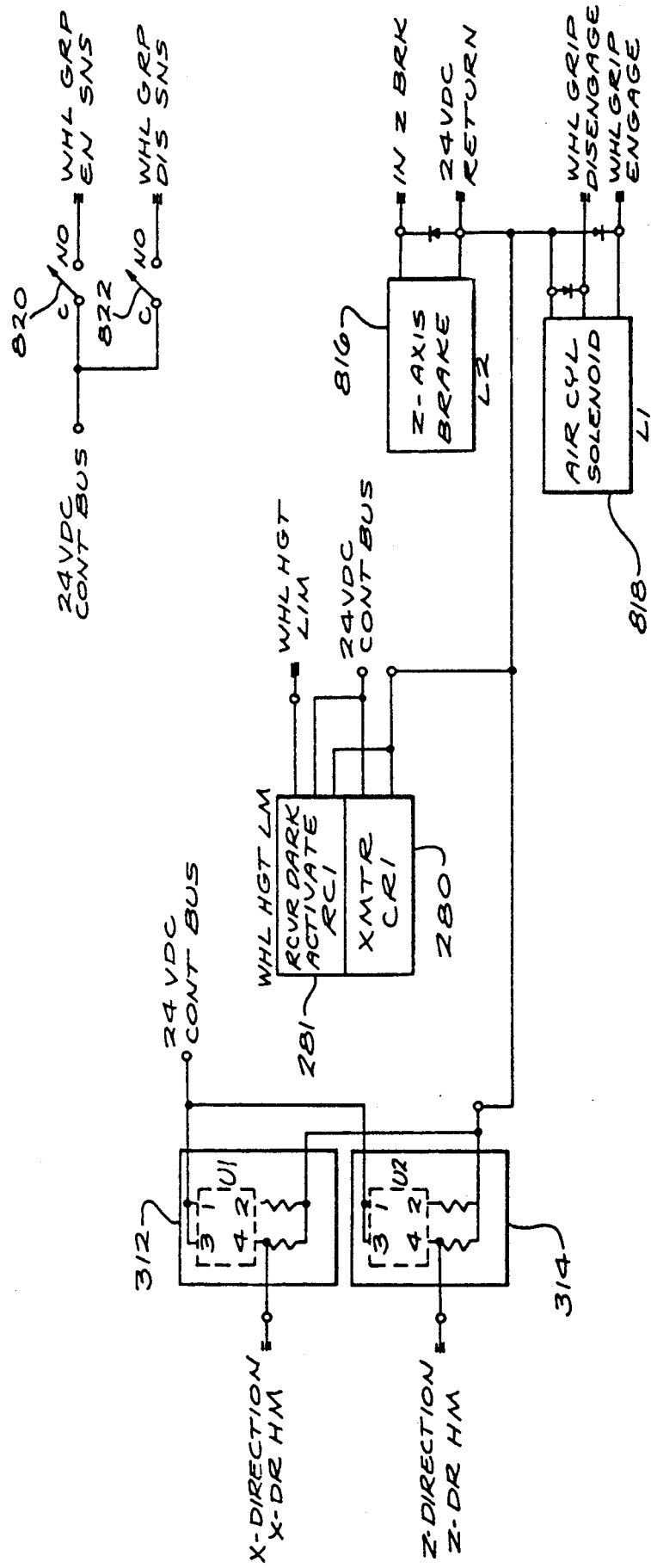

Referring now to FIG. 30, the optical transmitter 280 and the optical receiver 281, each of which are mounted on the input gripper arm 104, comprise a through beam optical switch which is employed for determining the height of the wheel to be tested. The 24 volt DC continuous buss is connected directly to the optical transmitter 280 and to the optical receiver 281. A signal referred to as the wheel height limit is transmitted from the optical receiver 281 to the program controller 128 for identifying the maximum height of the drum wheel under test.

Also included is a Z-axis brake 816 which is mounted above the Z-axis ball screw 262 (FIG. 6). A failsafe feature is built into the ball screw assembly 260 by employing the Z-axis brake 816 which fails closed and freezes the gripper arm 104 and the ball screw 262 upon loss of power and prevents the drum wheel from falling. The output of the Z-axis brake 816 provides an input Z-brake signal sent to the program controller 128 while the brake 816 is further connected to the 24 volt DC return line.

Also included is a solenoid 818 connected to the air cylinder 282 associated with the input gripper arm 104. Operation of the solenoid 818 in response to signals from the program controller 128 alternately activates the air cylinder 282 for controlling the input gripper arm. Further, a pair of normally open pressure switches are associated with the air cylinder 282 for providing an indication that the lines to the air cylinder have been pressurized through actuation of the solenoid 818.

Figure 31:
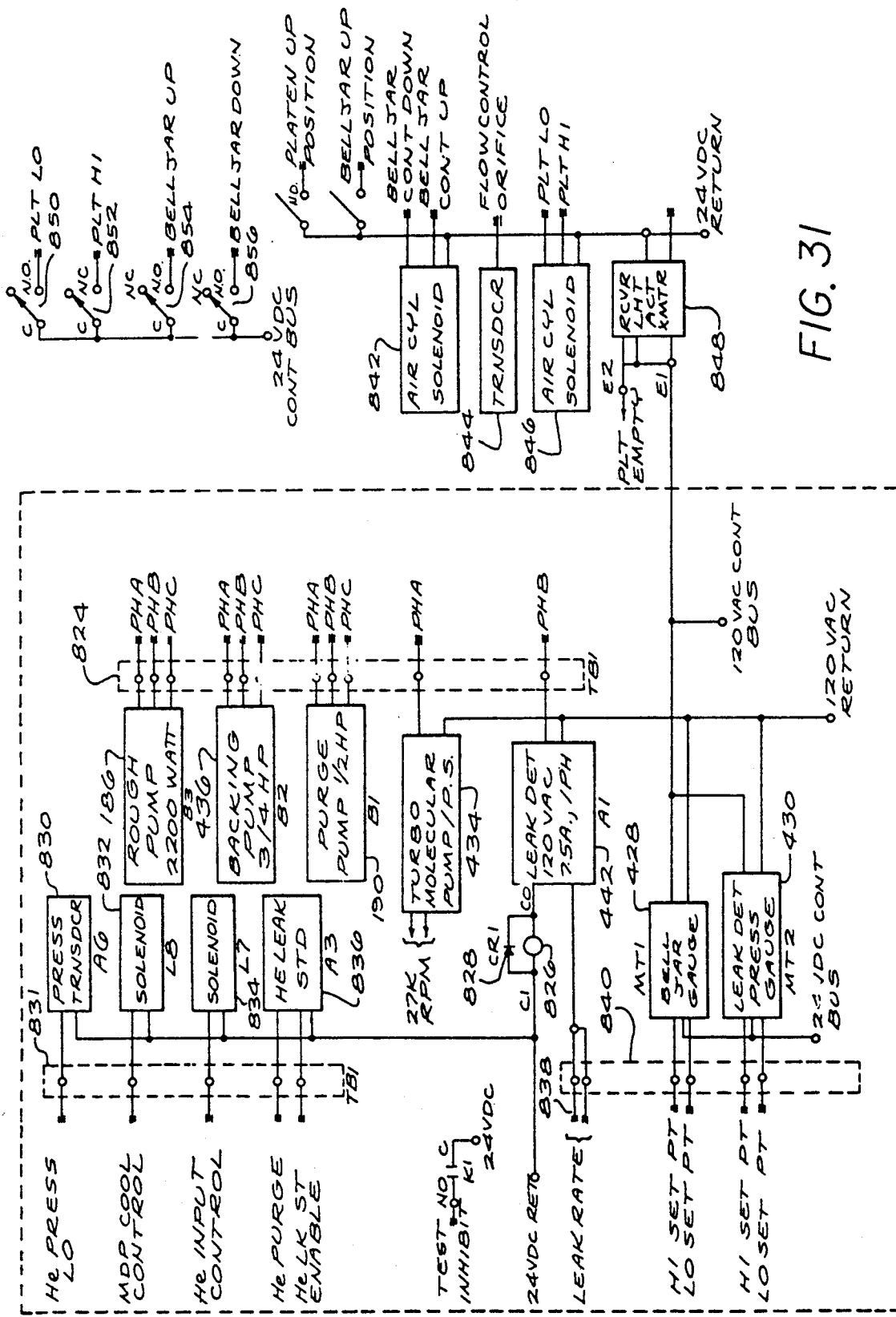
FIGS. 31–32 are vacuum subsystem wiring diagrams of the leak detection apparatus of FIG. 2.

Referring now to FIG. 31, the vacuum subsystem 138 includes the roughing pump 186, the fore pump 436 and the purging pump 190, each being fed by three-phase 480 volts through a terminal board 824. Also fed through the terminal board 824 is the turbo molecular pump 434 which receives 120 volt AC single-phase voltage and is also connected to the 120 volt AC return line. The leak detector 442 is connected to the 120 volt AC source through terminal board 824 for energizing the leak detector. Further, the coil 858 of the leak detector control gate 864 is also connected to the 24 volt DC return line via a 24 volt contactor 860. A suppression diode 828 connected across the coil 858 for suppressing electrical surges.

Connected to the 24 volt DC continuous buss is a plurality of control elements associated with the leak detection apparatus 100. Those include, a pressure transducer 830 which is provided for monitoring the pressure within the helium supply and which passes through a terminal board 831. A solenoid 832 is provided for controlling the electrical power to the turbo molecular pump cool water line for controlling the temperature of the turbomolecular pump. A solenoid 834 controls the electrical power to the helium input through the pipe fitting inlet 392 and the manifold 394 (FIG. 17). When a signal is received from the program controller 128 to inject gas into the bell jar 134, the solenoid 834 responds by opening and permitting helium gas to pass. Finally, a helium leak valve 836 is utilized to assure that the leak detector 442 is reading accurately. This is accomplished by switching the orifice 448 of the test sample valve to control the amount of cubic centimeters of helium gas directed to the leak detector for calibration purposes.

Also connected to the leak detector 442 is a circuit 838 which is utilized for transmitting a signal from the leak detector to the program controller 128 indicating the number of molecules of helium gas detected per unit time. The helium leak rate circuit 838 passes through a terminal board 840 which also accommodates the outer vacuum chamber gauge 428 which indicates the pressure under the bell jar 134. Likewise, the vacuum meter 430 is connected through the terminal board 840 for indicating the pressure in the inner vacuum chamber 132.

Also included is an air cylinder solenoid 842 which upon being energized permits the air cylinder 380 which operates the bell jar 134 to be charged with air for driving the bell jar up and down. A lower platen air cylinder solenoid 846 is also included and is employed for charging a valve associated with the lower platen air cylinder 360. An optically reflective switch 848 is employed when the wheel 106 is placed on the lower platen 108. The optically reflective switch 848 indicates that the wheel is in place when a reflected signal is returned to the receiver portion of the switch. The absence of a reflective signal indicates that the drum wheel is not in place.

A pair of pressure switches 850, 852 are associated with the valve in the air cylinder 360 of the lower platen 108. Pressure switch 850 indicates when air pressure is present to lower the lower platen to its down position while pressure switch 852 indicates when pressure is present to raise the lower platen to its up position. An additional pair of pressure switches 854, 856 are each associated with a valve located in the air line to the air cylinder 380 of the bell jar 134 for indicating when air pressure is available to move the bell jar to its up or down position.

Each of the pumps associated with the vacuum subsystem 138 includes a gate valve located in the line preceding the pump as is shown in FIG. 17. Each of the gate valves includes a bellows disk gate which is operated by an electrical solenoid for opening and closing the gate. When the disk gate is opened, each of the pumps is permitted to draw a vacuum on the leak detection system. Each of the gate valves preceding each of the pumps in the vacuum lines operates upon receipt of command signals from the program controller 128. Upon receiving a command signal, the disk gate is opened for that particular pump. It should be noted that each of the vacuum pumps associated with the leak detection apparatus 100 continuously runs from the time the leak detection apparatus is energized at the beginning of the work day. Operating the vacuum pumps on a continuous basis results in more efficient operation. However, the solenoid associated with each gate valve is opened and closed only when a particular vacuum pump associated with the gate valve is to be employed to draw a vacuum in the system.

Figure 32:
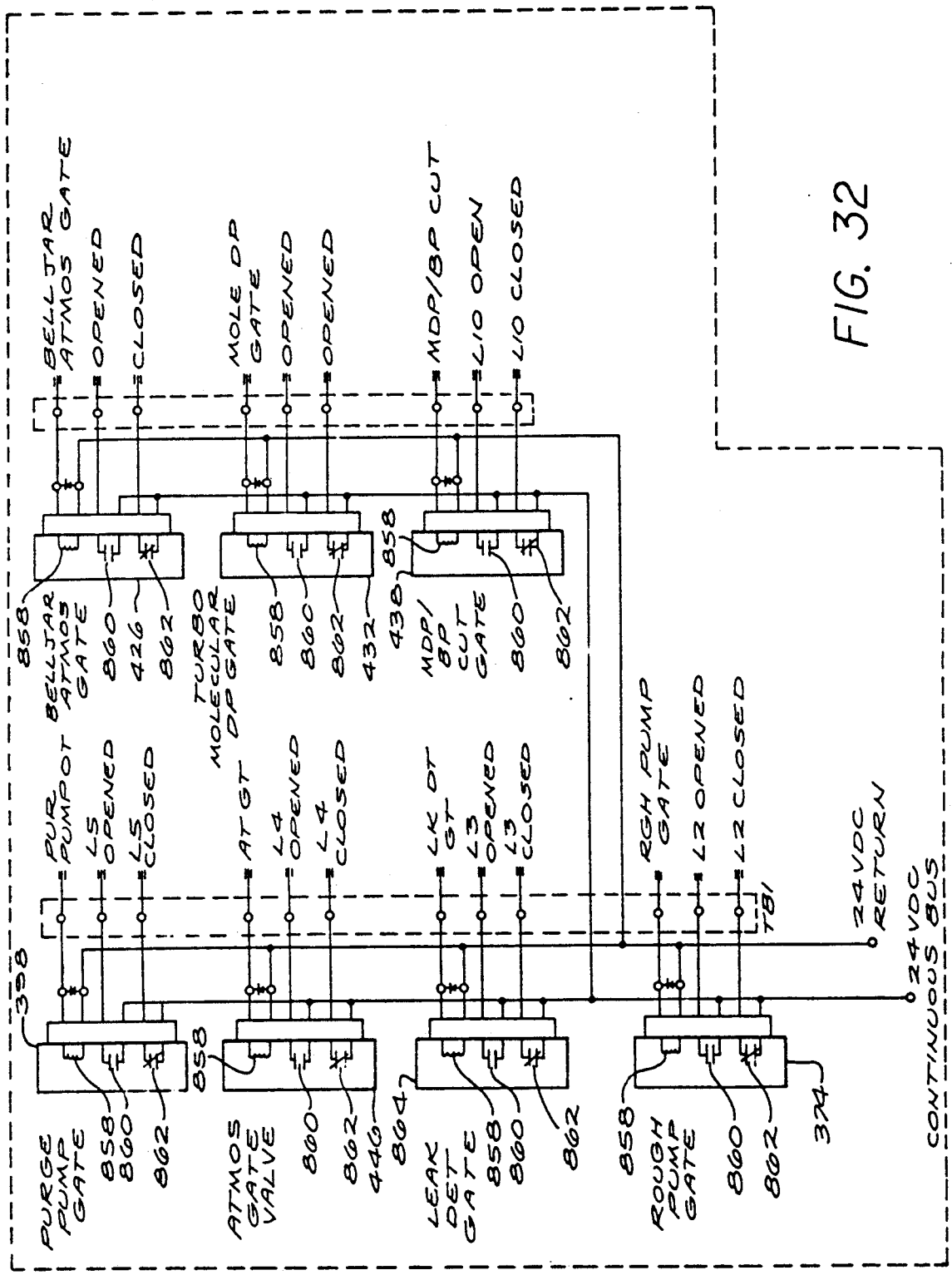

The gate valves associated with the vacuum pumps of the vacuum subsystem 138 are shown in FIG. 32. The purging pump gate valve 398 when energized permits the purging pump to draw a vacuum in the outer chamber 136. The purging pump gate includes an electrical coil 858 for energizing the pump gate, an open contact 860 for de-energizing the gate valve and a closed contact 862 for energizing the solenoid to operate the gate valves. The gate valve 398 is connected to the 24 volt DC continuous buss and the 24 volt DC return line. Each of the remaining gate valves illustrated on FIG. 32 are also connected to the 24 volt DC continuous buss and the 24 volt DC return and further include a duplicate electrical coil 858, an open contact 860 and a closed contact 862 for operating the disk gate for that respective gate valve.

The remaining gate valves include the inner chamber vent valve 446 for breaking the vacuum in the inner vacuum chamber 132, a leak detector gate valve 864 associated with the vacuum pump therein for drawing molecules of helium across the detector device. There is further included the roughing pump gate valve 374 utilized for initiating the vacuum procedure at the beginning of each test procedure cycle, a bell jar atmospheric gate valve 426 employed for releasing the vacuum in the outer enclosure 136, the turbo molecular pump gate valve 432 which is employed for drawing the lower level vacuum in the inner chamber 132, and the fore pump gate valve 438 which is employed for assisting the turbo molecular pump 434 in drawing a sufficient vacuum on the inner chamber. The operation of each of the above-recited gate valves is duplicate to that of the purging pump gate valve 398.

The output transport subsystem 118 includes the Z-axis drive motor 460, the X-axis drive motor 518, a Z-drive servo-amplifier 866 and an X-drive servo-amplifier 868. Both the Z-axis motor 460 and the X-axis motor 518 are commanded by the servo-amplifiers 866, 868 which receive command signals from the program controller 128. Both of the servo-amplifiers receive input power from the power distribution system 156 as shown in FIG. 26.

A plurality of control signals 870 are shown in electrical communication with the X-drive servo-amplifier 868 while another plurality of control signals 872 are shown in electrical communication with the Z-drive servo-amplifier 866. The plurality of control signals 870 are X-direction controls which are transmitted between the program controller 128 and the servo-amplifier 868. Likewise, the plurality of control signals 872 are Z-direction control signals which are transmitted between the program controller 128 and the servo-amplifier 866. Further, an enable circuit 874 and an encoder circuit 876 are included. Each of these circuits perform the same function as the corresponding circuits described with reference to the input transport subsystem 116 shown in FIG. 29. The encoder circuit 876 is fed directly from the X-drive servo-amplifier 868 through a terminal board 878.

Figure 33:
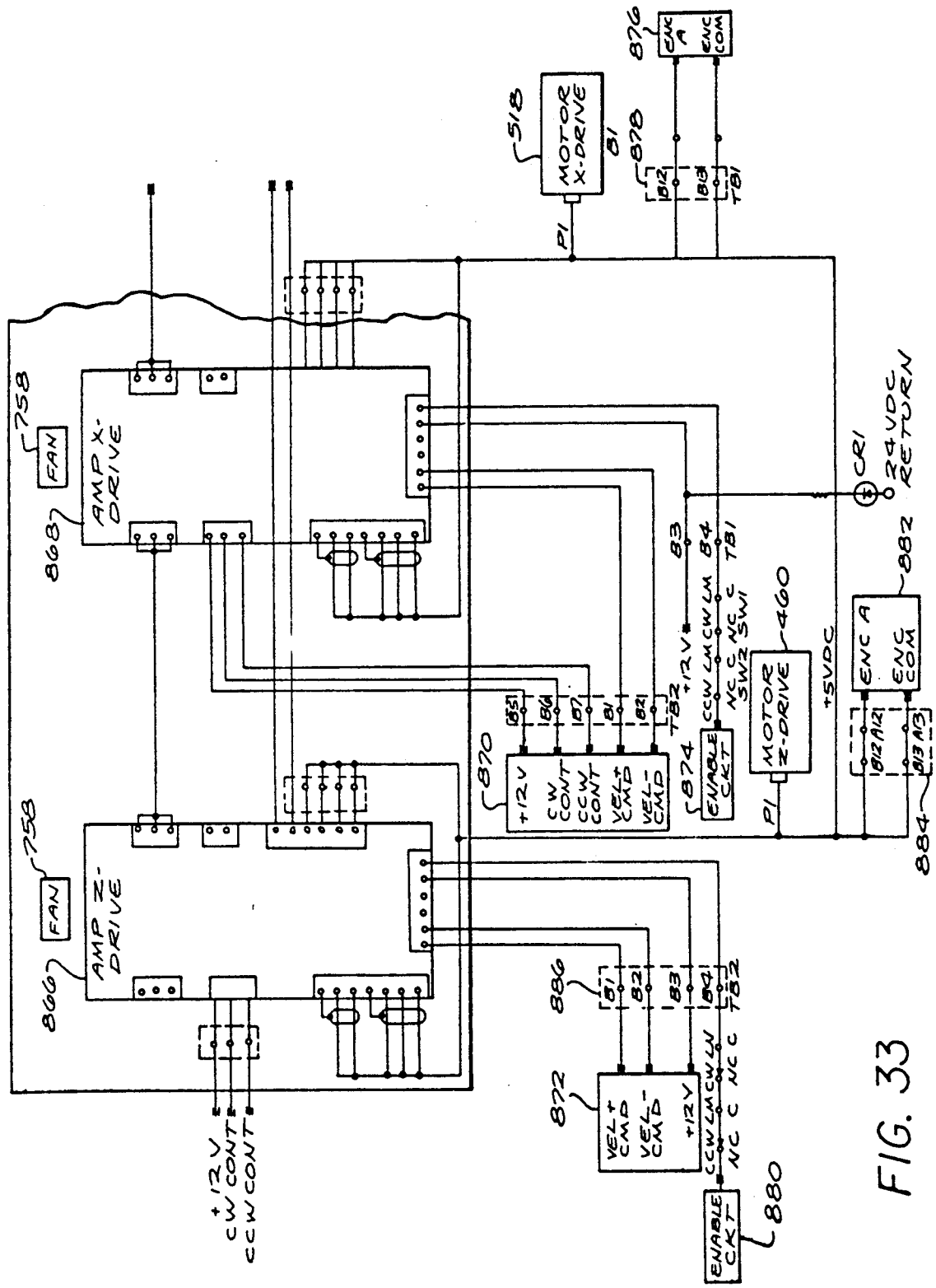
FIGS. 33–34 are output transport subsystem wiring diagrams of the leak detection apparatus of FIG. 2.

Likewise, the Z-drive servo-amplifier 866 also includes an enable circuit 880 and an encoder circuit 882. Both the enable circuit 880 and the encoder circuit 882 associated with the Z-drive servo-amplifier 866 perform the same functions as the corresponding enable circuit and encoder circuit associated with the Z-drive servo-amplifier of the input transport subsystem 116 shown in FIG. 29. The encoder circuit 882 is fed from the Z-drive servo-amplifier via a terminal board 884 while the enable circuit 880 is supplied with electrical power along with the plurality of control signals 872 through an interface terminal board 886 as is shown in FIG. 33.

Figure 34:
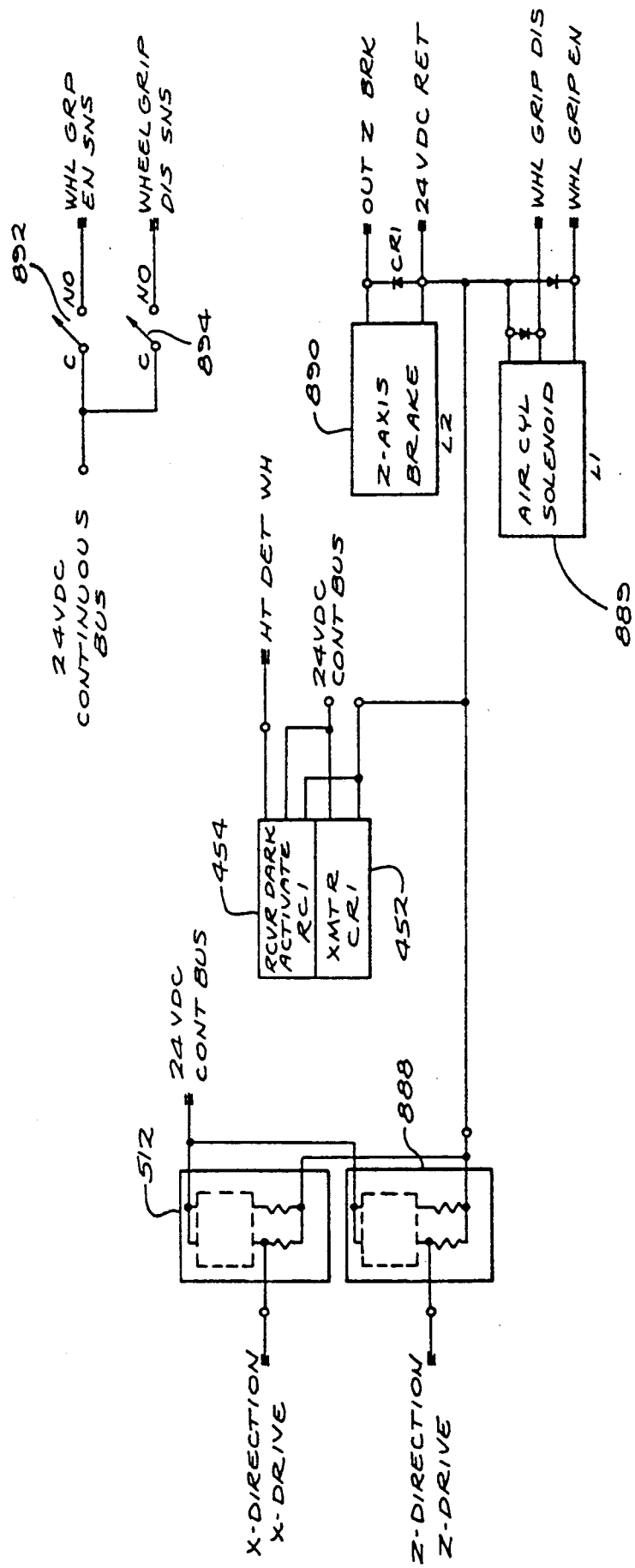

Referring now to FIG. 34, the output transport subsystem 118 also includes the zero position switch 512 which is associated with the X-drive motor direction while a zero-position switch 888 is associated with the Z-drive motor direction as is shown in FIG. 34. Each of the zero-position switches 512, 888 are energized from the 24 volt DC continuous buss and are designed to indicate when the carriage plate 502 and the Z-direction yoke assembly 470 are in the zero position. Additionally, the optical transmitter 452 and the optical receiver 454 which are employed for determining the height of the wheel 106 being tested and for providing a means for signalling the output gripper arm 110 to stop prior to contacting the drum wheel are also shown. Both the optical transmitter 452 and the optical receiver 454 are energized from the 24 volt DC continuous buss.

The air cylinder 472 which is mounted on the output gripper arm 110 and which is utilized for operating the gripper arm camplate 480 is also energized from the 24 volt DC continuous buss through an air cylinder solenoid 889. The solenoid 889 receives appropriate wheel grip engaging and disengaging signals from the program controller 128. Additionally, a Z-axis brake 890 is provided since the Z-axis ball screw 458 works against gravity. In the event of the loss of electrical power, a brake mechanism is used to freeze the ball screw 458 and the output gripper arm 110. The Z-axis brake 890 is shown receiving an output Z-axis brake signal from the program controller 128 and further receives electrical power from the 24 volt DC continuous buss and is also connected to the 24 volt DC return line.

Also shown is a pair of pressure switches 892, 894 each of which are associated with the air cylinder solenoid 889 of the output gripper arm 110. The pressure switches are connected directly to the 24 volt DC continuous buss and provide a pressure indication after the air cylinder solenoid control valve 889 receives wheel grip engaging and disengaging signals from the program controller.

The marker subsystem 146 is in communication with the program controller 128 and receives one or a pair of signals for actuating one or both of the sprayer heads. The particular sprayer head activated will provide an identification mark on the tested wheel to indicate whether the wheel successfully passed the leak detection test. The marker subsystem 146 is directly connected to the 24 volt DC return line which is employed for energizing the sprayer heads as is shown in FIG. 35.

Referring now to FIG. 36, the output conveyor 112 includes a transformer 900 which energizes a power supply to a motor control amplifier (not shown) from an input conveyor motor control terminal board 902. Connected directly to the terminal board 902 is the output conveyor electric motor 520 which is employed for driving the output conveyor belt 544. The terminal board 902 is also connected to the 120 volt AC return line and to electrical ground.

Figure 37:
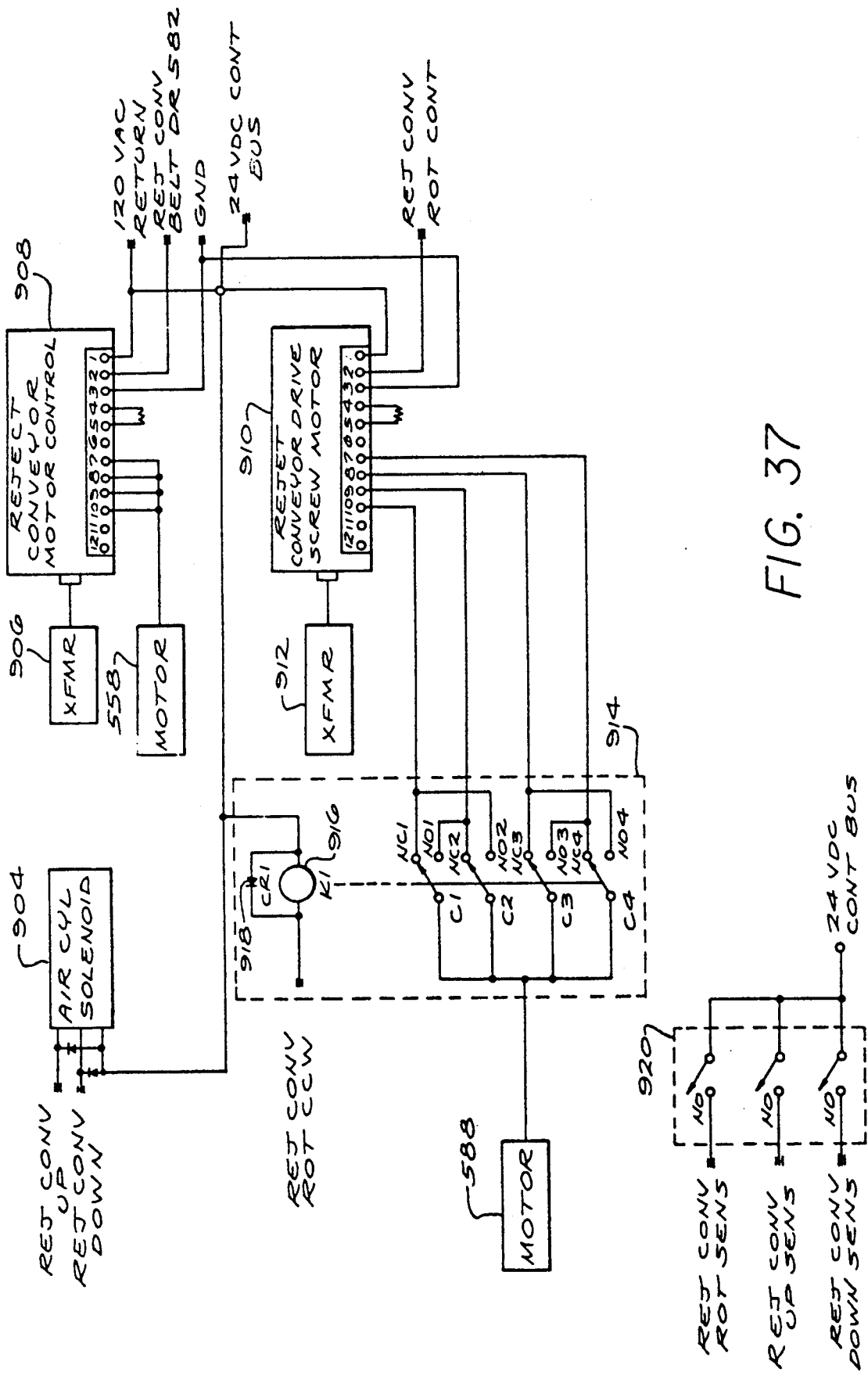
FIG. 37 is a reject conveyor subsystem wiring diagram of the leak detection apparatus of FIG. 2.
Figure 38B:
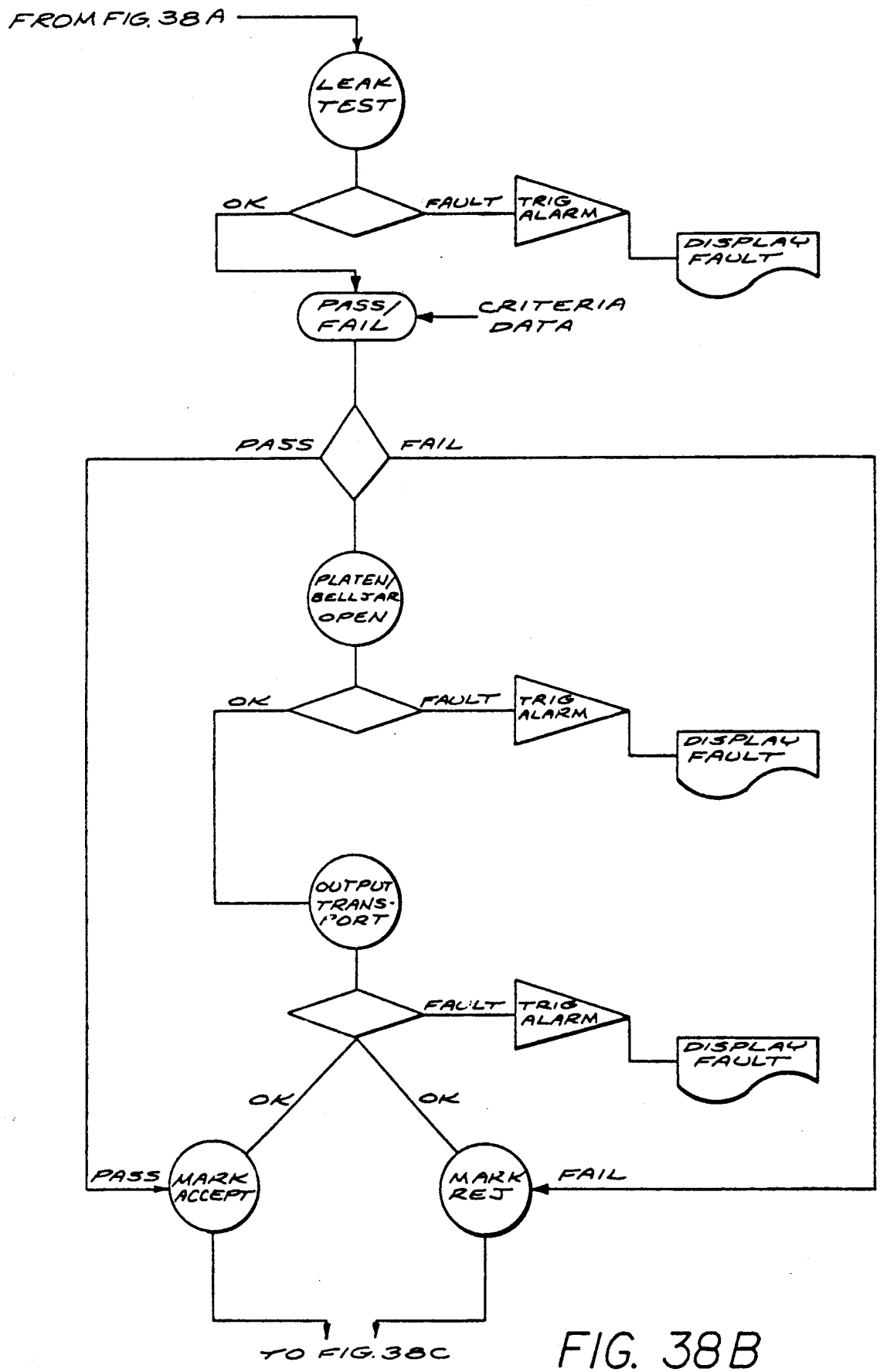

Referring now to FIG. 37, the reject conveyor 114 includes the air cylinder 606 for raising the reject conveyor platform 554. Associated with the air cylinder 606 is an air cylinder solenoid 904 which is energized from the 24 volt DC continuous buss. The air cylinder solenoid 904 energizes the circuitry for charging the air cylinder 606 and receives a signal from the program controller 128 which controls a valve associated with the air cylinder 606. The signal received from the program control will either be reject conveyor up or reject conveyor down depending upon the drum wheel test results and the position of the reject conveyor platform 554. Also included in the reject conveyor 114 is a transformer 906 which is utilized for energizing the circuitry associated with the motor control (not shown) for controlling the reject conveyor drive motor 558. The transformer is connected directly to a reject conveyor motor control terminal board 908 which provides electrical power directly to the reject conveyor drive motor 558. Further, the terminal board 908 is connected directly to the 120 volt AC return line and to electrical ground.

Also connected to the 120 volt AC return line and electrical ground is a reject conveyor drive screw motor terminal board 910. The drive screw motor terminal board 910 is connected directly to a transformer 912, the transformer 912 providing electrical power to an amplifier (not shown) which is employed for controlling the speed of the drive screw motor 558. The reject conveyor drive screw motor terminal board 910 is also connected to the program controller 128 for receiving signals for controlling the rotation of the reject conveyor 114.

Also connected to the drive screw motor terminal board 910 is a plurality of contacts 914 associated with a relay coil 916. The plurality of contacts 914 are shown in the normally closed position and are directly controlled by the electrical state of the relay coil 916. Connected in parallel with the relay coil 916 is a suppression diode 918 which is employed for suppressing electrical spikes across the relay coil. The relay coil 916 receives electrical signals from the program controller 128 for determining the direction of rotation of the reject conveyor drive screw motor 588.

Additionally shown is a plurality of control switches 920. Each of the switches are normally open and connected to the 24 volt DC continuous buss with each switch postured to assist in the position of the reject conveyor 114. The signals transmitted to the program controller through the plurality of switches 920 include the reject conveyor shutoff switch 658 and the ninety degree shutoff switch 660 as shown in FIG. 24. Other of the signals include up and down control signals for the air cylinder 606 which positions the reject conveyor platform 554.

From the foregoing, it will be appreciated that the programmable leak detection apparatus of the invention substantially improves the helium gas test procedure by automatically completing each step in a controlled manner which more closely emulates the normal operating conditions of the object under test, in this embodiment a wheel. The production testing rate is thereby substantially increased permitting a greater number of wheels of varying sizes and styles to be tested in a continuous manner. The detection apparatus is intended to initiate a self-testing and self-calibrating procedure under certain conditions so as to lessen the possibility of rejection of good wheels or acceptance of bad wheels.

While particular embodiments of the invention have been illustrated and described, it will be apparent that various modifications can be made without departing from the spirit and scope of the invention. Accordingly, it is not intended that the invention be limited, except as by the appended claims.

What is claimed is:

1. A leak detection system for detecting leaks in an object, the system comprising:
   handling means for moving the object;
   measurement means for measuring the object; and
   sealing means for sealing a part of the object to form a chamber;
   enclosing means for forming an enclosure about the object including the chamber;
   first vacuum means for creating a partial vacuum in the chamber;
   second vacuum means for providing a partial vacuum to the enclosure such that the partial vacuum of the enclosure is less than the partial vacuum of the chamber;
   test gas supply means for introducing a test gas in the outer enclosure, detection means for detecting the amount of test gas in the chamber;
   memory means for storing data regarding unacceptable leak rates for a plurality of different objects;
   controller means for automatically controlling the handling means to receive the object, move the object to the measurement means, move the object to the detection means, the controller means also for automatically receiving the measurement of the object from the measurement means, for automatically controlling the test gas supply means to introduce test gas into the enclosing means, for automatically receiving the amount of detected test gas from the detection means, for automatically comparing the measurement of the object and the amount of detected test gas to the data in the memory means and for automatically determining whether the object has an unacceptable leak rate based on such comparison.

2. The leak detection system of claim 1 wherein the controller means further automatically controls the handling means to move an object determined to have an unacceptable leak rate to a first location and an object determined to have an acceptable leak rate to a second location.

3. The leak detection system of claim 2 wherein said handling means comprises a reject conveyor for moving the object to the first and second locations as controlled by the controller means.

4. The leak detection system of claim 1 further comprising marker means for automatically marking the tested object in accordance with the determination made by the controller means.

5. The leak detection system of claim 1 wherein the measurement means is for measuring the diameter of the object.

6. The leak detection system of claim 5 wherein the measurement means is also for measuring the height of the object.

7. The leak detection system of claim 1 wherein the first and second vacuum means are separate from each other but are co-located in a common conduit.

8. The leak detection system of claim 7 wherein the first and second vacuum means are disposed in a coaxial arrangement with each other.

9. The leak detection system of claim 8 wherein the first vacuum means comprises a first pipe through which the chamber partial vacuum is applied and the second vacuum means comprises a second pipe through which the enclosure partial vacuum is applied, the first pipe being the inner pipe and the second pipe being the outer pipe of the coaxial arrangement.

10. The leak detection system of claim 1 further comprising purging means for purging both the first and second vacuum means of test gas.

11. The leak detection system of claim 10 wherein the purging means comprises valve means for dissipating the partial vacuums in both the first and second vacuum means and for applying a purging partial vacuum to the second vacuum means to purge test gas from the enclosure; and the controller means is also for automatically controlling the purging means to open the valve means and apply the purging vacuum.

12. The leak detection system of claim 10 wherein the purging means comprises means for causing the first vacuum means to be in fluid communication with the second vacuum means and for applying a purging partial vacuum to the second vacuum means to purge the first and second vacuum means and the enclosure of test gas.

13. A leak detection system for detecting leaks in objects of different sizes, the system comprising:
   handling means for moving the object;
   measurement means for measuring a physical size characteristic of the object;
   sealing means for sealing a part of the object to form a chamber;
   enclosing means for forming an enclosure about the object including the chamber;
   first vacuum means for creating a partial vacuum in the chamber;
   second vacuum means for providing a partial vacuum to the enclosure such that the partial vacuum of the enclosure is less than the partial vacuum of the chamber;
   test gas supply means for introducing a test gas in the outer enclosure, detection means for detecting the amount of test gas in the chamber;
   memory means for storing data regarding unacceptable leak rates for a plurality of different objects based on the physical size characteristic;
   purging means for purging both the first and second vacuum means of test gas; and
   controller means for automatically controlling the handling means to receive the object, move the object to the measurement means, move the object to the detection means, the controller means also for automatically receiving the measurement of the object from the measurement means, for automatically controlling the test gas supply means to introduce test gas into the enclosing means, for automatically receiving the amount of detected test gas from the detection means, for automatically controlling the purging means to purge the first and second vacuum means; for automatically comparing the measurement of the object and the amount of detected test gas to the data in the memory means and for automatically determining whether the object has an unacceptable leak rate based on such comparison.

14. The leak detection system of claim 13 wherein the controller means further automatically controls the handling means to move an object determined to have an unacceptable leak rate to a first location and an object determined to have an acceptable leak rate to a second location.

15. The leak detection system of claim 14 wherein said handling means comprises a reject conveyor for moving the object to the first and second locations as controlled by the controller means.

16. The leak detection system of claim 13 further comprising marker means for automatically marking the tested object in accordance with the determination made by the controller means.

17. The leak detection system of claim 13 wherein the measurement means is for measuring the diameter of the object.

18. The leak detection system of claim 13 wherein the first and second vacuum means are disposed in a coaxial arrangement with each other.

19. The leak detection system of claim 18 wherein the first vacuum means comprises a first pipe through which the chamber partial vacuum is applied and the second vacuum means comprises a second pipe through which the enclosure partial vacuum is applied, the first pipe being the inner pipe and the second pipe being the outer pipe of the coaxial arrangement.

20. A leak detection system for detecting leaks in objects of different sizes, the system comprising:
   handling means for moving the object;
   measurement means for measuring the diameter of the object;
   sealing means for sealing a part of the object to form a chamber;
   enclosing means for forming an enclosure about the object including the chamber;
   first vacuum means for creating a partial vacuum in the chamber;
   second vacuum means for providing a partial vacuum to the enclosure such that the partial vacuum of the enclosure is less than the partial vacuum of the chamber;
   test gas supply means for introducing a test gas in the outer enclosure, detection means for detecting the amount of test gas in the chamber;
   memory means for storing data regarding unacceptable leak rates for objects based on the diameter of the objects;
   purging means for purging both the first and second vacuum means of test gas; and
   controller means for automatically controlling the handling means to receive the object, move the object to the measurement means, move the object to the detection means, and move the object from the leak detection system, the controller means also for automatically receiving the measurement of the object from the measurement means, for automatically controlling the test gas supply means to introduce test gas into the enclosing means, for automatically receiving the amount of detected test gas from the detection means, for automatically controlling the purging means to purge the first and second vacuum means after the detection means detects the amount of test gas, for automatically comparing the measurement of the object and the amount of detected test gas to the data in the memory means and for automatically determining whether the object has an unacceptable leak rate based on such comparison, and for automatically controlling the handling means to move an object determined to have an unacceptable leak rate to a first location and an object determined to have an acceptable leak rate to a second location.

21. A method for detecting leaks in an object, the method comprising the steps of:
storing data regarding unacceptable leak rates for a plurality of different objects;
automatically measuring the object;
automatically sealing a part of the object to form a chamber;
automatically forming an enclosure about the object including the chamber;
automatically creating a first partial vacuum in the chamber;
automatically creating a second partial vacuum in the enclosure such that the partial vacuum of the enclosure is less than the partial vacuum of the chamber;
automatically introducing a test gas in the outer enclosure,
automatically detecting the amount of test gas in the chamber;
automatically comparing the measurement of the object and the amount of detected test gas to the stored data and automatically determining whether the object has an unacceptable leak rate based on such comparison.

22. The method of claim 21 further comprising the step of automatically moving an object determined to have an unacceptable leak rate to a first location and an object determined to have an acceptable leak rate to a second location.

23. The method of claim 21 further comprising the step of automatically marking the tested object in accordance with the determination of the leak rate of the object.

24. The method of claim 21 wherein the step of measuring the object includes the step of measuring the diameter of the object.

25. The method of claim 24 wherein the step of measuring the object further includes the step of measuring the height of the object.

26. The method of claim 21 further comprising the step of providing first and second vacuum means to create the first and second partial vacuums respectively, the first and second vacuum means being separate from each other but being co-located in a common conduit.

27. The method of claim 26 wherein the step of providing the first and second vacuum means includes the step of providing the means such that they are separate but are disposed in a coaxial arrangement with each other.

28. The method of claim 27 wherein the step of providing the first and second vacuum means comprises providing a first pipe through which the chamber partial vacuum is created and a second pipe through which the enclosur partial vacuum is created, the first pipe being the inner pipe and the second pipe being the outer pipe of the coaxial arrangement.

29. The method of claim 26 further comprising the step of purging both the first and second vacuum means of test gas.

30. The method of claim 29 further comprising the step of providing purging means which comprises valve means for dissipating the partial vacuums in both the chamber and the enclosure and for applying a purging partial vacuum to the second vacuum means to purge test gas.

* * * * *